(12) United States Patent
Siripurapu et al.

(10) Patent No.: US 8,595,234 B2
(45) Date of Patent: Nov. 26, 2013

(54) PROCESSING DATA FEEDS

(75) Inventors: Taraka Subrahmanya Prasad Siripurapu, San Bruno, CA (US); Wang Chee Lam, San Bruco, CA (US); Digvijay Singh Lamba, San Bruno, CA (US); Anand Rajaraman, Palo Alto, CA (US)

(73) Assignee: Wal-Mart Stores, Inc., Bentonville, AK (US)

( * ) Notice: Subject to any disclaimer, the term of this patent is extended or adjusted under 35 U.S.C. 154(b) by 0 days.

(21) Appl. No.: 13/300,524

(22) Filed: Nov. 18, 2011

(65) Prior Publication Data

US 2012/0131139 A1    May 24, 2012

Related U.S. Application Data

(63) Continuation-in-part of application No. 13/106,706, filed on May 12, 2011.

(60) Provisional application No. 61/345,252, filed on May 17, 2010, provisional application No. 61/415,282, filed on Nov. 18, 2010, provisional application No. 61/415,279, filed on Nov. 18, 2010.

(51) Int. Cl.
    *G06F 17/30*    (2006.01)
(52) U.S. Cl.
    USPC ............................................ 707/737
(58) Field of Classification Search
    USPC ........................................... 707/737
    See application file for complete search history.

(56) References Cited

U.S. PATENT DOCUMENTS

| | | | |
|---|---|---|---|
| 8,122,006 B2 * | 2/2012 | de Castro Alves et al. | ... 707/713 |
| 2004/0167909 A1 | 8/2004 | Wakefield et al. | |
| 2006/0251092 A1 * | 11/2006 | Matterne et al. | ............ 370/412 |
| 2008/0066111 A1 * | 3/2008 | Ellis et al. | .................. 725/57 |
| 2009/0182779 A1 | 7/2009 | Johnson | |
| 2010/0125574 A1 * | 5/2010 | Navas | ...................... 707/722 |
| 2010/0198777 A1 | 8/2010 | Lo et al. | |
| 2010/0312801 A1 * | 12/2010 | Ostrovsky et al. | ............ 707/803 |
| 2012/0291054 A1 * | 11/2012 | Orofino et al. | ................ 719/328 |

OTHER PUBLICATIONS

Snowsill, Tristan, et al., "Finding Surprising Patterns in Textual Data Streams", Cognitive Information Processing (CIP), 2010 2nd International Workshop on, IEEE, Piscataway, NJ, dated Jun. 14, 2010.
International Search Report issued in International Application No. PCT/US2011/061547, dated Mar. 6, 2012 (5 pages).

* cited by examiner

*Primary Examiner* — Thanh-Ha Dang
(74) *Attorney, Agent, or Firm* — Stevens Law Group

(57) ABSTRACT

Exemplary embodiments allow performance of stream computations on real-time data streams using one or more map operations and/or one or more update operations. A map operation is a stream computation in which stream events in one or more real-time data streams are processed in a real-time manner to generate zero, one or more new stream events. An update operation is a stream computation in which stream events in one or more real-time data streams are processed in a real-time manner to create or update one or more static "slate" data structures that are stored in a durable manner.

26 Claims, 42 Drawing Sheets

```
{ "text": "Gravity Probe B confirms two key predictions about space-time
derived from Einstein's general theory of relativity http://go.nasa.gov/
klq5MO",
  "in_reply_to_status_id": null,
  "created_at": "Wed May 04 18:59:59 +0000 2011",
  "truncated": false,
  "geo": null,
  "in_reply_to_screen_name": null,
  "source": "web",
  "place": null,
  "in_reply_to_user_id": null,
  "contributors": null,
  "user": {
    "favourites_count": 56,
    "profile_image_url": "https://si0.twimg.com/profile_images/188302352/nasalogo_twitter_normal.jpg",
    "statuses_count": 25713,
    "description": "",
    "screen_name": "NASA",
    "lang": "en",
    "location": "Pasadena, CA",
    "contributors_enabled": false,
    "following": null,
    "notifications": null,
    "geo_enabled": false,
    "profile_background_tile": false,
    "profile_sidebar_border_color": "87bc44",
    "followers_count": 256,
    "protected": false,
    "verified": false,
    "url": null,
    "name": "NASA",
    "friends_count": 1042377,
    "id": 3274551,
    "utc_offset": 32400
  },
  "id": 11781133277,
  "coordinates": null,
  "favorited": false
}
```

— 202 (text), 204 (created_at), 210 (source), 212 (user), 214 (statuses_count), 216 (screen_name), 208 (id), 206 (coordinates)

FIG. 2B

NASA NASA
Gravity Probe B confirms two key predictions about space-time derived from Einstein's general theory of relativity http://go.nasa.gov/klq5MO
4 May

```
{
  "text": "Gravity Probe B confirms two key predictions about space-
time derived from Einstein's general theory of relativity http://
go.nasa.gov/klq5MO",
  "kosmix_rank": 1000,                                    ⌒302
  "kosmix_tags": "Gravity Probe B, NASA, Space-Time, Einstein, General
Theory of Relativity",                  ⌒306
  "kosmix_langid": "en",
  "URL1": [                                               ⌒304
    "snippet": "NASA's Gravity Probe B (GP-B) mission has confirmed
two key predictions derived from Albert Einstein's general theory of
relativity, which the spacecraft was designed to test. The
experiment, launched in 2004, used four ultra-precise gyroscopes to
measure the hypothesized geodetic effect, the warping of space and
time around a gravitational body, and frame-dragging, the amount a
spinning object pulls space and time with it as it rotates.",
    "final_url": "http://www.nasa.gov/mission_pages/gpb/         ⌒310
gpb_results.html",              ⌒312
    "title": "NASA's Gravity Probe B Confirms Two Einstein Space-
Time Theories",
    "short_url": "http://go.nasa.gov/klq5MO",           ⌒318
    "images": [
      {
        "url": "http://www.nasa.gov/images/header_logo.gif"     ⌒316
      },
      {
        "url": "http://www.nasa.gov/mission_pages/gpb/          ⌒320
168806main_sv_rising_web_330.jpg"
      }
    ],                                                          ⌒322
    "long_url": "http://www.nasa.gov/mission_pages/gpb/
gpb_results.html",
    "best_image": "http://www.nasa.gov/images/content/
168806main_sv_rising_web_330.jpg"
  ]
}
```

| All Categories | Business | | Most popular today —704 |
|---|---|---|---|
| Sports | View as: ☰ ▢ | | |
| Politics | ⬚ Slow ——○——— Fast | | 10 mins ago          343 |
| | On average: 11 Tweets per article, 5 articles per second with articles being 1 hour old | | Venture funding down 10% so far this year |
| Entertainment | | | 32 mins ago          181 |
| | [12] Tweets   2 mins ago   www.acmenews.com QUARTERLY EARNINGS ANNOUNCED | ⎫ | New CEO of Beta Corp holds press conference |
| Technology | [☆] Tim – Q1 Earnings are out for ACME Tech. http://www.foo.com/xue8d | ⎬ 702 | 1 hour ago          148 |
| BUSINESS | | ⎭ | Sales of ACME online edition beat print edition |
| | [5] Tweets   5 mins ago   news.example.com RECORD YEAR FOR CORN PRICES | | 1 hour ago          65 |
| Health & Lifestyle | [🧭] Jane22 – Wow, corn is really expensive! http://www.foo.com/8usdu3d | | Insurance costs on the rise for small businesses |
| Science | | | 2 hours ago          1290 |
| | [20] Tweets   15 mins ago   BetaCorp.com BETA ANNOUNCES NEW PRODUCT LINE | | Strong sales for tablet computers predicted |
| Home & Leisure | [B] BetaPR – We are proud to announce our new product line. http:betacorp.com/press_release.html | | 3 hours ago          97 |
| Food | | | Green technology sector sees modest profits in Q1 |
| | | | 5 hours ago          333 |
| Green | | | Silver at all time high price |

FIG. 7

Joe's Space Blog | Sign In

NASA Unveils Latest Results From Lunar Mission, Helps Prepare for Next Stage of Scientific Discovery   1102

Tags: Lunar Reconnaissance Orbiter, Cameras

NASA's current mission in orbit around the moon, the Lunar Reconnaissance Orbiter, or LRO, has been providing crucial insights about our nearest celestial neighbor since its launch in June. At a scientific meeting today, researchers unveiled the latest findings from three instruments of the powerful suite of seven aboard the satellite. LRO is expected to return more data about the moon than all previous orbital missions combined.

At the American Geophysical Union meeting in San Francisco, scientists discussed the latest findings from the LRO Camera, or LROC, the Cosmic Ray Telescope for the Effects of Radiation, or CRaTER, and the Diviner Lunar Radiometer Experiment. Each instrument is returning surprising data and helping scientists map the moon in incredible detail and understand the lunar environment.

LROC has now mapped in high resolution all the Apollo landing sites and 50 sites that were identified by NASA's Constellation Program to be representative of the wide range of terrains present on the moon.

"From a practical, scientific standpoint, the Apollo landing sites have served as a fantastic source of calibration for the LROC Narrow Angle Cameras," said Mark Robinson, LROC principal investigator at Arizona State University in Tempe. "Since the locations of some of the hardware left by the astronauts are known to about nine feet absolute accuracy, we can tie the Narrow Angle Camera geometric and timing calibration to the coordinates of the Apollo Laser Ranging Retroreflectors and Apollo Lunar Surface Experiments Packages. This ground truth enables more accurate coordinates to be derived for virtually anywhere on the moon. Scientists are currently analyzing brightness differences of the surface material stirred up by the Apollo astronauts, comparing them with the local surroundings to estimate physical properties of the surface material. Such analyses will provide critical information for interpreting remote sensing data from LRO, as well as from India's Chandrayaan-1, and Japan's Kaguya missions."

. . .

Comments aly22  This is great! I want to be a spaceman! Their helmets are super cool.

| ID | Textual Representation | Concept | Score ⌒1502 | Concept ID |
|---|---|---|---|---|
| [01] | Lunar Reconnaissance Orbiter | Lunar Reconnaissance Orbiter | 0.6042296290039764 | 2381014 |

Feature Vector
TitleTF=0, BodyTF=1, NLP=1, IDF=1655, DocSim=2.26767, Case=3, Position=154, NumWords=3, Homonyms=0,...

...

| ID | Textual Representation | Concept | Score ⌒1504 | Concept ID |
|---|---|---|---|---|
| [24] | scientific meeting | academic conference | 0.0768521353602409 | 118760 |

Feature Vector
TitleTF=0, BodyTF=1, NLP=0.75, IDF=9759, DocSim=0.0255364, Case=0, Position=298, NumWords=2, Homonyms=0, ...

FIG. 15

1902 — ... | Car Manufacturers | Transportation | 20
1904 — Transportation | Society | 20
          ...
1906 — Honda | Car Manufacturers | 10
1908 — Honda Civic | Honda | 10
1910 — Honda Civic RX | Honda Civic | 10
1912 — Car Manufacturers | Kosmix Autos | 5
          ...

FIG. 19A

```
Kosmix Root      :: 000000
Kosmix Autos     :: 000001
Kosmix Nature    :: 000002
Kosmix Health    :: 000003
...
Jaguar_animal    :: 103816
Rabbit           :: 103817
...
Honda Civic RX   :: 938173
...
```

FIG. 19B

Jaguar | Jaguar_car | 20 | {hom}
Jaguar | Jaguar_animal | 20 | {hom}
Jaguar | Mac OS Jaguar | ... 
...
Puma | Cougar | 20 | {syn}
Mountain Lion | Cougar | 20 | {syn}
Panther | Cougar | 20 | {syn}

FIG. 19C

1980 — Parent:Countries by Continent 1 3
1982 — Parent:Living People          -1 1

FIG. 19D

```
              2106 2108  2110 2112    2114       2116   2118  2120
 2102  2104
  ...
  Ronald Reagan:U.S. President   var:3 vcor:0 tmpl:1 stree:0 arcrnk:15 occ:m pocc:w cooc:y
  Ronald Reagan:Actor            var:3 vcor:0 tmpl:0 stree:0 arcrnk:15 occ:m pocc:x cooc:z
  ...
```

FIG. 21

Updater Class 3500

Attributes subscription;
publication;

Methods createSlate (Event event);
init (Slate slate);
update (Event event, Slate slate);
finalize (Slate slate);
subscribe (int streamid);
publish (int streamid, Event event);

*Figure 35*

PROCESSING DATA FEEDS

RELATED APPLICATIONS

This application is a continuation-in-part of and claims priority to U.S. patent application Ser. No. 13/106,706 entitled "Processing Data Feeds," filed May 12, 2011. U.S. patent application Ser. No. 13/106,706, filed May 12, 2011, in turn, claims priority to U.S. Provisional Patent Application No. 61/345,252 entitled "Content Feed," filed May 17, 2010, and to U.S. Provisional Patent Application No. 61/415,282 entitled "Managing Real-Time Data Streams," filed Nov. 18, 2010. The instant application also claims priority to U.S. Provisional Patent Application No. 61/415,279 entitled "Social Genome," filed Nov. 18, 2010. The instant application is also related to a U.S. non-provisional patent application Ser. No. 13/300,519 entitled "Social Genome," filed Nov. 18, 2011, a U.S. non-provisional patent application Ser. No. 13/300,523 entitled "Real-time Analytics of Streaming Data," filed Nov. 18, 2011, and a U.S. non-provisional patent application Ser. No. 13/300,473 entitled "Methods, Systems and Devices for Recommending Products and Services," filed Nov. 18, 2011. The entire contents of each of the above-referenced applications are incorporated herein in their entirety by reference.

BACKGROUND

Individuals are increasingly consuming content from social networking services and other information sources that update very frequently. Unfortunately, it can be difficult to locate content of interest in those sources, due to reasons such as the sheer volume of content available and the speed with which new content is made available.

SUMMARY

Exemplary embodiments provide devices, systems and methods for performing large-scale long-running stream computations on real-time data streams using one or more map operation and/or one or more update operations. A map operation is a stream computation in which stream events in one or more real-time data streams are processed in a real-time manner to generate zero, one or more new stream events. An update operation is a stream computation in which stream events in one or more real-time data streams are processed in a real-time manner to create or update one or more static "slate" data structures that are stored in a durable disk storage in a persistent manner.

In accordance with another exemplary embodiment, a computer-implemented method is provided for processing of real-time data streams. The method includes receiving in a real-time manner, at a first worker process running on a first computational device, a first stream event in a first real-time data stream. The method includes processing in a real-time manner, at the first worker process at the first computational device, the first stream event in a first map operation to generate first output data. The method includes transforming the first output data, at the first worker process at the first computational device, to generate a second stream event corresponding to the first stream event and comprising the first output data. The method includes transmitting the second stream event in a real-time manner using the first worker process at the first computational device.

In accordance with another exemplary embodiment, a computer-implemented method is provided for processing of real-time data streams. The method includes receiving in a real-time manner, at a first worker process running on a first computational device, a first stream event in a first real-time data stream, the first stream event comprising first input data. The method includes processing in a real-time manner, at the first worker process at the first computational device, the first input data contained in the first stream event in a first update operation to generate first output data. The method includes transforming the first output data, at the first worker process at the first computational device, to generate or update a first data structure associated with the first input data. The method includes storing the first data structure on a durable storage device.

In accordance with another exemplary embodiment, a computer-implemented method is provided for processing of real-time data streams. The method includes receiving in a real-time manner, at a first worker process, a first input stream event in a first real-time input data stream comprising a plurality of stream events; processing in a real-time manner, at the first worker process, the first input stream event in a first map operation to generate first intermediate output data; generating, at the first worker process, a first intermediate stream event corresponding to the first input stream event and comprising the first intermediate output data; and transmitting, using the first worker process, the first intermediate stream event in a first real-time intermediate data stream in a real-time manner. The method also includes receiving in a real-time manner, at a second worker process, the first intermediate stream event in the first real-time intermediate data stream; processing in a real-time manner, at the second worker process, the first intermediate output data in the first intermediate stream event in a first update operation to generate first final output data; and storing the first final output data in a first data structure associated with the first intermediate output data on a storage device.

In accordance with another exemplary embodiment, a distributed computational system is provided. The system includes a computer-readable storage device for storing computer-executable code associated with a first map operation and a first update operation, and for storing static data output by the first update operation. The system includes a scheduling module for scheduling the first map operation to run on a first worker node and the first update operation to run on a second worker node. The system also includes the first and second worker nodes. The first worker node is programmed to receive in a real-time manner a first input stream event in a first real-time input data stream comprising a plurality of stream events, run the first map operation to process in a real-time manner the first input stream event to generate first intermediate output data, generate a first intermediate stream event corresponding to the first input stream event and comprising the first intermediate output data, and transmit the first intermediate stream event in a first real-time intermediate data stream in a real-time manner. The second worker node is programmed to receive in a real-time manner the first intermediate stream event in the first real-time intermediate data stream, run the first update operation to process in a real-time manner the first intermediate output data in the first intermediate stream event to generate first final output data, and store the first final output data in a first data structure associated with the first intermediate output data on the storage device.

In accordance with another exemplary embodiment, one or more non-transitory computer-readable media having encoded thereon computer-executable instructions for performing a method for processing real-time data streams. The method includes receiving in a real-time manner, at a first worker process, a first input stream event in a first real-time input data stream comprising a plurality of stream events;

processing in a real-time manner, at the first worker process, the first input stream event in a first map operation to generate first intermediate output data; generating, at the first worker process, a first intermediate stream event corresponding to the first input stream event and comprising the first intermediate output data; and transmitting, using the first worker process, the first intermediate stream event in a first real-time intermediate data stream in a real-time manner. The method also includes receiving in a real-time manner, at a second worker process, the first intermediate stream event in the first real-time intermediate data stream; processing in a real-time manner, at the second worker process, the first intermediate output data in the first intermediate stream event in a first update operation to generate first final output data; and storing the first final output data in a first data structure associated with the first intermediate output data on a storage device.

BRIEF DESCRIPTION OF THE DRAWINGS

The foregoing and other objects, aspects, features and advantages of exemplary embodiments will be more fully understood from the following description when read together with the accompanying drawings, in which:

FIG. 2A illustrates an example of a tweet.

FIG. 2B illustrates an example of a portion of a JSON object.

FIG. 3 illustrates an example of a portion of a JSON object.

FIG. 7 illustrates an example of an interface.

FIG. 11 illustrates an example of a document.

FIG. 15 illustrates an example of a portion of output generated by a document processing engine.

FIG. 19A is a portion of an arc list according to one embodiment.

FIG. 19B is a portion of a vertex list according to one embodiment.

FIG. 19C is a portion of an arc list according to one embodiment.

FIG. 19D is a portion of a subtree preferences list according to one embodiment.

FIG. 21 illustrates an example of a vector of weights according to one embodiment.

FIG. 35 is a block diagram representing an exemplary object-oriented class implementation of a generic update operation.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
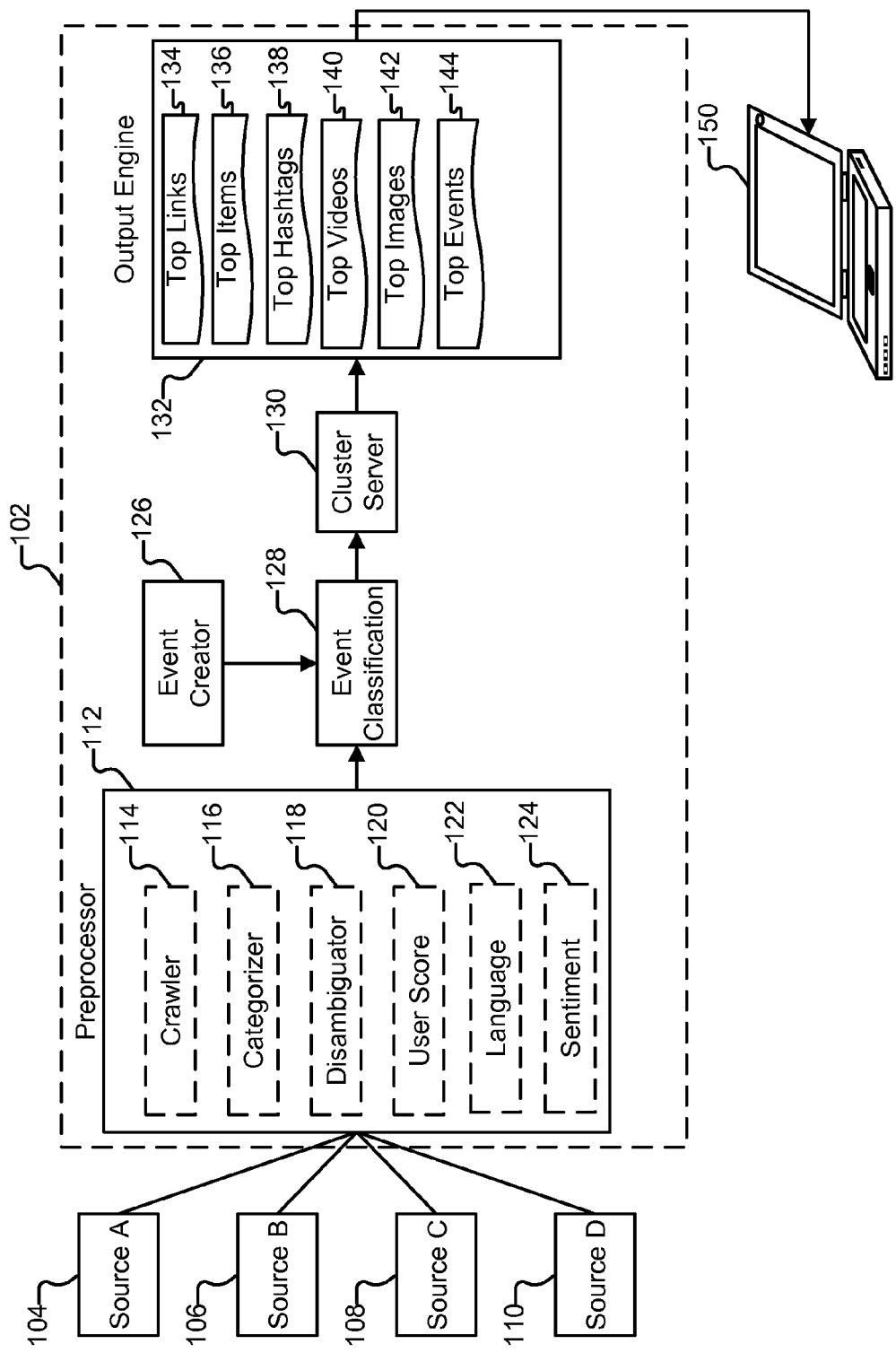
FIG. 1 illustrates an example of an environment in which data is processed.

FIG. 1 illustrates an example of an environment in which data is processed. As will be described in more detail below, system 102 accepts input from a variety of sources. One example source is a real-time stream of messages provided by a social networking service. A "tweet" provided by the Twitter service is an example of an item of data received by system 102. System 102 performs various processing on the received data, such as categorizing each of the received items, determining whether the received items pertain to a specific event, clustering substantially similar items together into clusters, and making available as output processed data that can be consumed by a variety of different interfaces.

In some embodiments, system 102 is a commodity personal computer or other consumer electronic device. In that scenario, the output of system 102 is made available to a user of the device, such as through an incorporated display, or is provided to a display of a second device in communication with system 102. In other embodiments, system 102 is a single server or one of a small number of servers acting in cooperation. For example, publishing entities such as newspapers, and other organizations may each operate a system 102 for the benefit of employees, subscribers, or other customers. In yet other embodiments, system 102 comprises a distributed, elastic architecture, an example of which is described in more detail below, such as in the section titled MANAGING REAL-TIME DATA STREAMS.

Whenever system 102 is described as performing a task, either a single component or a subset of components or all components of system 102 may cooperate to perform the task. Similarly, whenever a component of system 102 is described as performing a task, a subcomponent may perform the task and/or the component may perform the task in conjunction with other components. In various embodiments, portions of system 102 are provided by one or more third parties. Depending on factors such as the amount of computing resources available to system 102, various logical components and/or features of system 102 may be omitted and the techniques described herein adapted accordingly. Similarly, additional logical components/features can be added to system 102 as applicable, such as ones providing additional or alternate ways of processing incoming data and ones making available different types of output. Additional detail on elements depicted in FIG. 1 will now be provided, including examples of how such elements would process tweet data. System 102 can process a variety of data and is not limited to the examples provided.

Preprocessing Engine

Input from various sources 104-110 is ingested by system 102. Example sources include Twitter (twitter.com), Facebook (facebook.com), foursquare (foursquare.com), and other social networking sites; Flickr (flickr.com) and other media hosting services; Digg (digg.com) and other social news websites; traditional news websites; RSS Feeds; and financial transaction information. System 102 is configured to access data from the various sources using appropriate techniques, including through application programming interfaces (APIs), crawling, performing standing searches, and the pushing/pulling of new items, such as via RSS.

Items of data are provided by sources 104-110 to system 102 in a variety of different formats, such as in XML, JSON, and HTML. Examples of items include tweets, updates, articles, RSS feed entries, news articles, reviews, deals, and financial transactions. Preprocessor 112 is configured to standardize each item of incoming data into a JSON object and to augment the contents of the JSON object with more key-value pairs by performing additional processing through the use of one or more modules 114-124.

FIG. 2A illustrates an example of a tweet. Tweet 200 is rendered as it could appear to an end user of www.twitter.com who accesses the service using a web browser or dedicated application, such as on a mobile device.

FIG. 2B illustrates an example of a portion of a JSON object. The example shown is a representation of data corresponding to tweet 200 received from source 104, after initial processing and standardization by preprocessor 112. Some examples of the attributes/parameters included in the JSON object are: the full text of the tweet ("text" 202); the time the tweet was created ("created_at" 204); whether the tweet was a favorite ("favorited" 206); a unique identifier of the tweet ("id" 208); whether the tweet is in reply to another, and if so, that user's screen name ("in_reply_to_screen_name" 210); and profile information for the author of the tweet ("user" 212), such as the screen name of the author ("screen_name" 214). Other types of items, such as Facebook updates and financial transactions can also be represented in JSON objects (or in any other appropriate format) with applicable key-value pairs, one example of which is a source type (e.g., indicating that the received information is a tweet or is a transaction).

In various embodiments, in addition to standardizing information received from a source such as source 104, preprocessor 112 is configured to augment the JSON object contents by performing additional processing. In some embodiments, the additional processing is performed by modules, such as modules 114-122.

Language Module

Language module 122 is configured to determine the language (e.g., English or Japanese) of an item or content associated with an item. In the example shown in FIG. 2B, a language associated with a profile of the author of tweet 200 is provided by source 104 (at 216). In such a scenario, the processing of language module 122 can be omitted, or can be used to confirm that a particular tweet is indeed in the expected language. For other sources, such as RSS feeds, an associated language may not be provided by the source and language module 122 is configured to determine the language of the item and include the determined language in the JSON object of the item. Language module 122 can also be used to determine the language of information crawled by crawler 114, as applicable.

Sentiment Analysis Module

Sentiment analysis module 124 is configured to determine a sentiment (e.g., positive or negative) associated with the item, if applicable, and store the sentiment in the JSON object.

User Importance Score Module

User importance score module 120 is configured to determine an importance score for the author of the item (or, e.g., in the case of a financial transaction, a party to the transaction) and to include that score in the JSON object. A variety of factors can be used to compute a user importance score. And, over time, a user's importance score can change. The following are examples of factors which can be used in computing an importance score of a given Twitter user:

(1) The number of other users that follow the user. The more followers, the higher the score.

(2) When that user generates content, such as by writing a tweet or posting an update, how much additional traffic is generated (e.g., how many retweets and/or replies occur).

(3) Is the user a publisher-only account (e.g., belonging to ACME News). Such accounts can be identified (among other ways) based on factors, such as that they rarely, if ever, retweet; they rarely, if ever, respond to other users; and that they have many followers but follow very few, if any, other users.

(4) The frequency with which the user tweets an item that is ultimately associated with an event that is determined to be a top event.

(5) The frequency with which the user is the first to tweet an article.

(6) The importance scores of the users who are following this user.

(7) The importance scores of the users this user is following.

(8) The importance scores of the users who retweet tweets by this user.

(9) The importance scores of the users whose tweets this user retweets.

In some embodiments, factors such as those listed above are used to determine the relative importance of any two users. The comparisons can be used to construct a hierarchy of user importances, once an equilibrium is reached. As one example, suppose all users are assigned a seed rank of 1000. Each time a user retweets an item, the rank of the original tweeter is increased by epsilon and the rank of the retweeting user is decremented by epsilon. Other signals can be used in a similar way. For example, when one user follows another, then the person who is followed could be awarded a higher score based on the score of the person who is following. Additional techniques for computing a user importance score are provided below, such as in the section titled MANAGING REAL-TIME DATA STREAMS.

Crawler Module

Whenever preprocessor 112 detects the presence of a URL in an item, such as is present in tweet 200, it instructs crawler module 114 to crawl that URL and to provide back information such as the title of the crawled page, the full text of the crawled page, and a list of images on the crawled page. Other metadata, such as the list of keywords or tags associated with a blog post are also collected by crawler 114. Each of the pieces of information obtained by crawler 114 is included in the JSON object as a name-value pair.

Categorizer Module

Categorizer 116 is configured to categorize the tweet, and also to categorize content obtained by crawler 114. Categorization techniques are described in more detail below, such as in the section titled TAGGING A DOCUMENT. The categorization information is included in the JSON object as a series of tags (e.g., "Sports"), scores (e.g., "Volleyball=0.999"), or a combination thereof.

Disambiguator Module

In some cases, the meaning of a tweet may be ambiguous. For example, a tweet that says, "I want to buy an apple," could mean that the author is hungry and wishes to purchase a piece of fruit. The tweet could also indicate that the author desires to purchase a computer or consumer electronic device. As another example, a tweet of "Earthquakes!" could refer to the author experiencing an earthquake or could refer, for example, to the author's support of the San Jose soccer team. Techniques for resolving ambiguities are described below in the section titled TAGGING A DOCUMENT, and are performed in some embodiments by categorizer module 116, by disambiguator 118, or both modules.

In some embodiments, if categorizer 116 is unable to resolve ambiguities (such as the meaning of "apple" in the example given above), categorizer 116 includes tags for all possible meanings in the JSON object. For example, categorizer 116 might generate tags of "Apple (Fruit)," "APPLE (Satellite)," "Apple Mac (Computer)," and "Apple Inc." for the tweet text "I want to buy an apple." Categorizer 116 might similarly generate tags of "Japan Earthquake," "Haiti Earthquake," "Earthquakes," "San Jose Earthquakes (Soccer Team)," and "Earth Quake (Musical Group)" for the tweet text "Earthquake!" Disambiguator module 118 can be used to resolve such ambiguous meanings through additional context, such as user profile information, historical information, and location information.

System 102 maintains two dictionaries for each of the following: every Twitter user; every hashtag (e.g., # dogs); every domain (e.g., example.com); every concept; and every word. The first dictionary for each is a list of words used by that user (or words that co-occur with the hashtag, words that co-occur with the domain, words that co-occur in a tweet that has been assigned a given concept, and words that co-occur within tweets). The second dictionary is a list of concepts that the user's tweets are tagged with (or concepts assigned to tweets that include a given hashtag, concepts assigned to tweets that include a given domain, concepts that co-occur, and concepts that are assigned to a tweet that includes a given word). In some embodiments, both types of dictionaries maintain only the top n words (or concepts), instead of an exhaustive list of all words (or concepts). One approach to storing the dictionaries is to store each dictionary as a slate, described in more detail below in the section titled MANAGING REAL-TIME DATA STREAMS.

One way to resolve the ambiguous meaning of "apple" in the example tweet provided above, is to analyze the appropriate dictionaries (e.g., for the user posting the tweet). If other tweets made by the user frequently are tagged with food-related concepts, an assumption can be made that "I want to buy an apple" pertains to the purchase of fruit. As another example, if a previous tweet by the user includes the domain apple.com, an assumption can be made that "I want to buy an apple" pertains to the purchase of a computer or other device. In the case of the "Earthquake!" tweet, if the author is located in San Jose or if a soccer game featuring the San Jose Earthquakes is taking place, an assumption can be made that the tweet pertains to the soccer team, while if the author is located in Japan, works for the Red Cross, or sometimes tweets in Japanese, an assumption can be made that the tweet pertains to the March 2011 earthquake.

If disambiguator 118 is able to resolve an ambiguity, it updates the tags included in the JSON object. For example, if it is determined that a tweet is about the purchase of fruit, disambiguator 118 would remove the tag "Apple Inc." from the JSON object. Disambiguator 118 can also add additional tags to the JSON object as applicable.

FIG. 3 illustrates an example of a portion of a JSON object. The example shown illustrates examples of additional attributes included in the object shown in FIG. 2B by preprocessor 112. Specifically, a user importance score has been added for the author ("kosmix_rank" 302); a set of concepts determined by categorizer 116 and refined by disambiguator 118 as applicable are included ("kosmix_tags" 304); and the language of the tweet has been confirmed as English ("kosmix_lang" 306). Also included is a section (308) for information obtained by crawler 114. For example, a title of the page accessible via the URL ("title" 310), a snippet of text from the page ("snippet" 312), and the URLs of the pictures appearing on the page ("URL" 314 and 316). Other information is also included, such as the URL as it appears in the tweet ("short_url" 318), the long form of the URL ("long_url" 320), and a designation of image 316 as being the representative image for the tweet ("best_image" 322). Other information can also be included in region 308, such as the language of the crawled page and categorization information for the crawled page.

Event Creator

Event creator 126 is configured to provide to event classifier 128 a set of event definitions. The event definitions can be created by a human through an interface, can be automatically created, and can be created by a combination of the two. The event definitions can also be updated over time.

One example of an event is a news event, such as an earthquake occurring. A human administrator, aware that the earthquake has occurred, can use a provided interface to create a definition for the event. Specifically, the administrator would indicate a title for the event (e.g., "Earthquake in Japan") and include other information that defines the event, such as any of the following:

(1) a set of positive concepts/tags (e.g., "Earthquake" and "Japan")

(2) a set of positive words (e.g., "Oshika Peninsula" and "9.0")

(3) a set of negative concepts and/or words which, if present in an item, indicate that it does not pertain to the event (3) particular users (e.g., the Twitter account of a particular Japanese newspaper or the account of a particular reporter or celebrity involved in an event)

(4) particular hashtags (e.g., #Jishin)

(5) location information (e.g., GPS coordinates or place names)

(6) a text description of the event (7) pictures and/or videos that pertain to the event Other information, such as a start and end time of the event can also be specified. Some events, such as sporting events, may have predefined start and end times. Other events may have a defined start time, and then have an end time automatically generated as interest in the event wanes. Some events (e.g., pertaining to the President of the United States or popular celebrities) may not have clear start or end times but are instead "evergreen." In some embodiments, when the end time for an event has passed, items will no longer be able to be classified by event classifier 128 as pertaining to that event.

In some embodiments, at least some of the above information is automatically collected by system 102 and presented to an administrator as a proposed/potential event. For example, system 102 can be configured to detect when groups of words or other things (such as hashtags) co-occur with a frequency that is higher than usual. An increased co-occurrence (e.g., of the terms "Japan" and "earthquake") can indicate that a newsworthy event is occurring and that information can be surfaced to an administrator for review. Co-occurring contexts are also indicators. For example, if several people in the same approximate location at the same approximate time tweet "fire" or "crash," it is likely that an event is occurring at that location/time. The administrator can approve or disapprove the proposed event, and can make changes, such as by providing a title and refining the event definition.

Hierarchical Events

In some embodiments, events are organized into a hierarchy. Using the Mar. 11, 2011 earthquake in Japan as an example, the earthquake itself would be at the top of the hierarchy. Other events, such as the resulting tsunami, destruction at the Fukushima Nuclear Power Plant, and press conferences by the Prime Minister are examples of sub-events that would be organized into the hierarchy. Periodically, operations to merge events (because they are connected) or split events occur. For example, in the case of the earthquake, events such as the tsunami might originally be part of the main event, but subsequently be split out into events of their own.

Event Classification

Event classifier 128 is configured to determine whether a given item corresponds to one of the events for which it has received a definition from event creator 126. In some embodiments, classification is performed as follows.

The event classifier maintains a vector of currently "live" events—those events for which an end time has not passed. Event classifier 128 receives processed items (e.g., JSON objects) from preprocessor 112. The classifier computes a similarity metric between the processed item and each of the definitions of the live stories to determine a probability of match. If the probability exceeds a threshold, the item is tagged with the event (e.g., a unique identifier of the event), as yet another name-value pair. If the item matches with multiple events, the item is tagged with each of those events. If the item does not match any events, no additional tags are added by classifier 128, or a tag of "no event matches" or other appropriate tag(s) are added.

Cluster Server

Cluster server 130 is configured (1) to cluster multiple processed items together into a cluster definition and (2) to evaluate (and re-evaluate) the cluster, such as by assigning one or more scores to the cluster. For a given item, many hundreds of other items (or more) may be received by system 102 that are identical or substantially the same. As one example, tweet 200 may be retweeted by thousands of other users (each of which would be ingested by system 102 as a separate item). Cluster server 130 is configured to group the original tweet and all of the retweets together into a single new JSON object that represents the cluster (also referred to as the "cluster object") and provide the cluster as output, such as to output engine 132. As another example, many users may tweet identical messages ("Smith scored a goal!") or substantially similar messages (e.g., all of which include the same URL, or which match within a tolerance). Yet another example is a set of tweets in response to one another—forming a conversation. Cluster server 130 can similarly be configured to cluster those respective items. For a given event (e.g., as determined by event creator 126), multiple clusters can exist.

When cluster server 130 receives an object from event classifier 128, it determines whether the object should be included in an existing cluster (because it is identical to or substantially similar to a previously received object). If the object does not match with an existing cluster, a new cluster is created, with the received object serving as the first item included in the cluster. The other information included in the item's JSON object, such as the information illustrated in FIGS. 2B and 3, is included in the newly created cluster object. If the received item does match an existing cluster, the cluster is updated to include an identifier of the item and other information, such as the cluster's score and representative information is re-evaluated as described in more detail below. Either the newly created cluster object, or the updated cluster object, as applicable, is provided as output to output engine 132.

Cluster Score

System 102 maintains, for each cluster, a variety of statistics, including how many items have been included in the cluster, representative information for the cluster, and one or more quality measures for the cluster. Examples of representative information include the first item to be included in the cluster (i.e., tweet 200), the most recently received item (i.e., the most recently received retweet of tweet 200), the tweet whose author has the highest user importance score, and one or more photographs, videos, or other media representative of the cluster. In the case of a cluster formed around tweet 200, a representative image might be selected from the information obtained by crawler 114 (e.g., a photograph appearing in the linked-to article). The representative information of a cluster is re-evaluated each time a new item is included in the cluster. Thus, if a retweet of tweet 200 is received from a user who has a higher user importance score than any of the user importance scores of the already-included items, the newly received tweet will be designated as a representative tweet for the cluster, replacing the item with the previously highest associated user importance score. In various embodiments, administrators or other individuals are able to manually supplement or override the representative information of a cluster, such as through an interface provided by system 102.

Examples of quality measures of a cluster include:
(1) the user importance score of the first item in the cluster
(2) the sum of the user importance scores of the authors of each of the items included in the cluster
(3) the highest user importance score of the authors of the items included in the cluster
(4) how many items are included in the cluster
(5) does the cluster include images, videos, or other media
(6) do the clustered items include a URL, and if so, what is the importance of the URL's domain (e.g., with URLs to national newspapers having higher scores than personal blogs)
(7) how quickly are new items being received by system 102 that are included in the cluster, and is that rate increasing or decreasing
(8) user feedback The various signals listed above can be combined into one or more cluster scores that indicate the importance of a given cluster. In some embodiments, the cluster score is included in the cluster object as a name-value pair, prior to transmission to output engine 132.

Output Engine

Output engine 132 maintains, for every event created by event creator 126, various top n lists, such as the most popular links associated with the event (134), the most popular clusters associated with the event (136), the most popular hashtags associated with the event (138), the most popular videos associated with the event (140), and the most popular images associated with the event (142). Output engine 132 also maintains various global lists, such as the most popular events (144). In some embodiments, the lists are maintained as slates and are updated in real-time by workers, described in more detail below. Whenever output engine 132 receives a cluster from cluster server 130, the respective workers determine whether any of the lists need to be updated. Historical information about each of the lists is also preserved, allowing for the given top n of an event to be determined for a particular time slice.

Lists 134-142 are just some of the examples of data that can be maintained by output engine 132. Output engine 132 can also maintain top n lists for other data as well. For example, output engine 132 can maintain, for a given Twitter user, the most popular items; for a given location, the most popular items; for a given concept the most popular videos or other media; and for a given domain, the Twitter users that most frequently mention the domain. Output engine 132 may also make use of intermediate slates/workers.

The information managed by output engine 132 can be exposed in a variety of ways, such as through an interface provided by device 150. Various examples of such interfaces are provided in more detail below. In the example shown, device 150 is a personal computer. Other devices can also be used in conjunction with the techniques described herein, such as cellular phones/personal digital assistants, tablet computers, game consoles, Internet-connected appliances such as picture frames and refrigerators, and set-top boxes.

Figure 4:
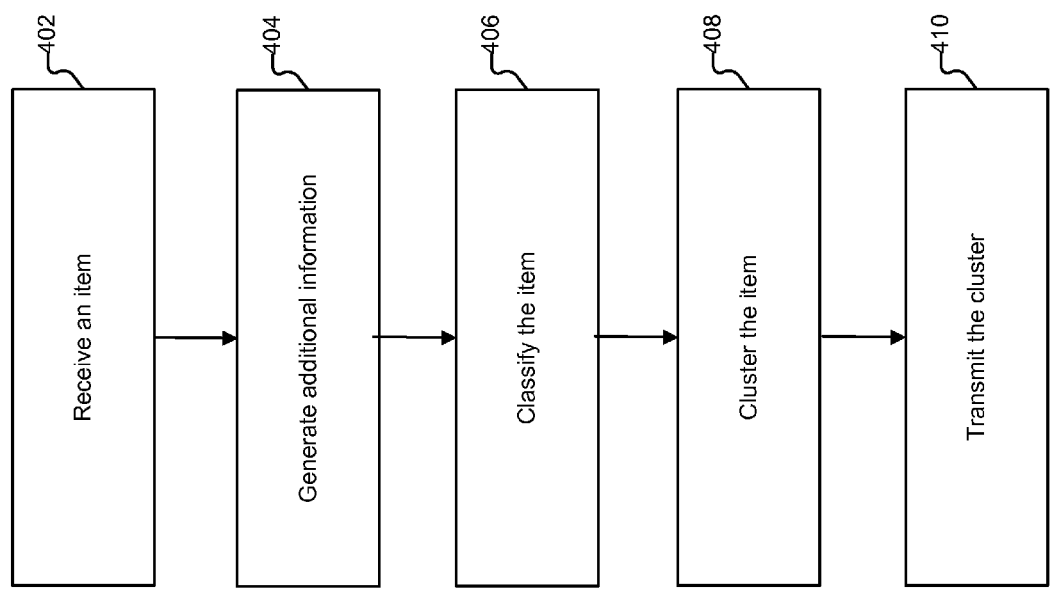
FIG. 4 illustrates an embodiment of a process for processing an item.

FIG. 4 illustrates an embodiment of a process for processing an item. In some embodiments, the process shown in FIG. 4 is performed by system 102. The process begins at 402 when an item is received. As one example, an item (such as tweet 200) is received at 402 by preprocessor 112. At 404, additional information is generated. As one example, at 404, various modules 114-124 augment the contents of a JSON object corresponding to the item. At 406, the item is classified. As one example, at 406, event classifier 128 determines one or more events to which the item pertains. At 408, the item is clustered. As one example, at 408, cluster server 130 determines whether the item is identical to or substantially similar to any previously received items and if so, clusters the items. Finally, at 410, at least a portion of the cluster is transmitted. As one example, at 410, a portion of the cluster is transmitted to a device that includes a display.

Example User Interfaces

Figure 5:
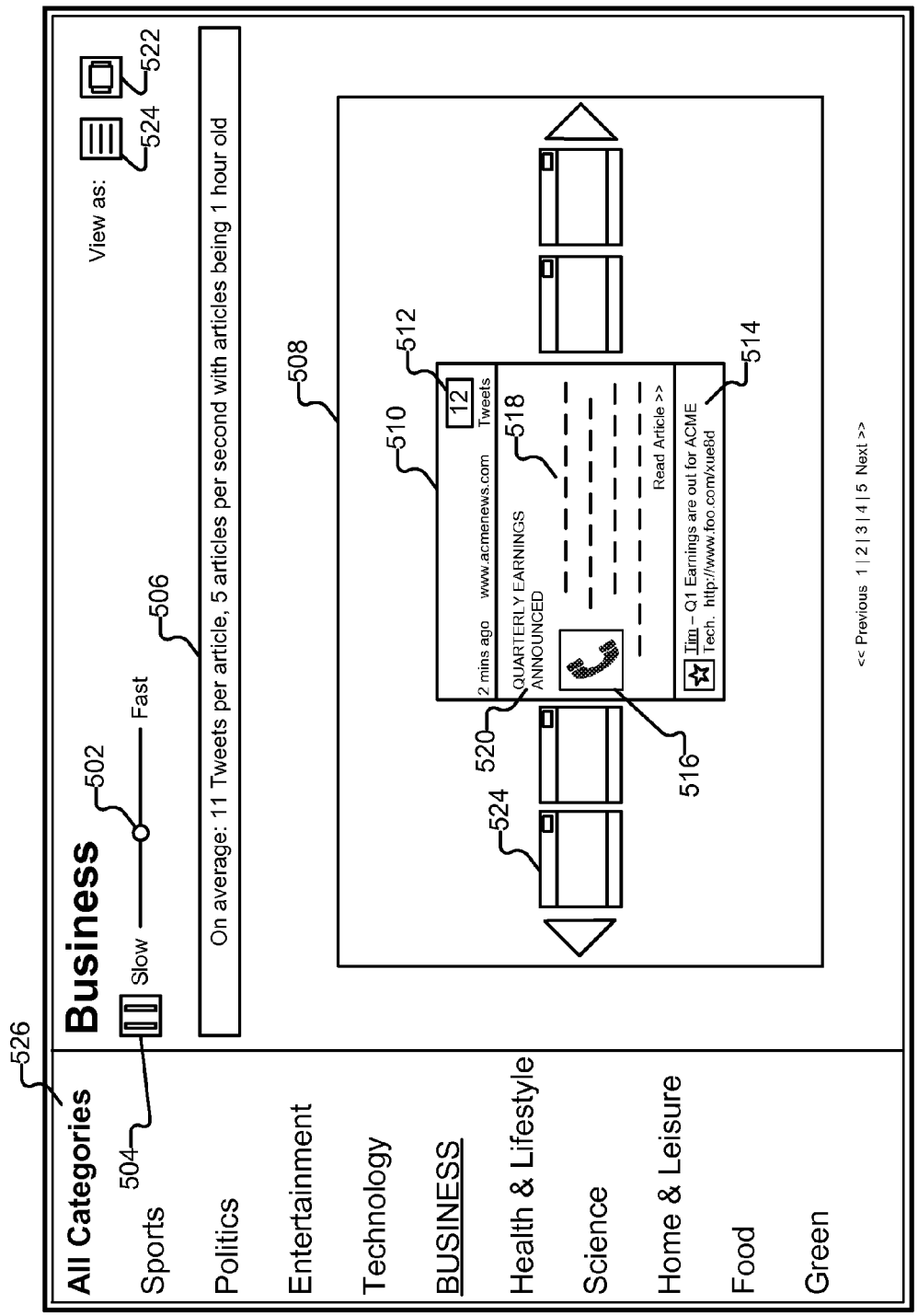
FIG. 5 illustrates an example of an interface.
Figure 6:
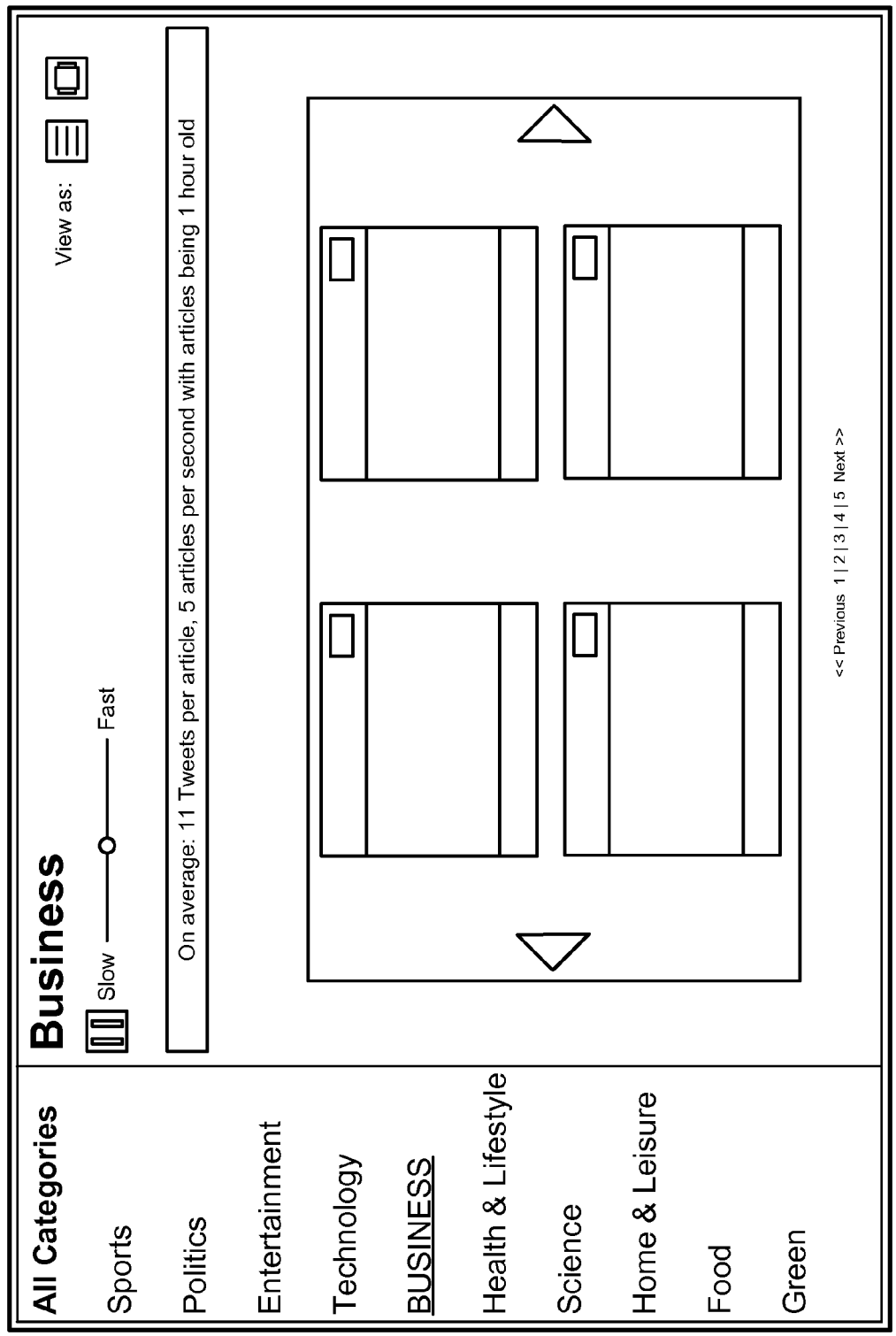
FIG. 6 illustrates an example of an interface.

FIGS. 5-7 each illustrate examples of interfaces that can be used to display information. Elements of the interfaces shown in FIGS. 5-7 are provided by output engine 132. In FIG. 5, a user of device 150 is viewing business-related clusterg. The user can adjust the speed with which clusters are displayed by manipulating speed control 502 and can also pause the display of new clusters by selecting button 504. Statistics (506) about the clusters being shown in region 508 are also provided.

Element 510 of the interface shown in FIG. 5 is a representation of a cluster. Included in the representation is the total number of items in the cluster (512) (e.g., the number of items received by system 102 and clustered together by cluster server 130). Also included in element 510 is a copy of the representative item of the cluster (tweet 514), a representative image (516), and other information obtained from crawler 114 or specified by an administrator, such as description (518) and title (520). Which tweet is shown in representation 510 is selectable, such as by system 102, by device 150, or by another appropriate selector. For example, instead of showing the tweet from the user with the highest user importance score, the first tweet or most recent retweet could be shown instead.

The interface shown is an example of a slideshow view, selectable by a user by clicking on button 522. Other clusters, such as cluster 524, will scroll by (resizing as applicable) at the speed selected by the user.

FIG. 6 illustrates an alternate embodiment of the slideshow interface shown in FIG. 5. As illustrated in FIG. 6, multiple clusters are shown in the same size, at the same time, instead of one cluster being made more prominent.

In FIG. 7, a viewer of the interface shown in FIG. 5 has clicked on button 524 and been presented with a list view of clusters. Specifically, cluster 510 is shown in a more condensed form (702), with description 518 and representative image 516 omitted. Also included in the interface shown in FIG. 7 is a list (704) of the top stories of the day.

Additional details on various aspects of interfaces which can be used in conjunction with the techniques described herein will now be provided.

Channels

In the example interfaces shown in FIGS. 5-7, users are able to view clusters across all categories and can also narrow the clusters they are presented with to pre-selected high level categories, such as Sports and Politics. In various embodiments, users are able to specify finer grained topic preferences (e.g., California Politics) and can also create arbitrary channels that precisely define the requirements for clusters to be included for display. For example, a user can specify a channel in which clusters must be tagged with either Sports or Business and can also specify a channel in which clusters must be tagged with both Finance and Semiconductors.

Clusters need not be built based on topics (or combinations of topics) but can instead be based on any of the data stored in item objects, cluster objects, or otherwise tracked by system 102, such as by output engine 132. For example, a user can subscribe to a channel of popular links (irrespective of category), a channel of popular business videos, a channel that includes any stories about earthquakes that are written in Japanese or Spanish, and a channel for a specific story (e.g., relating to the Prime Minister of Japan's speech). Another example of a channel is a custom "deal" channel. Suppose a user is in the market for a television. Using the techniques described herein, the user can subscribe to a "40 inch plasma tv sale" channel.

In some embodiments, channels are defined at least in part on the capabilities of the display device, and can be specified without the need for configuration by an end user of the device. As one example, an Internet connected picture frame can be configured to display a channel constructed from all clusters that include images of a minimum (or maximum) size and/or resolution.

Yet another example of a channel is a location-based one. Suppose a user is riding on a commuter train. The user's phone can report the user's location to system 102 which in turn recognizes that the user is on the commuter train. If any items pertaining to the train are received by system 102, they can be provided to the user. A user in a car can similarly receive traffic updates, accident reports, traffic photos, accident photos, etc. as a channel. As yet another example, if a specific user's location is known (e.g., the user is on a train), a channel of "what other people on the same train are reading" can be made available to the user.

One or more channels can also be created automatically for a given user based on interests obtained by system 102 from a social networking site or other profiles of the user. The user's Twitter stream, blog posts, and other content can be examined by system 102 for hashtags and the content categorization techniques described herein can be applied to the content to discern topics of interest to the user.

Speed Control

If a user is viewing a channel that is sufficiently narrow in scope, such as one in which clusters are required to pertain to Astronomy-related events, the user will likely be able to read (or otherwise absorb) every cluster provided as output by output engine 132 at its natural speed. However, even with the clustering techniques described herein employed, for certain channels, such as the "All Categories" channel 526, the real time output of output engine 132 will likely include far more information than can be absorbed by an individual viewing that output in an interface. By manipulating control 502, the user is able to control how quickly new pieces of information are presented in an interface, such as interface 500. In some embodiments, the "slower" the control is set, the higher a given cluster's cluster score must be to be shown; the "faster" the control is set, the lower that a given cluster's cluster score must be to be shown. Thus, irrespective of what speed is selected by the user, the most important information will be shown. In other embodiments, other factors can also be used to adjust what information is presented in interface 500. For example, in some embodiments, the processing performed by cluster server 130 is performed simultaneously with the processing performed by output engine and/or is performed by device 150. The tolerances for what it means for two items to be "substantially similar" can be adjusted to be either more inclusive or less inclusive, thus resulting in either fewer, or more clusters to be displayed, respectively.

In some embodiments, stories are clustered using techniques similar to those described for the clustering of items. When viewing a channel such as the "All Categories" channel 526, at a slow speed, story clustering can be used to prevent several clusters associated with the same story to be presented in rapid succession. Story scores can also be used in a manner similar to the use of cluster scores described above.

Playback Controls

In the example interfaces shown in FIGS. 5-7, a pause button 504 is shown. In various embodiments, some or all of the following controls are made available in an interface.

PLAY: This is the default mode when the user views the interface. A stream of clusters for a channel selected by the user is displayed. In the absence of personalization, the global channel stream is provided.

PAUSE: When the pause button is selected, the channel's display is paused and a time marker is set. Clusters continue to be sent to the user's device until a buffer of the device is full. When the PLAY button is selected, the buffered clusters are shown to the user. Depending on speed settings, the user may see highlights for the lost period or the entire stream of clusters. If a particular event (or cluster) has changed while the user interface is paused (e.g., because the event grows in size or decays or splits/combines, or because the description or other representative information for the cluster has changes), in some embodiments, once the channel is unpaused, the current version of the event (or cluster) is displayed in place of the event (or cluster) as it stood when the stream was paused.

STOP: Stop receiving clusters.

REWIND: System 102 is configured to permanently store cluster and event information, as well as global information, thus allowing users to request the replay of various channels as they would have appeared at an arbitrary date and time. The user can specify an arbitrary speed with which the channel should be replayed, which can be different from a speed with which the user may have originally viewed the channel (if at all).

RECORD: A user can choose to record the channel stream on a device such as device 150. The user can also ask for the channel be recorded for a given time interval. In some embodiments, all the clusters in the stream will be recorded, thus giving the user an option to view the stream in varying levels of detail/speed during playback. In other cases (e.g., a device with constrained resources), only the specified level of detail is recorded. One example use of the record function is for a mobile device user to record one or more channels prior to boarding a flight. During the flight, the user can then play back the stored channel stream. The play back speed could be slow (i.e., to provide entertainment during the flight) or fast (i.e., to allow the user to be "caught up" with current events quickly). People interested in seeing how events unfold can also use record to review information, such as which news sites reported information first and how the information propagated to other sites.

FAST-FORWARD: While replaying a recording, the techniques described herein can be used to minimize the loss of information when the stream is replayed at a faster-than real time speed. Clicking on FAST-FORWARD will allow the user to view only the most-important clusters in the recording. Different speeds are supported (e.g., slow motion, 2×, 5×, etc.). If the stream is slowed down, fewer clusters will be displayed, but those clusters that are displayed will be more important than those that are not displayed.

Additional Uses of Location Information

An interface can be provided in which users indicate their location on a map and then are shown stories that are occurring nearby. As one example, in the event of a plane crash or a natural disaster, many nearby individuals may be tweeting about the event prior to national news sources. Further, the pictures that are received (e.g., of a volcano erupting or a rocket launch) can be aggregated into a "story in pictures" as it unfolds. A user nearby the incident may be interested in knowing about the story as soon as possible, while other users (e.g., across the country) may only be interested if/when the story is picked up nationally.

As another example, during the period of time that a trade show is occurring in Texas (i.e., during a designated start and end of the event as defined in event creator 126), a graphical user interface can depict where people are located when they tweet about the trade show (e.g., based on hashtags and other categorization information). For example, early in the evening, the individuals are at the tradeshow. Then they move to a particular vendor's party, as a large group. The individuals then break off into various smaller parties.

Additional Information on Cluster (and/or Event) Scoring

As explained above, a variety of signals can be used to determine a score indicative of the quality of a cluster (or story). In the case of the importance of domain, a single value can be used, such as a page rank or other score provided by a third party. Other features can also be used, such as how large the domain is, how often the domain breaks news, and how much traffic the domain receives. Another signal is the number of items in a cluster that came from reputable sources. Another signal is the composition of the cluster—how many items are tweets vs blog posts.

Importance can change over time. As a cluster grows, its importance grows. In some embodiments, a decay factor is applied. If nothing has changed for a given period of time, the contribution of dynamics to the cluster starts to decay. A history of the various importance scores of a cluster is recorded. Clusters may also "pick up steam" again after decaying. Since the trend data is known, and the causes are known (e.g., that in the last 10 minutes, 100 people tweeted something that was previously on the decline), the cluster may be shown again.

User feedback can also be employed. There are two kinds of user feedback—general feedback such as how often users collectively click on URLs—and personalized feedback (relating to how likely it is that a story will be of interest to a specific user, e.g., how often they click on entertainment stories). Collaborative filters can also be used to measure how often a group of users that are like an individual user click on a URL. Additional data sources, such as the user's profiles/history on various social networking sites and browser history, can be used in conjunction with user feedback signals. As one example, say a particular user's friend tweeted about an article. The cluster may be given a higher weight than it might otherwise receive due to the friend having taken that action.

Yet another type of signal relates to a predictive model. Given a particular entertainment story, and historical knowledge of how entertainment stories behave, a prediction can be made about a cluster associated with the story (e.g., how many tweets it is expected to have after 24 hours have elapsed). For example, history stories (i.e., about historical figures and places) tend to move slower than entertainment stories. If a history story is growing quickly, that information can be used as a factor in its importance. Stories that have higher predictive signals may be shown to users more quickly than those that do not. In one example embodiment, users are presented with "tomorrow's news today" user interface based on the signal. The interface can include a histogram of when various news sources are anticipated to pick up the story. As another example, suppose a very important person (e.g., a president) tweets infrequently. If that person tweets on a Monday evening, the predictive model anticipates that the tweet will be a popular news item within 8 hours. Instead of waiting for other sources to pick up the tweet, the story may be presented to users immediately.

The following is an example of a computation of a score calculation. In this example, signals include:

1. User signals: ranks of the users whose items are included in the cluster

2. Site signals: ranks of the domains of the URLs mentioned in the cluster

3. Dynamics signals: How many items are in the cluster and how fast did they arrive 4. Diversity signals: What ratio of the items are tweets, updates, blog posts, etc.

Example score formula: UserSignal*userSignalWeight+ SiteSignal*siteSignalWeight+ DynamicsSignal*dynamicSignalWeight+ DiversitySignal*diversitySignalWeight In various embodiments, the calculation is weighted based on the channel—scores change based on a channel and an interest.

Managing Real-Time Data Streams

Figure 8:
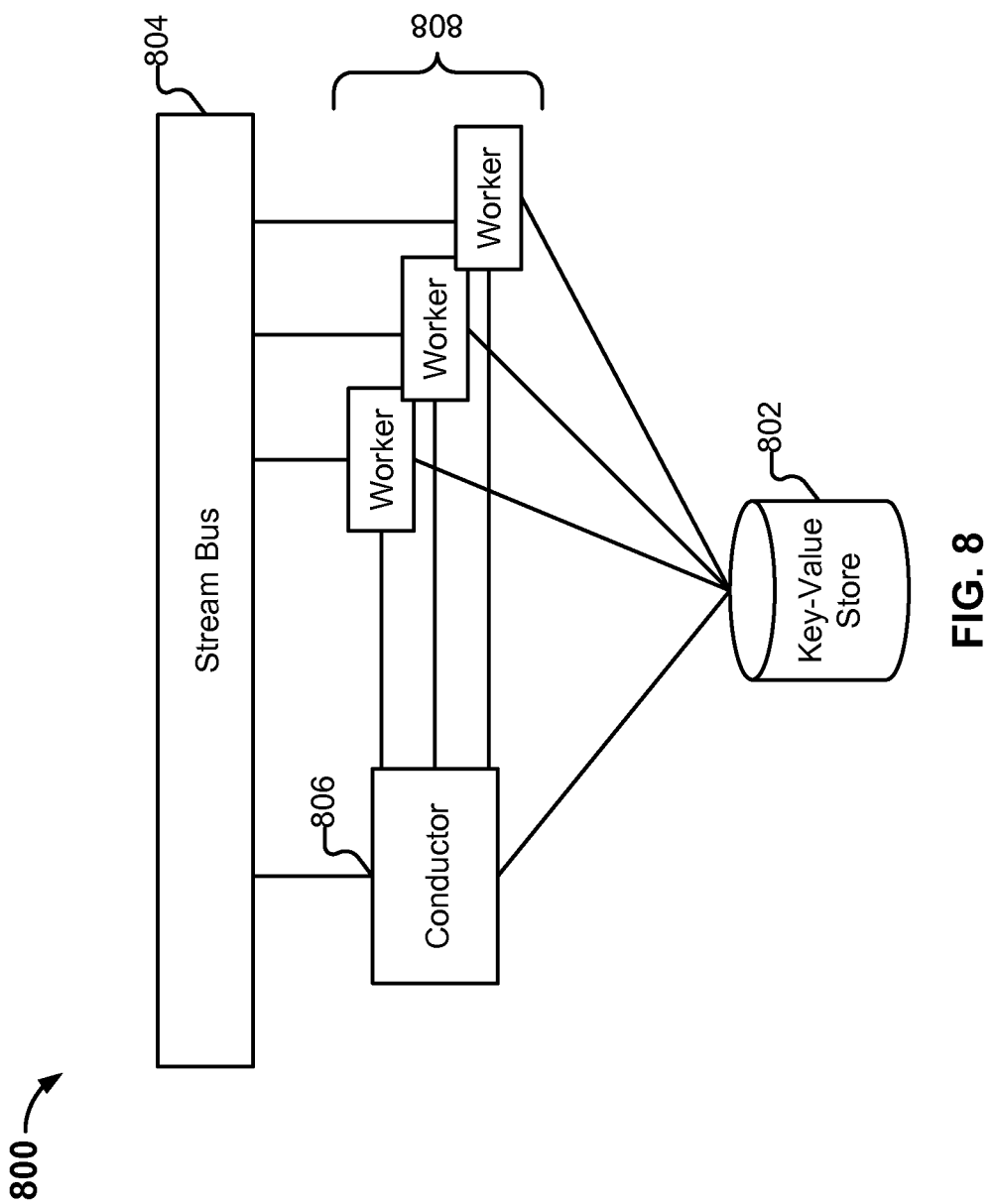
FIG. 8 illustrates an embodiment of a portion of a distributed computation system.

FIG. 8 illustrates an embodiment of a portion of a distributed computation system. The distributed computation system supports stream computations—those computations whose input is a stream and whose output is either a stream or a real-time data structure. An example of a real-time data structure is a data structure that is kept updated in real-time based on stream data, such as top items list 136.

In some embodiments, system 102 includes a distributed computation system, such as the one shown in FIG. 8. The system illustrated in FIG. 8 is implemented using commodity nodes interconnected using Gigabit Ethernet.

Data Model

Elements in a data stream are modeled as Events. For example, each tweet is an Event, as is each Facebook status update. Formally, an Event is a record with a variable number of attribute-value pairs. Values can either be atomic or collection types, such as sets and lists. Certain fields are present in every Event: a streamid (which stream does this Event belong to), a timestamp, and a key. The key attribute always has an atomic value. Keys are used to group related Events, and there is no requirement that the key be unique across Events. For example, the key for a tweet can be the Twitter username (e.g., to group tweets by user) or, the key can be a set of categories (e.g., to group tweets by category). The other attributes will depend on the kind of Event. For example, a tweet will contain Twitter-specific fields.

A Stream is a collection of Events with the same streamid attribute. An assumption is made that timestamps are monotonically increasing with time, but not necessarily dense. At any point in time, there are usually several Streams: some of them external (e.g., Twitter, Facebook) and others that are generated as intermediate values and outputs by the application.

A Slate is a persistent attribute-value collection (i.e., a collection of key-value pairs) usually related to a group of Events: for example, all the tweets that mention a particular link, or all the tweets related to a given news story. The attributes are application dependent, except for one required attribute: the slatekey. The value of this attribute is a primary key for the Slate: the system shown in FIG. 8 guarantees that there is exactly one Slate with a given slatekey. The system shown in FIG. 8 persists Slates and makes it very efficient to access them by slatekey; in practice, the most active Slates are stored in memory and only old, inactive Slates may need to be fetched from disk.

The system shown in FIG. 8 provides primitives that construct new Events and Slates, as well as examine, add or modify attributes of existing Slates given their slatekey. Events are assumed to be immutable. If in the process of a computation, it becomes necessary to add an attribute to an Event, the idiom is to create a new event that copies the current Event, add the additional attribute, and emit the new Event, usually on a different Stream.

Computation Model

Computation in a streaming model is Event-driven: things happen in reaction to new Events. One way to organize computation in a streaming model is publish-subscribe. Computational units subscribe to Events and publish Events. All Events from all Streams are placed on the same "Stream Bus," and the system (in particular, the Bus Conductor) takes care of routing Events as appropriate. There are two kinds of computational units: Map and Update.

Map is a stateless computation. A Mapper (the unit that performs a Map) is invoked with an Event. It publishes zero or more new Events on to the bus, possibly to different Streams. Mappers subscribe to one or more Streams, and get invoked for every Event on each of those Streams.

Update is a stateful computation. An Updater is invoked with an Event and a Slate; in particular, the Slate whose slatekey matches the key of the Event. If no such Slate exists, the system creates a blank Slate (with only the slatekey attribute filled in). The Updater can examine the Slate and also add, remove, or modify the Slate in any way (except changing the slatekey). An Updater publishes zero or more Events, possibly to different Streams. An Updater, like a Mapper, subscribes to zero or more Streams, and gets invoked for every Event on each of those Streams. To summarize:

map(Event)→4 (Event)*
update(Event, Slate)→(Event)*

If more than one computational unit is subscribed to a Stream, they will each get every Event on the Stream. However, the order in which they get invoked is nondeterministic; it is possible they get invoked concurrently, possibly on different nodes.

In some embodiments, the system shown in FIG. 8 makes the following guarantees related to scheduling and concurrency:

At-Least-Once. Regardless of hardware or software failures, every Mapper and Updater subscribed to a Stream will receive every Event on the Stream, and will successfully execute to completion for that Event, at least once. It is possible in rare circumstances that an Event will be sent more than once to a computational unit.

Persistent Updates. After successful completion of an Updater, any changes it makes to its Slate are persistent.

Per-Slate in-order execution. When an Updater receives an Event, its Slate will reflect all, and only, the updates due to all Events with the same key and earlier timestamps.

An Application is a collection of Streams, Mappers, Updaters, and subscriptions.

Map and Update: Additional Details

A Mapper is obtained by subclassing a system-defined Mapper class. The programmer defines a single method with the following signature:

map(Event event)/* process an Event */The programmer uses the system-provided publish(event,streamid) method to publish Events to Streams. An Updater subclasses a system-defined Updater class and provides three methods:

init(Slate slate)/* initialize the state of a Slate ahead of any Events */update(Event event, Slate slate)/* process an Event and possibly update the Slate */ finalize(Slate slate)/* called before the Slate is destroyed */

The update( ) method: When an Updater is subscribed to a Stream, and an Event arrives with a never-before-seen key, the system creates a new Slate with that slatekey and then calls the init( ) method of the updater. The system guarantees that update( ) will only be called on an initialized Slate.

The init( ) method can be used to initialize application-specific data structures on the Slate. In addition, it can also specify a time-to-live (TTL) for the Slate, using the system-provided set_ttl( ) method. This parameter is interpreted as follows. If the Slate is not accessed (read or written) for a period that equals the TTL, the system calls the finalize( ) method for that Slate and then destroys it. This feature of the model allows the system shown in FIG. 8 to "forget" very old data (e.g., old clusters). The default TTL is infinity; that is, the Slate persists forever.

Once the application has defined its Mappers and Updaters, it calls a system-provided subscribe( ) method on them (this method is provided by the system-defined Mapper and Updater classes that every Mapper or Updater subclasses).

Mapper.subscribe(streamid)
Updater.subscribe(streamid)

Included in the system shown in FIG. 8 is a highly scalable, available, and fault-tolerant persistent key-value store 802. The key-value store is used to store system metadata as well as persistent storage for Slates. One example of such a key-value store is Cassandra. The key-value store forms the storage layer of the Map-Update system.

Also included in system 800 are a Stream Bus 804, a Conductor 806, and Workers 808. The Stream Bus receives every Stream Event and buffers it for the Conductor. If the Conductor falls behind or fails over, the Stream Bus buffers the Stream so that Events are not lost. Each Worker node has a pool of Worker processes. Each process has all the code for every Mapper and Updater in the system, and can run any Map or Update. In some embodiments, modules such as modules 114-124 are implemented as Workers.

The Conductor is the master that manages subscriptions and routes Events to computational units. It maintains metadata about the available Workers and Subscriptions. When it receives an Event, it finds Mappers and Updaters subscribed to the Stream. It determines which Worker node to use for each Mapper and Updater, and invokes them appropriately. Slates are stored in the key-value store, indexed by slatekey. The Slate is serialized to become the value in the key-value store and de-serialized when it is read back. It is assumed that the key-value store is distributed and runs on a separate set of nodes from the Map-Update system.

Task Scheduling: One Example Implementation

When an Event arrives, the Conductor has to decide which Worker node(s) run the Mapper(s) and Updater(s) subscribed to the Stream. One implementation is to allocate tasks round-robin among the Workers, hoping that the result will be that every Worker node gets a roughly equal computational load at every point in time. A slightly better scheme is for the Conductor to poll the Workers periodically and collect load data, and schedule tasks on the most-lightly-loaded node.

To ensure atomicity in this model, every time an Updater is scheduled, it needs to read its Slate from the key-value store when it starts, and write back the updated Slate (if it made updates) to the key-value store. Suppose the system processes n events/second, and each Event accesses k Slates. Also suppose each Slate is s bytes in size. A total of nk key-value store operations/second, transferring nks bytes/second of data between the key-value store and Worker nodes is required.

Task Scheduling: Alternate Implementation

Computation blocks are moved close to the data it accesses. At any point, a single Worker node can be made the Primary for a given slatekey. When an Event arrives, the Conductor examines its key, and schedules Updaters for it on the primary node for that key. Mappers are still scheduled as in the prevoius implementation.

Each Worker node maintains an in-memory (or in-SSD) cache of Slates. These are Slates for which this Worker node is the Primary. By default, the cache is write-through; writes are written back immediately to the key-value store. When an Updater is scheduled on a Slate, it is very likely that its most recent value is in the cache, not requiring a read from the key-value store. The application can control the write-through behavior with a write-delay parameter. This parameter relaxes the immediate write-through and allows the cached Slate to be written back, say, every few seconds.

Streams can be subject to spiky behavior, with bursts of activity for the same key. The Primary node approach, together with the write-delay parameter, allows this feature to be harnessed. The Slate for such a "hot" key will remain in the Primary's cache, and will be read and written several times in-cache for every access to the key-value store. The write-delay allows the application to trade-off between scalability and absolute correctness. If a Worker node fails, the updates in its cache that have not yet been written through to the key-value store are lost.

The Conductor periodically polls Workers and gathers load data. If the Primary node for an event's key has a load less than a specified threshold (e.g., 80% utilization), schedule the Updater on the Primary. If not, the Conductor picks the most lightly-loaded Worker as the new Primary for this key. It will have to wait for a time period slightly longer than the write-delay before scheduling Updaters for this key on the new primary. That will ensure that any updates from the old Primary have been written through to the key-value store. The new Primary then gets the most recent value of the Slate from the key-value store.

Application Slates and Keyspaces

In some embodiments, the application is given access to the key-value store. Application Slates are used to facilitate application access to the key-value store. Isolation between system-Slates and application-Slates is ensured by using separate keyspaces. A keyspace is specified by a prefix in front of the key, with a colon separating the keyspace name and the key. For example, "foo:bar" is key "bar" in keyspace "foo." Only system 800 can create Slates in the "system:" namespace. Applications can create in any other namespace. Updaters can create, access, and modify application Slates by key.

Exemplary embodiments providing methods, systems and devices for processing and managing real-time data streams are described further in the Section entitled "Processing of Real-Time Data Streams".

Tagging a Document

Figure 9:
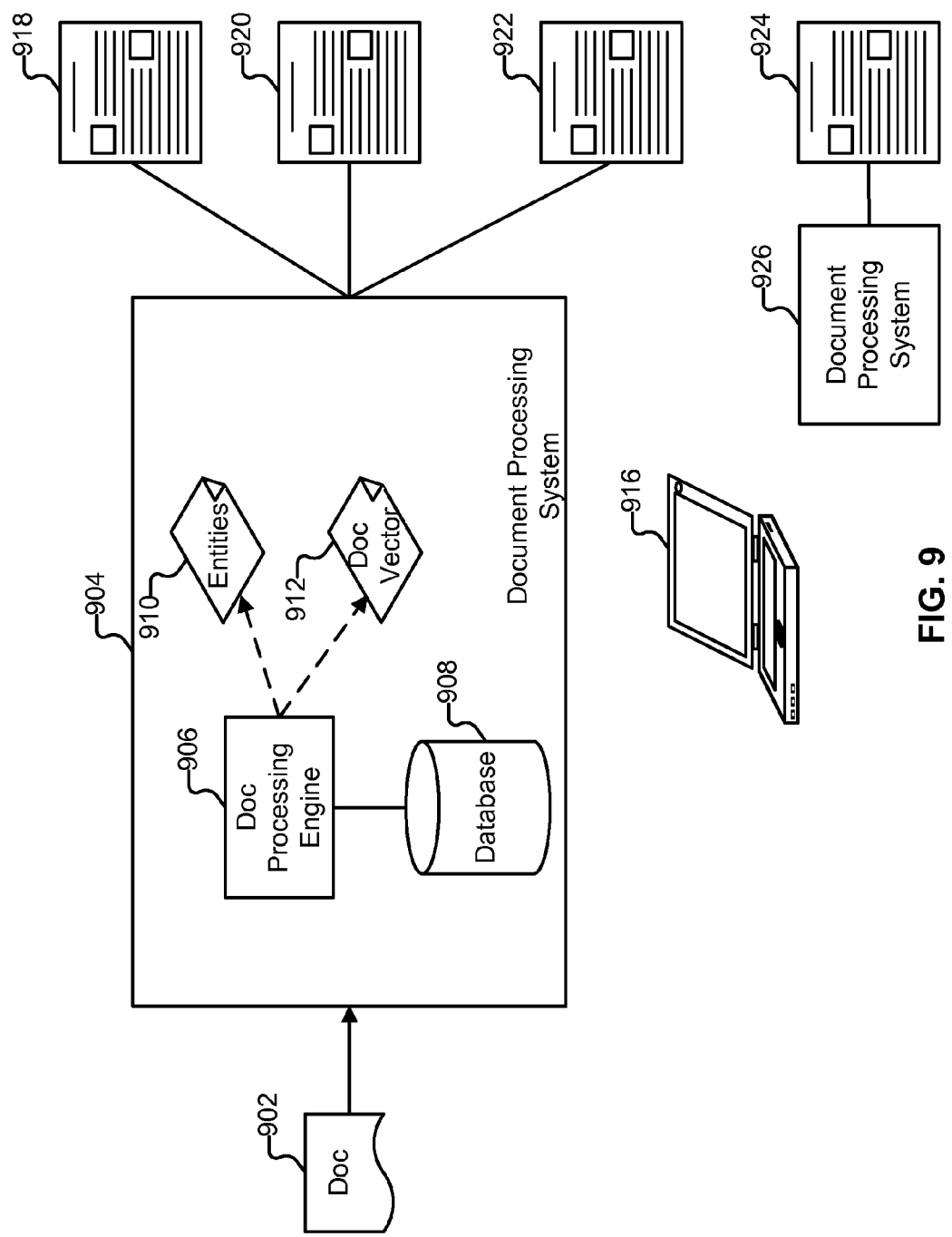
FIG. 9 illustrates an embodiment of an environment in which documents are processed.

FIG. 9 illustrates an embodiment of an environment in which documents are processed. In the example shown, a user of client 916 uses a web browser to access a variety of sites 918-924. Site 918 hosts an astronomy-oriented blog that allows readers to comment on blog posts via a commenting feature. Site 920 is a medically-themed message board on which users discuss various medical conditions and other topics with one another. Site 922 is a news aggregation service. Visitors to site 922 provide information about their interests and are provided with personalized news feeds. Site 924 belongs to the company for which Alice works, Acme Corporation. Site 924 securely makes available internal documents to users such as Alice that have appropriate credentials.

In the example shown, documents, such as document 902, are provided to document processing system 904 for processing. Examples of documents include blog posts made on site 118, forum messages exchanged on site 120, news articles made available through site 122, the various types of documents served by site 124, and any other text (in formats such as HTML, TXT, PDF, etc.), as applicable.

In various embodiments, for a given document 902, document processing engine 906 produces two types of output—a list of entities 910 and a document vector 912. As used herein, an entity is a pair of items—a textual representation (i.e., a string of text appearing in the document) and a concept associated with the textual representation. Unlike the textual representation (which is literally present in the document), the associated concept need not be literally present in the document. Instead, the concept is present in a taxonomy, such as is stored in database 908.

As one example, suppose a news article describes the saving of a baby from a fire by a dog. An excerpt from the article reads "The small, heroic sheltie saved baby Fred on Tuesday." When the article is provided to system 904, one example of an entity 910 that is generated is ("sheltie","Shetland Sheepdog"). The first portion of the pair (the textual representation) is the fourth word of the excerpt. The second portion of the pair is the associated concept that is included in a taxonomy of concepts—the canonical name of the breed of dog also known as a "sheltie." Document vector 912 is a ranked list of concepts associated with the document. An example of a document vector 912 for the dog article is: (pets:10, dogs:6, Shetland Sheepdog:4, arson:2) with each concept having an associated score. In various embodiments, the associated scores are normalized between 0 and 1.

In the example shown in FIG. 9, system 904 comprises standard commercially available server hardware (e.g., having a multi-core processor, 4G+ of RAM, and Gigabit network interface adaptors) running a typical server-class operating system (e.g., Linux). In various embodiments, system 904 is implemented across a scalable infrastructure comprising multiple such servers, solid state drives, and other applicable high-performance hardware. In the environment shown, Acme Corporation owns a document processing system 926 that provides functionality similar to that of system 904. System 926 is configured to receive as input various internal documents and to categorize and summarize those documents in accordance with the techniques described herein.

Whenever system 904 is described as performing a task (such as communicating with a client or accessing information in a database), either a single component or a subset of components or all components of system 904 may cooperate to perform the task. Similarly, whenever a component of system 904 is described as performing a task, a subcomponent may perform the task and/or the component may perform the task in conjunction with other components. In various embodiments, portions of system 904 are provided by one or more third parties. As one example, database 908 stores a taxonomy comprising millions of concepts. The taxonomy can be created by system 904 (using techniques described in more detail below) and can also be supplied to system 904 by a separate component, or by a third party. As another example, database 908 also includes various statistical information, such as inverse document frequency information, that can be periodically computed by system 904, supplied by a separate component, or provided by a third party.

Figure 10:
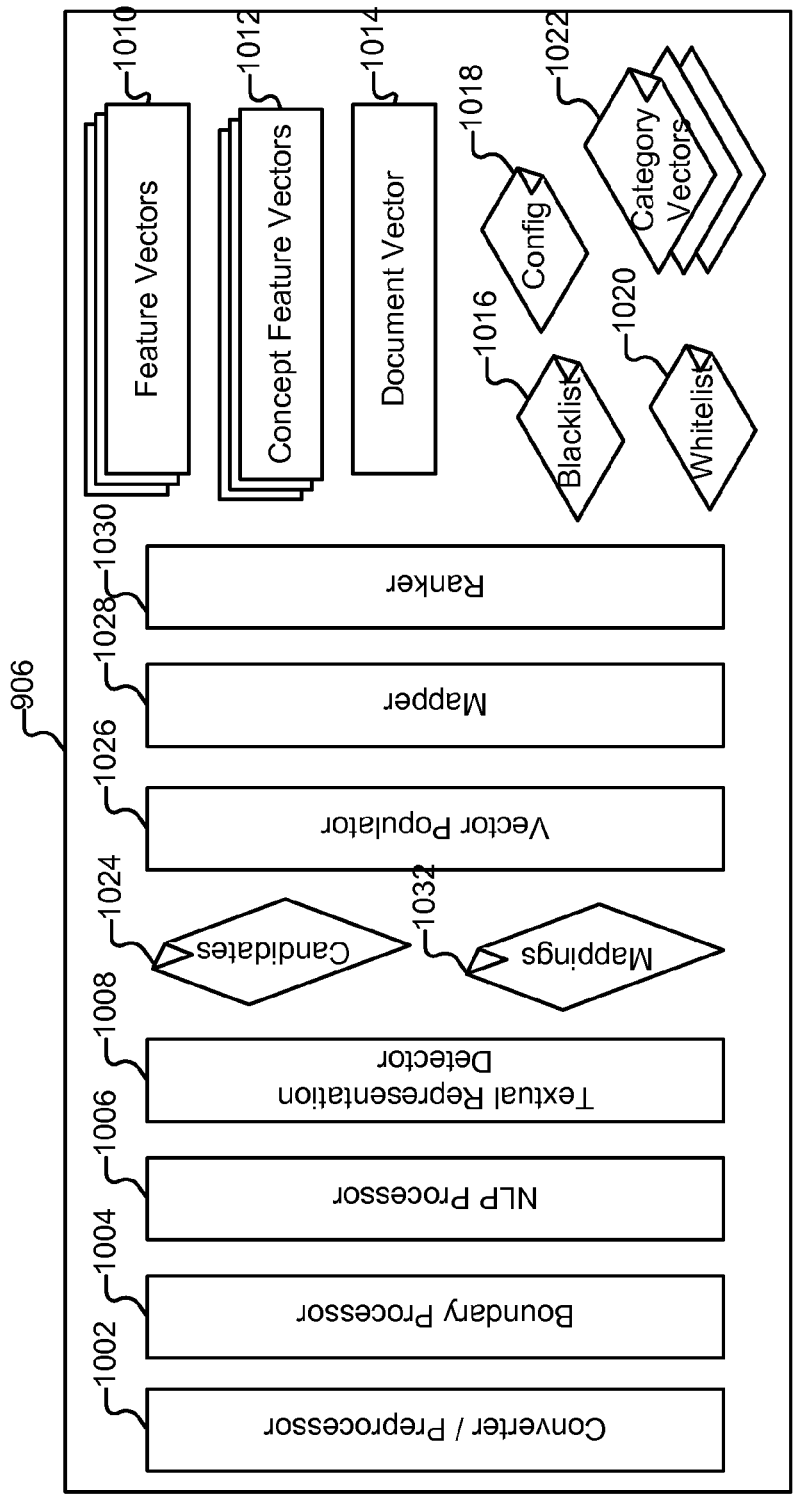
FIG. 10 illustrates an embodiment of a data processing engine.

FIG. 10 illustrates an embodiment of a data processing engine. Data processing engine 906 is of a modular design and employs a blackboard architecture in which various modules (if included) contribute to computation and refinement of various calculations (such as the computation of vectors 1010-1014), as applicable. Some of the processing performed by the modules of data processing engine 906 is parallelizable, such as natural language processing and textual representation detection. Further, the processing performed by engine 906 is customizable through the use of configuration file 1018 (e.g., allowing documents from different publishers to be processed differently). Additional detail on various aspects of data processing engine 906 will now be provided.

Conversion/Preprocessing

When a document, such as document 902, is received, if applicable, preprocessor 1002 converts the document (e.g., from a DOC or PDF file) or otherwise extracts (e.g., from HTML or XML) a plaintext representation of the content of the document. Preprocessor 1002 is also configured to handle special characters, such as by converting occurrences of the "&" sign into whitespace or into the word "and."

Boundary Processing/Position Information

Boundary processor 1004 is configured to recognize certain types of boundaries within a document based on the format of the document (e.g., <head>, <body>, <h1>, and <p>HTML tags) and can also parse configuration information supplied by publishers regarding the formatting of documents on their sites. The document shown in FIG. 11 includes two sections—a title section and a body section. In some embodiments, document boundaries are ignored and the processing of boundary processor 1004 is omitted. In various embodiments, boundary processor 1004 is also configured to store, for each term in the document, the position of the term. As one example, the first word in the document would have a position 0, the second word in the document would have a position 1, and so on. As will be described in more detail below, terms that appear in one section of a document (such as a title) may be scored or otherwise treated differently than terms that appear in another section (such as in the comments). In addition, publishers can use sections to enforce preferences, such as that all terms appearing in a document be used to categorize the document, but that only terms appearing in the main body (and not the title or comments sections) be able to be associated with hyperlinks. Such preferences can be provided by the publisher via configuration 1018.

Natural Language Processing

Natural language processor 1006 is configured to determine part-of-speech information for each term in the document. In various embodiments, natural language processor 1006 uses part-of-speech tags, such as are provided by the Brown corpus, to tag each term in the document. Using the article shown in FIG. 11 as an example, "NASA's" would be tagged "NP$," meaning that it is a possessive proper noun. As will be described in more detail below, in various embodiments, different parts of speech are assigned different scores and those scores can be used in evaluating textual representations.

Textual Representation Detection

Whitelist 1020, extracted from the taxonomy stored in database 908, is a list of all of the concepts that are included in the taxonomy. Textual representation detector 1008 is configured to perform a greedy match against the document using whitelist 1020. Each match is included in a list of candidate textual representations 1024. Using the first line of the article shown in FIG. 11 as an example "NASA," "mission," "orbit," and "moon," would each be included in the list of candidate textual representations—1024. Suppose "Lunar" and "Lunar Reconnaissance Orbiter" are both phrases that are included in whitelist 1020 but "Lunar Reconnaissance" is not. Because detector 1008 is configured to perform a greedy match, "Lunar Reconnaissance Orbiter" will be added to the list of candidate textual representations 1024 while the other two terms will not. In various embodiments, detector 1008 is configured to perform other types of matches, instead of or in addition to greedy matches. In some embodiments, all matches (e.g., both "Lunar" and "Lunar Reconnaissance Orbiter") are added to list 1024.

Leading Prepositions

Suppose "The American" and "American Pie" are both concepts included in whitelist 1020, but that "The American Pie" is not. Also suppose that document 902 includes the string "The American Pie movie is showing at the Downtown Theatre tomorrow." When performing its greedy match, detector 1008 might add to list 1024 two entries, "The American" and "Pie," erroneously omitting "American Pie." To address this problem, in some embodiments, detector 1008 employs a prepositional rule in which, when a match that includes at its start a preposition is detected, the preposition is temporarily ignored and the greedy match continues using the next word in the document. If a match is found, the preposition is discarded and the phrase that does not include it is used. In this example, because "The American" includes a leading preposition, "The" would be temporarily ignored, and a match of "American Pie" would be detected. From the three words, "The American Pie," only one entry would be added to list 1024—"American Pie."

Without further refinement, the list of candidate textual representations 1024 might include virtually every word in document 902. Accordingly, in various embodiments, textual representation detector 1008 employs additional logic to refine the list of candidate textual representations. As will be described in more detail below, the candidate list can be refined/pruned both before and after feature vectors for items on the candidate list are populated.

Static and Runtime Blacklists

In various embodiments, textual representation detector 1008 is configured to exclude from inclusion in list 1024 those textual representations that match a blacklist 1016. Stop words (such as "a," "about," "again," and "would") are one example of terms that can be included in a static blacklist. A publisher can also provide custom blacklists (referred to herein as "runtime" blacklists) that should be considered by engine 906 when processing that particular publisher's documents. As one example, a publisher may blacklist the names of competitors. As another example, the publisher may have an agreement with a third-party advertising company that certain words be directed to that advertising company. By employing a blacklist, the publisher can prevent the already-contracted-for words from being considered by engine 906. Publishers can also specify constraints such as requiring that all textual representations belong to one or more verticals (also referred to herein as "top level categories") specified by the publisher, which will be described in more detail below.

Concept-Based Blacklists

Concepts included in a taxonomy can be used to bias/prune candidate textual representations, as will be described in more detail below. As with the examples described in the previous section, concept-based blacklists can be static (e.g., applied to all documents) or runtime (e.g., used according to a configuration supplied by a publisher or other runtime clue). For example, an administrator of engine 906 can configure as blacklisted concepts "chronology" and "days of the week." Child topics such as "Monday" and "1997" would be blacklisted as a result. As another example, a preference can be indicated for health-themed textual representations by specifying the vertical, "Health," as a whitelisted concept in configuration 1018. A preference against adult-themed textual representations can be implemented by specifying the vertical "Adult Entertainment" as a blacklisted concept. Instead of supplying whitelists/blacklists, in some embodiments weights are assigned to various categories, so that higher weighted categories are given preference over lower weighted categories by engine 906. As one example, the following weights could be provided: "Health(1); Sports (0.5)" indicating a preference for health-related concepts but also indicating that sports concepts should be considered.

In various embodiments, concept whitelist/blacklist information is passed in at runtime via the provider of document 902 instead of or in addition to being supplied via configuration 1018. Whitelist information can also be collected on behalf of a publisher, without requiring the publisher to manually specify category preferences. One way of accomplishing this is as follows. When a publisher initially decides to use the services provided by system 906, system 906 performs the document categorization techniques described herein across the corpus of documents included in the publisher's site and collects together the dominant concepts into a concept whitelist.

Regular Expression Patterns

In various embodiments, textual representation detector 1008 is configured to exclude from inclusion in list 1024 those textual representations that match a regular expression. As one example, as a result of converter/preprocessor 1002 manipulating document 902, a term such as "AT&T GSM" may be converted to "AT T GSM." Suppose "TGSM" is a concept included in whitelist 1020. During the greedy match portion, "TGSM" may be erroneously added to candidate list 1024. A regular expression pattern that discards matches that begin with a lone "T" or a lone "S" can be used to prevent the erroneous match from being included.

Proper Noun Sequences

In various embodiments, textual representation detector 1008 is configured to evaluate proper nouns included in list 1024 and remove from the list those proper nouns that have an adjacent proper noun that was not selected. One purpose of this rule is to prevent one person that has a famous last name (but is not that famous person) from being erroneously recognized as the famous person. Suppose an article discusses a chemist named John Mozart and that "Mozart" is added to list 1024 as a result of the greedy match. Since "John Mozart" is not included in whitelist 1020, it is not included in list 1024. Detector 1008 is configured to recognize that Mozart was added, has an adjacent proper noun ("John") and to remove "Mozart" from list 1024.

Initial Feature Vector Population

Vector populator 1026 is configured to populate a feature vector 1010 for each candidate textual representation included in list 1024. A feature vector comprises a set of various signals associated with the textual representation. The signals can be used in various ways, as will be described in more detail below. Some of the signal information is obtained from analyzing document 902 and other information is obtained from data included in database 908.

One signal, denoted herein as "TitleTF," indicates the number of times that the term appears in the title section of the document. Using the textual representation, "Lunar Reconnaissance Orbiter," as shown at 1102 in FIG. 11 as an example, that term is not present in the title section of the document and thus has a TitleTF=0. "BodyTF" is a signal that indicates the number of times that the term appears in the body section of the document. The term, "Lunar Reconnaissance Orbiter" has a BodyTF=1 because it is present once in the body section of the document. Another textual representation, "LRO," also has a TitleTF=0, but has a BodyTF=3. Other term frequency counts can also be used instead of or in addition to TitleTF and BodyTF, as applicable. For example, the term's frequencies with respect to meta tags, bold/strong tags, H3-H6 tags, H1-H2 tags, and anchor classes can all be included in its feature vector. As another example, a CommentTF signal can be used to indicate the number of times a term appears in the comment section of a blog. Arbitrary section frequency counts can also be used, such as Section0TF, Section1TF, Section2TF, etc., indicating the number of times the term appears, respectively, in the $0^{th}$, $1^{st}$, and $2^{nd}$ sections of the document. One way that section frequency signal information can be used is to allow words occurring in the comments to be considered when categorizing a document, but also to prevent those words from being selected for automated hyperlinking.

As mentioned above, a score (the "NLP score") can be assigned to a textual representation based on its part of speech. As one example, proper nouns are assigned a score of "1," common nouns are assigned a score of "0.75," and verbs are assigned a score of "0." For multi-word textual representations, the NLP score can be computed as the average of each constituent word's score, the sum of each constituent word's score, or in accordance with any other appropriate calculation. The "Case" signal scores the number of capitalized words in the textual representation. In the example of "Lunar Reconnaissance Orbiter," the Case score is 3 because each component of the term is capitalized. In the example of "Apollo landing sites," as shown in FIG. 11, the Case score is 1.

Both the NLP score and the Case score can be used to resolve whether particular textual representations included in the document are proper nouns or common nouns and also to resolve ambiguities, as described in more detail below. As one example, the occurrence of the words "Simply hired" in a document could refer to the author's explanation of how easy it was to be hired at a job and could also refer to the jobs website, www.simplyhired.com. The Case score of "Simply hired" is 1. The Case score of the canonical name of the jobs website, Simply Hired, is 2. As another example, "it's it" in a document could refer to something the author thinks is "it," but could also refer to It's-It brand ice cream sandwiches. The Case score of "it's it" as written is 0. The Case score of the canonical form of the ice cream sandwich product is 2.

The Position signal indicates the relative location of the textual representation in the document. "Lunar Reconnaissance Orbiter" occurs once in document 1100, at position 154. In various embodiments, if the textual representation occurs multiple times, the position of each occurrence is included in a list (e.g., Position=100,202,554). In various embodiments, the position of the term can be used to bias various processing. For example, links to terms occurring earlier in the document can be preferred over ones occurring later.

The NumWords signal indicates the number of words included in the textual representation. "Lunar Reconnaissance Orbiter" includes three words, and thus has NumWords=3.

The signals described herein are examples of signals and particular signals can be omitted and/or accompanied by additional signals based on factors such as availability of data/information, preferences, and other implementation choices.

Transforming Candidate Textual Representations into the Taxonomy Space

Mapper 1028 is configured to map candidate textual representations to nodes in the taxonomy stored in database 908. As explained above, the whitelist 1020 used to identify textual representations is extracted from a taxonomy stored in database 908. Each node in the taxonomy has an associated ID. As one example, the concept "Lunar Reconnaissance Orbiter" has a ConceptID of 2381014. The concept "academic conference" has a ConceptID of 118760. In some cases (such as with "Lunar Reconnaissance Orbiter"), the textual representation unambiguously corresponds to a single node in the taxonomy (i.e., node 2381014). In other cases, the textual representation's meaning may be ambiguous. For example, a textual representation of "jaguar" occurring in a document could correspond to the concept "Jaguar Cars Ltd.," to the concept "Panthera onca," to the concept "Mac OS X v10.2," or one of several other concepts. A textual representation of "apple" occurring in a document could correspond to the concept "Malus domestica," to the concept "Apple Inc.," or one of several other concepts.

In various embodiments, mapper 1028 determines the set of all concepts to which a particular textual representation maps. Each mapping is associated with a mapping vector. Mapping vectors (1032) are either of type "unambiguous" or type "ambiguous." A mapping vector is of type "unambiguous" only if a given textual representation maps to a single concept. Otherwise, it is of type ambiguous. A mapping vector also stores additional information, such as a pointer to the textual representation in the document, the conceptID of the mapped concept, the feature vector of the textual representation, and a strength value that indicates a confidence in the mapping. As will be described in more detail below, in some embodiments the mappings 1032 initially created by mapper 1028 are pruned through a series of refining actions.

Figure 12:
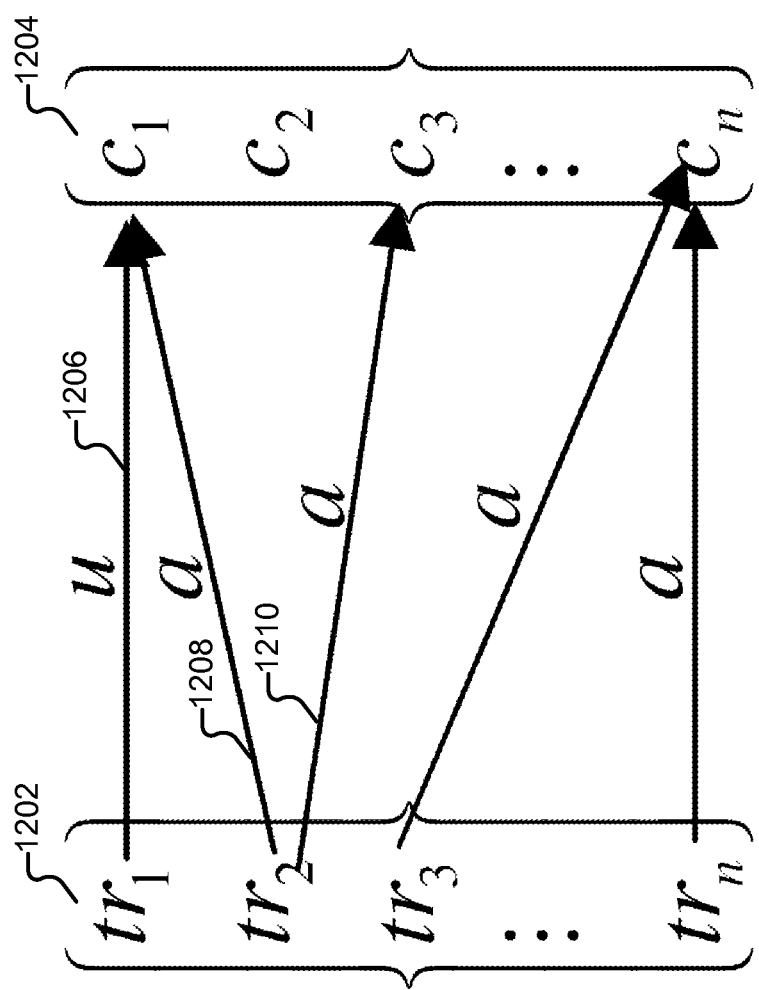
FIG. 12 illustrates a mapping between a set of textual representations and a set of concepts.

FIG. 12 illustrates a mapping between a set of textual representations (1202) and a set of concepts (1204). In the example shown, the first textual representation ($tr_1$) unambiguously maps to concept $c_1$. The unambiguous mapping between the two is denoted as "u" along line 1206. As one example, $tr_1$ is "Lunar Reconnaissance Module" and $c_1$ is the concept "Lunar Reconnaissance Orbiter." Suppose $tr_2$ is the acronym, "LRO." LRO could be short for "Lunar Reconnaissance Orbiter" but could also be short for "large receive offload," ($c_3$) which is a technique in computer networking for increasing inbound throughput. As shown in FIG. 12, $tr_2$ can thus be mapped both to $c_1$ and $c_3$. The ambiguous nature of the mappings is denoted as "a" along lines 1208 and 1210.

Mapper 1028 sorts a document's textual representations into a set of unambiguous textual representations (e.g., $tr_1$) and a set of ambiguous textual representations (e.g., $tr_2$, $tr_3$, and $tr_n$). For each ambiguous textual representation, the mapper determines whether a concept to which it is mapped is also a concept to which a textual representation that is unambiguous is mapped. If so, the ambiguous textual representation is reclassified as an unambiguous textual representation and is mapped solely to the concept to which the unambiguous concept is mapped.

Figure 13:
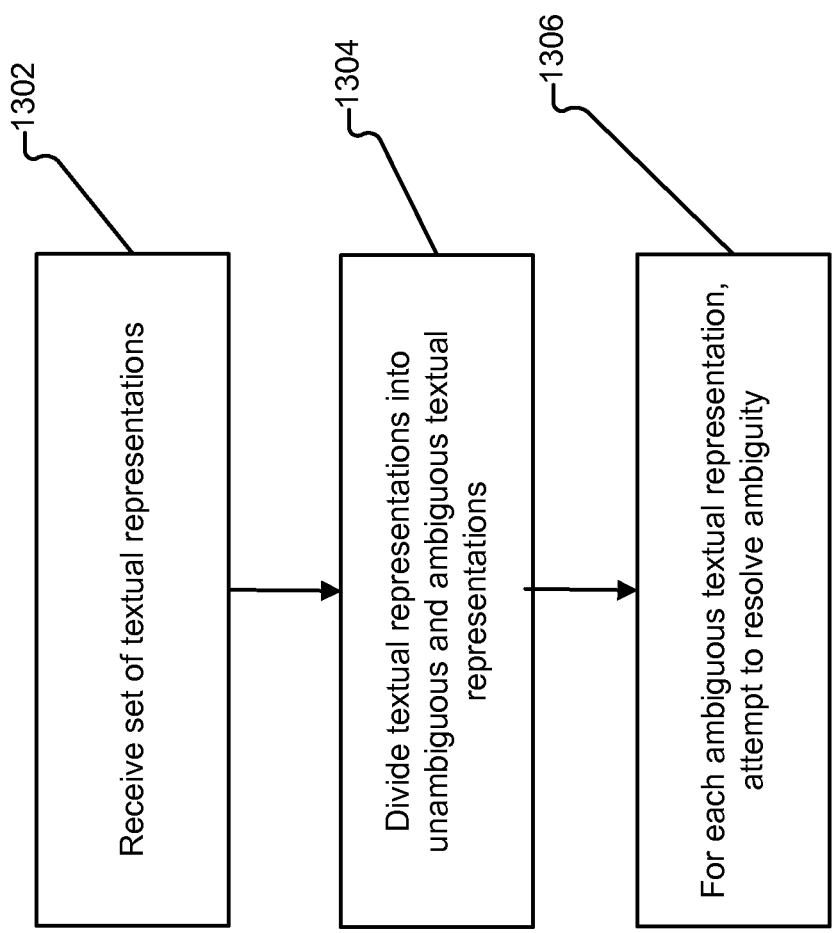
FIG. 13 illustrates a process for resolving an ambiguity.

FIG. 13 illustrates a process for resolving an ambiguity. In various embodiments, the process shown in FIG. 13 is performed by mapper 1028. The process begins at 1302 when a set of textual representations is received. At 1304, the textual representations are divided into sets based on whether they unambiguously or ambiguously map to a concept. Finally, at 1306, an attempt to resolve ambiguities is made. One technique for attempting to resolve an ambiguity is presented in the preceding paragraph.

Figure 14:
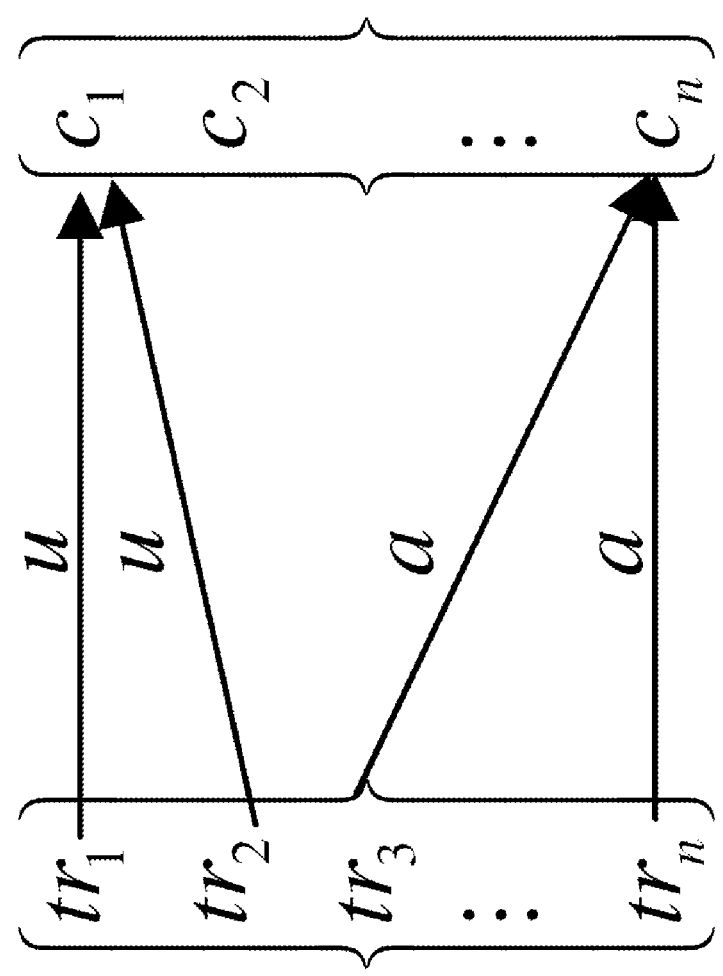
FIG. 14 illustrates a mapping between a set of textual representations and a set of concepts after an ambiguity resolving process has been performed.

FIG. 14 illustrates the mapping depicted in FIG. 12 after the processing described in conjunction with FIG. 13 has been performed. As explained above, textual representation $t_2$ was initially mapped to two concepts—$c_1$ and $c_3$. Since unambiguous textual representation $tr_1$ mapped to concept $c_1$, mapper 1028 removed the mapping vector corresponding to 1210 and changed the type of the mapping vector corresponding to 1208 from ambiguous to unambiguous. Two textual representations that map to the same concept (such as $tr_1$ and $tr_2$ as shown in FIG. 14) are examples of synonyms. Both textual representations ("Lunar, Reconnaissance Orbiter" and "LRO") refer to the concept "Lunar Reconnaissance Orbiter." In the example shown in FIG. 14, if another textual representation, "$tr_4$," also mapped to $c_1$, it would also be considered a synonym of $tr_1$, and $tr_2$.

The process of FIG. 13 can also be used to resolve ambiguities for textual representations which are not synonyms of one another but share related concepts. As one example, suppose "Steve Jobs" is a textual representation included in a document and unambiguously resolves to the concept of businessman, Steven Paul Jobs. The textual representation "apple" is also present in the document, in the sentence, "I would like to buy an apple." The term, "apple" is not synonymous with "Steve Jobs," however, its potential meaning as a fruit can be disambiguated by the presence of Steve Jobs in the document. One approach for accomplishing this is for mapper 1028, when performing portion 1306 of the process shown in FIG. 13, to examine the nearest neighbors of concepts in the taxonomy. Another approach is to use the concept blacklist/whitelist signals described in more detail below. Yet another approach is to use a document similarity score described in more detail below.

In some embodiments, for any remaining textual representations in the ambiguous textual representation set (e.g., four meanings of "jaguar"), a mapping between the textual representation and the concept corresponding to each possible meaning is added to the unambiguous set (e.g., four different unambiguous mappings), and the textual representation ("jaguar") is removed from the ambiguous set. Engine 906 is configured to remember that the meaning of the textual representation was not resolved (i.e., that jaguar could mean one of four things). As will be described in more detail below, pruning of three of the four different unambiguous mapping vectors is performed after a document vector is computed and a document similarity score generated.

Creating a Concept Feature Vector

In addition to the processing described above, vector populator 1026 is also configured to populate a set of concept feature vectors 1012. One way of accomplishing this is as follows. For each concept remaining after the processing of FIG. 13, vector populator 1026 merges the feature vector scores of any textual representations mapped to respective concept (e.g., by adding the values together) and includes additional information (described in more detail below).

Using the example of the representations "Lunar Reconnaissance Orbiter" and "LRO," a concept feature vector for "Lunar Reconnaissance Orbiter" is formed by summing the respective feature vectors of the two textual representations and adding additional information. The concept "Lunar Reconnaissance Orbiter" would accordingly have a TitleTF=0+0=0, a BodyTF=1+3=4, and so on.

Inverse Document Frequency Signal

One additional piece of information that is included in the concept feature vector is the inverse document frequency ("IDF") of a canonical textual representation associated with the concept. As one example, "JFK," "John F. Kennedy," and "Jack Kennedy" all refer to the $35^{th}$ president of the United States. The canonical textual representation is "John F. Kennedy" and the IDF included in a concept feature vector for the president would be determined using "John F. Kennedy." The canonical textual representation is stored in the taxonomy in database 908 and is in some embodiments the title of the concept as it appears in a third party corpus such as Wikipedia. In some embodiments, the IDF is computed for all textual representations occurring in the document instead of or in addition to the canonical textual representation.

The IDF is a statistical measure that can be used to evaluate how important a word is to a particular document included in a corpus of documents (e.g., the world wide web, documents on an enterprise server, etc.). For a given term "i," one way to compute the IDF of i is as follows:

$$IDF_i = \log \frac{|D|}{|\{d : t_i \in d\}|}$$

with |D| being the number of documents in the corpus, and |{$d:t_i \in d$}| being the number of documents where the term $t_i$ appears.

Number of Homonyms Signal

Another piece of information that can be included in the concept feature vector is the Homonyms signal. This signal indicates the number of homonyms for the concept and can be used to weight against (or toward) the selection of concepts that can easily be confused with other concepts. The number of homonyms associated with a concept is, in some embodiments, included in the taxonomy stored in database 908.

Concept Whitelist/Blacklist Signals

Yet another piece of information that can be included in the concept feature vector is whether or not the concept is present in a concept whitelist (or concept blacklist, as applicable). For example, in configuration 1018, publishers can specify concept whitelists (concepts they prefer to bias toward) and concept blacklists (concepts they have a bias against). If the concept is present in the concept whitelist, in some embodiments a Whitelist=1 signal is included in the concept feature vector (and has a "0" value otherwise). If the concept is present in the concept blacklist, in some embodiments a Blacklist=1 signal is included in the concept feature vector (and has a "0" value otherwise). The whitelist/blacklist signals can be used as weights and can also be used to prune concepts.

Linkworthiness, Popularity, and Freshness Signals

"Linkworthiness" is another signal that can be precomputed for a concept in the taxonomy and included in a concept feature vector. One example of a linkworthiness signal is a measure of how frequently the concept is included in a hyperlink in a corpus. As one example, suppose "bottled water" occurs 4,543 times within the corpus of documents that comprise the Wikipedia site. However, the term is linked a single time. Bottled water would accordingly have a linkworthiness score of 1/4,543=0.00022. As another example, suppose "carpe diem" occurs 200 times and is linked to 88 times. Carpe diem would accordingly have a linkworthiness score of 88/200=0.44. A corpus including multiple sites and/or the entire World Wide Web can also be parsed in determining linkworthiness instead of or in addition to Wikipedia. In some embodiments, the documents used to perform the linkworthiness determination are selected based on a pagerank or other measure of their quality. For example, links included in highly rated newspaper sites might be parsed, while links included in domain parked sites would not. The measure of quality can also be factored into the linkworthiness score itself.

For ambiguous concepts, such as "jaguar," in addition to determining the number of times a concept is linked, the meaning to which it is linked is also examined. For example, suppose that within Wikipedia, "jaguar" appears 500 times. Of those 500 instances, 300 have associated hyperlinks. Of the 300 hyperlinks, 60% direct the viewer to a page about Panthera onca, 30% direct the viewer to a page about the car company, and the remaining 10% of links direct viewers to other (even less common) meanings of the word. In this example, a popularity score can be associated with each of the meanings and used as a signal (described in more detail below), such as the cat meaning having a popularity score of 0.6, the car meaning having a popularity score of 0.3, and so on. In the case where the Wikipedia corpus is used, whether or not a particular ambiguous concept is designated as the default can also be used as a measure of popularity.

The "freshness" of a topic can also be used as a signal. Such information can be gleaned by scraping Twitter feeds, news aggregation sites, and other indicators of current topics, stored in the taxonomy and included by vector populator 1026 in the concept feature vector. One example of a change in a concept's freshness is the concept "cupola." Prior to the STS-130 shuttle mission, the term rarely appeared in news articles and Twitter messages. The inclusion in the payload of a cupola for the International Space Station, however, resulted in considerably more use of the term and thus its freshness score rose.

In various embodiments, the linkworthiness, popularity, and freshness signals are combined together into a single signal. The values may be binary (e.g., fresh=0 or fresh=1) or any other appropriate value, typically normalized between 0 and 1.

Additional Signals

A capitalization signal can be used to indicate how often a concept is capitalized in documents appearing in a corpus such as the World Wide Web. As one example, the n-gram data made available by Google can be used to estimate the percentage of times a concept is capitalized.

In some embodiments, rules are used to weight various signals on a category basis. For example, if a topic such as "Hired" belongs to the category "Film," a category-based rule can be used to give higher weight to the Case signal accordingly.

Pruning Concepts

In various embodiments, once vector populator 1026 has completed populating concept feature vectors 1012, some of the concepts are pruned. For example, concepts having a non-zero TitleTF score and a BodyTF=0, having NLP scores of 0, or having very low EDF scores (e.g., a term such as "shopping") are dropped. As another example, concepts that are orphans (e.g., nodes in the taxonomy without at least one parent or child) are also dropped.

As explained above, the "Case" score of a textual representation can be used when determining whether the textual representation maps to a particular concept. Suppose "Has Been" is the name of a musical album (a concept) and "has been" appears in a document 902. The Case score of the concept is 2, because the musical album's title is capitalized. The Case score of the textual representation is 0. In some embodiments, the musical album is pruned due to the mismatch in Case scores.

As another example, if concept whitelist/blacklist information has been provided to engine 906, the information can be used to resolve ambiguous meanings. For example, suppose medically themed site 120 has specified either the vertical "Health" or a series of lower level concepts such as "nutrition" and "organic foods" in whitelist 1020. Also suppose that document 902 includes an ambiguous occurrence of the textual representation "apple" which is mapped by mapper 1028 in accordance with the techniques described above to two concepts—a fruit and a computer company. The ambiguity can be resolved (and one of the two concepts pruned) by detecting that the Whitelist signal for the fruit concept has a value of 1 and the Whitelist signal for the computer concept has a value of 0.

In some embodiments, filtering is performed by various components of the document processing engine at various stages of processing. For example, in some embodiments, orphan concepts are omitted from whitelist 1020. As another example, in some embodiments, filtering based on scores such as NLP scores and IDF scores occurs prior to the processing described in conjunction with portion 1306 of the process shown in FIG. 13.

Category Vectors

Each concept "c" in the taxonomy stored in database 908 has an associated category vector 1022. In various embodiments, the category vector is precomputed (i.e., prior to the processing of document 902) and is also stored in database 908. For a particular concept c in the taxonomy, the category vector is a set of categories/concepts that are related to that concept c, along with a weight for each of the included categories/concepts. A variety of techniques can be used to compute the category vector.

One way to populate the category vector is to use the up-lineage of the concept (e.g., parents, grandparents, etc.), and assign a decreasing score based on distance (e.g., parents have a score of 0.9, grandparents have a score of 0.8, etc.). A second way to populate the category vector is to use the down-lineage of the concept (e.g., children). A third way to populate the category vector is to use a predetermined list of concepts designated as being "related" to the concept (e.g., including siblings), or to use the concept lighting techniques described in more detail below.

A fourth way to populate the category vector is to use membership in a subset "K" of a taxonomy "T," where $|K|<<|C|$. For example, K can include only verticals and entity classes. Further, elements within K should not have parent-child relationship, meaning that all members of a given k in K should not automatically be members of another k.

Document Vector

Vector populator 1026 is configured to populate a document vector 1014 for each document 902. In some embodiments, this is accomplished by computing the average of all category vectors implicated by the concepts associated with document 102 remaining after the pruning described above. Document vector 1014 can thus be denoted as follows:

$$dv = \frac{\sum_n cv_i}{n}.$$

In some embodiments, the document vector is normalized so that the sum of the components of $cv_i$ is 1. Other techniques can also be used to compute a document vector, as applicable. For example, a weight value on an exponent can be included in the computation such that top level concepts (like "health" and "sports") are favored or disfavored, as indicated by a publisher, over bottom level concepts (like "Sungold Tomato"). As another example, the computation of the document vector can take into account rules such as that concepts that have ambiguous parents be excluded from the document vector, that concepts associated with terms appearing in the title be weighted significantly more than other concepts, etc. Document vector 1014 is one example of output that can be provided by engine 906 to various applications described in more detail below.

Document Similarity and Further Disambiguation

In some embodiments, vector populator 1026 is configured to use document vector 1014 to compute a set of document similarity scores. For a given concept, the document similarity score is computed as: $ds_i = \overline{dv} \circ \overline{cv_i}$. It provides an indication of how similar the concept vector is to the document vector. Once computed, the document similarity score is included in the concept's feature vector 1012. In various embodiments, other similarity scores, such as a site similarity score, can also be computed (e.g., by computing the similarity of a concept over all the documents from a given site) and included in feature vector 1012.

The document similarity score can be used to resolve remaining ambiguities. For example, suppose document 902 includes the statement, "Jaguar prices are climbing." Absent additional information, the textual representation "Jaguar" could plausibly refer to either an animal or an automobile. By examining the document similarity scores of both the Panthera onca and the Jaguar Cars Ltd. concepts, disambiguation can be performed. For example, if the document is an article about the cost of zoo exhibits; concepts such as "zoo" and "wildlife" and "park" will likely be included in the document vector, while concepts such as "luxury cars" and "high performance engine" will likely not (or will have considerably lower scores). Accordingly, the document similarity score of "Panthera onca" will be considerably higher than the score for "Jaguar Cars Ltd." and the ambiguity can be finally resolved by pruning the second concept.

In some embodiments, additional information is employed to resolve remaining ambiguities. For example, the textual representation, "Michael Jackson" most frequently refers to the American musician. However, the taxonomy also includes other individuals of note that are also named "Michael Jackson" (e.g., a civil war soldier, a British television executive, etc.). It is possible that a document could be referring to a Michael Jackson that is not the musician. In various embodiments, the popularity of a particular concept is used as one consideration (e.g., with the musician meaning being more popular than the civil war solider) and concept's document similarity score is used as another. Based on customizable weights, engine 906 can be configured to disambiguate concepts such as "Michael Jackson" by preferring the popular meaning (and pruning the others), except when the document similarity score overwhelmingly indicates (e.g., having a document similarity score exceeding 0.7) that an alternate meaning should be selected. As another example, the freshness of a topic can be considered.

Ranking Results

Even after the scoring and pruning actions described above have been performed, for a given document 902, it is possible that hundreds (or more) of textual representations and associated concepts remain as candidates. Typically, only a handful of the top textual representations and/or concepts are needed.

Ranker 1030 is configured to rank the concepts remaining in consideration after the above processing/pruning has been performed. One approach is to use a scoring function s that computes a score given a concept feature vector. In various embodiments, what weights to apply to the various signals included in the concept feature vector are empirically determined and then tunes using linear regression. In various embodiments, only a subset of the signals is used (e.g., a combination of the document similarity score and linkworthiness/popularity/freshness signals). For a given document 902, a threshold/cutoff is applied to limit the final list of concepts to an appropriately manageable size for consumption by an application. Concepts having a score above the threshold (and their corresponding textual representations) are provided as output (i.e., "entities").

Publishers can, through configuration 1018, specify customized rules for the combination function used to calculate final concept scores. For example, publisher 120 can specify as a rule that while all medical concepts should be considered by engine 906 when generating the document vector 1014, disease symptoms should not be output as entities. As another example, publisher 120 might choose to weight the values of the Whitelist/Blacklist signals more heavily than publisher 118, who might in turn prefer another signal, such as by preferring concepts with the higher freshness scores, or a monetization signal that measures how well a given concept monetizes. One benefit of using category-based monetization is that an extrapolation can be made as to the monetization of a very specific textual representation based on the concept (or higher level category/vertical) with which it is associated. It may be the case that pharmaceuticals monetize well but names of diseases do not. When a new pharmaceutical is introduced to market, the publisher need not take any action to indicate a preference toward textual representations of the new pharmaceutical as a candidate term. As another example, if specific words are empirically determined to monetize well on a given publisher's website (e.g., "golden retriever" or "collie"), the categorization of those words (e.g., "breeds of dog") within the taxonomy can be used by engine 906 to bias the selection of other words belonging the category (e.g., "beagle") even absent historic data for those other words.

In some embodiments, the threshold/cutoff is manually selected, such as by a publisher specifying in configuration 1018 that a maximum number of 10 entities be returned. In other embodiments, engine 906 applies a dynamically generated threshold based on factors such as the document length.

For example, the publisher can specify a link density, such as that up to 5% of the number of words in a document be included in entities. In some embodiments, the number of textual representations remaining in candidate list 1024 is used as a proxy for the document length. Other information, such as click-through rate data, can also be used to determine the cutoff number of entities and also as an additional, site-specific signal that can be stored (e.g., in database 908) and used while processing other documents (e.g., as an additional concept feature vector signal).

FIG. 15 illustrates an example of a portion of output generated by a document processing engine. The example shown illustrates the first and twenty-fourth ranked entities determined from the document shown in FIG. 11. The concept "Lunar Reconnaissance Orbiter" (and corresponding textual representation "Lunar Reconnaissance Orbiter") has the highest score as indicated in region 1502. The concept "academic conference" (and corresponding textual representation "scientific meeting") has a considerably lower score as indicated in region 1504.

Example Process for Detecting an Entity

Figure 16:
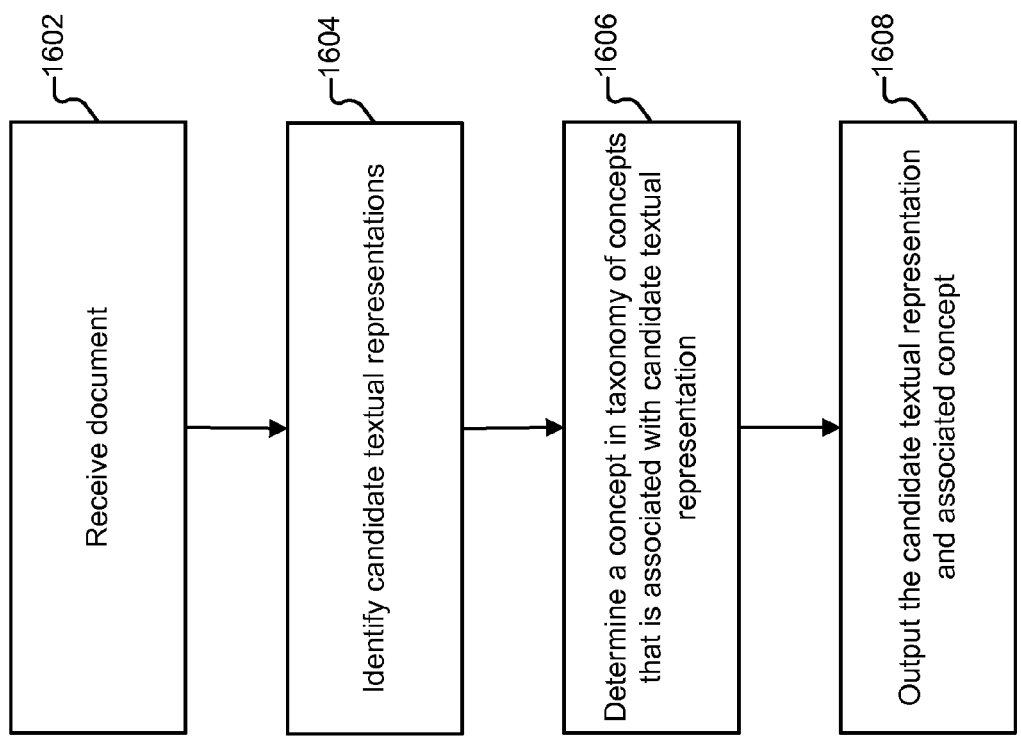
FIG. 16 illustrates an embodiment of a process for determining a mapping between a textual representation in a document and a concept.

FIG. 16 illustrates an embodiment of a process for determining a mapping between a textual representation in a document and a concept. In various embodiments, the process shown in FIG. 16 is performed by document processing engine 906. The process begins at 1602 when a document is received. As one example, a document is received at 1602 when the owner of blog site 118 submits a blog post and site 118 provides the post to system 906 via an API. At 1604, candidate textual representations are identified, such as by textual representation detector 1008. At 1606, concepts associated with the candidate textual representations are determined, such as by mapper 1028. As explained above, various refinements (e.g., disambiguation) and pruning of the candidate textual representations and associated concepts can be performed. Finally, at 1608 pairs of textual representations and associated concepts are provided as output.

Figure 17:
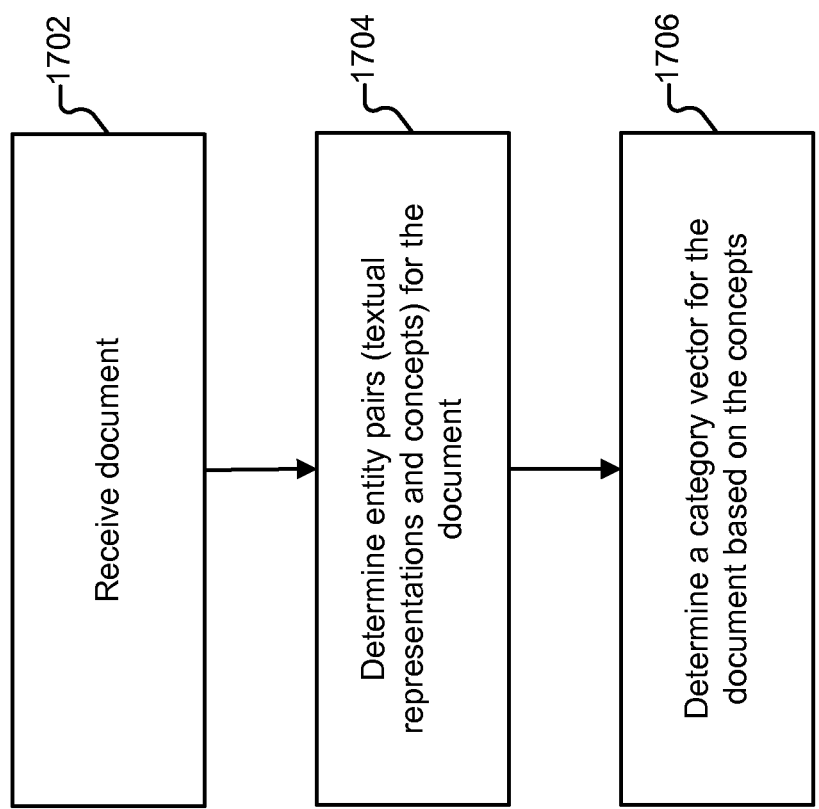
FIG. 17 illustrates an embodiment of a process for categorizing a document.

FIG. 17 illustrates an embodiment of a process for categorizing a document. In various embodiments, the process shown in FIG. 17 is performed by document processing engine 906. The process begins at 1702 when a document is received. As one example, a document is received at 1702 when the owner of blog site 118 submits a blog post and site 118 provides the post to system 906 via an API. At 1704, entity pairs are determined, such as in accordance with the processing shown at portions 1604-1608 of the process shown in FIG. 16. Finally, at 1706 a categorization of the document is determined. In some embodiments, this is document vector 1014. In various embodiments, the categorization determined at 1706 is thresholded prior to output, such as by being limited to the top three categories of the document vector.

Creating a Hierarchy of Concepts from a Corpus of Documents

Figure 18:
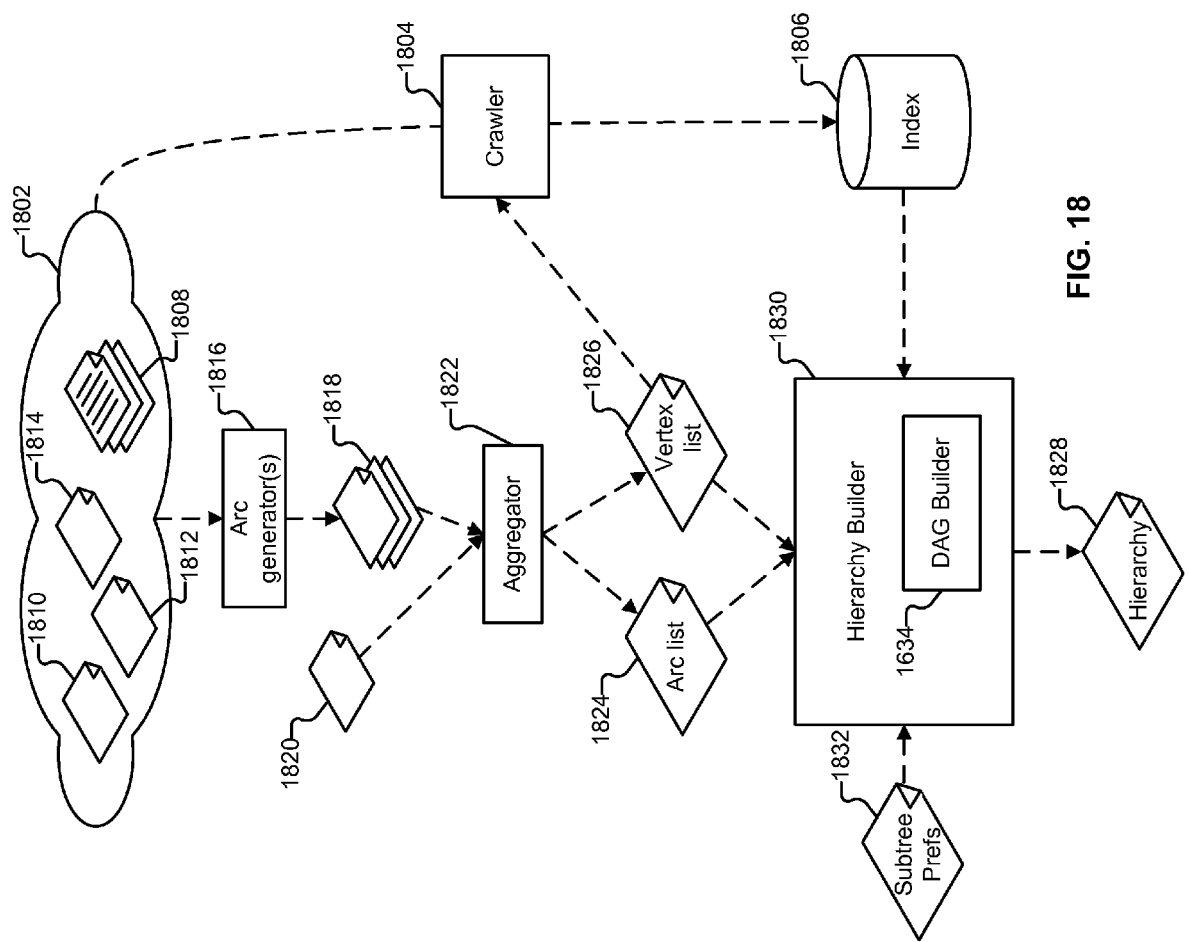
FIG. 18 illustrates an embodiment of a system for creating a hierarchy of concepts from a corpus of documents.

FIG. 18 illustrates an embodiment of a system for creating a hierarchy of concepts from a corpus of documents. In the example shown, collection 1802 includes a group of World Wide Web pages 1808 that are crawled, processed, and indexed by a crawler 1804 and stored, along with assorted scores and other information, in index 1806.

As described in more detail below, crawler 1804 performs tasks such as tagging the documents stored in index 1806 with subject type concepts and with information type concepts (also referred to herein as "infotypes"). Crawler 1804 also performs and stores the results of frequency and cooccurrence counts. Crawler 1804 may be a single device, or its functionality may be provided by multiple devices. For example, elements typically used in conjunction with a crawler to create an index, such as an indexer, are described herein as being provided by crawler 1804, but may also be performed by separate devices or components and the techniques described herein adapted accordingly. For example, in some embodiments, cooccurrence counts are performed by concept lighting engine 2804.

Documents in collection 1802 can include, but are not limited to text files, multimedia files, and other content. In some embodiments, collection 1802 includes documents found on an intranet. Also included in collection 1802 are a variety of concept data sources 1810-1814. In the example shown, source 1810 is the set of web pages known collectively as Wikipedia (and available, e.g., at http://en.wikipedia.org). Source 1812 is a directory of automobile makes and models, and source 1814 is a taxonomy of pharmaceuticals. In some cases, such as with Wikipedia, the pages are used both as concept data sources, and are also included in group 1808 and are crawled accordingly. In other cases, such as with the directory of automobile makes and models, the information may be restricted or otherwise not available to crawler 1804, and the concept data source will serve only as a concept data source and not be included in group 1808.

Concept data sources 1810-1814 each provide information that conveys some kind of relation between concepts and can be used as a source of concepts and also as a source of hierarchical relations between at least some of those concepts. For example, suppose a sample entry in automobile directory 1812 is: "2008 Honda Civic Sedan XL." Using the techniques described herein, it is possible to extract hierarchical information from the entry, for example, that the "2008 Sedan XL" is a type of "Honda Civic," and that a "Honda Civic" is manufactured by "Honda." Pages within Wikipedia typically refer to their conceptual parents by link. For example, the Wikipedia page on the topic of "Astronomy" has a link to its parent (typically by labeling the parent as its "category"), the more general subject of "Science." The Wikipedia page on the topic of "India" includes a link to "South Asian Countries," which includes a link to "Asian Countries" which includes a link to "Countries by Continent." The entries in the pharmaceutical taxonomy are likewise related to one another in a manner that can be harvested using the techniques described herein.

For each of the concept data sources 1810-1814, one or more arc generators 1816 are used to parse the respective concept data source, extract concepts and relations between concepts, and store the information in a common format (1818) that can be consumed by aggregator 1822. For example, a Wikipedia arc generator is configured to obtain and parse Wikipedia data made available as a single XML file. From the XML file, pairs of concepts—an article and a category to which it belongs—are extracted. Another arc generator is configured to parse the automobile directory (e.g., provided as a spreadsheet) and generate arcs accordingly, such as by knowing that for each line of the spreadsheet, the first column (year) should be combined with the last column to form "2008 Sedan XL," which has as its parent the second and third column ("Honda Civic"), which has as its parent just the second column ("Honda"). As used herein, an arc is a directional edge between two concepts. A concept is a word n-gram with meaning. One relation between concepts as used herein is an "is a" ("containing") relation. For example, "Physics:Science" is an arc that means "physics is a science" ("science contains physics"). As described in more detail below, additional relations may also be employed, such as by homonym and synonym arcs. Other directed relations between arcs that convey meaning may also be employed, and the techniques described herein adapted as applicable. For example, case variants and tokenization can be handled through the use of flags.

The respective content of concept data sources 1810-1814 may change at various times, and arc generators 1816 are configured to obtain and process fresh versions of data from their corresponding concept data sources as applicable so that files 1818 reflect the most currently known concepts and relations from those sources. For example, Wikipedia (1810) changes frequently, while the content of the pharmaceutical taxonomy 1814 may change very infrequently. As such, in various embodiments, arc generators 1816 periodically process their respective sources according to a schedule appropriate to the source (e.g., with the Wikipedia arc generator running weekly, and the pharmaceutical arc generator running monthly). Editorial list 1820 is a manually maintained list of arcs and relations used, for example, to designate a fixed set of top level concepts (also referred to herein as "verticals") and to ensure that those top level concepts are not moved underneath one another or omitted.

Aggregator 1822 aggregates the source-specific arc files 1818 extracted by their respective arc generators 1816 and the editorial list of arcs 1820 and creates as output arc list 1824 and vertex list 1826. As described in more detail below, arc list 1824 is a list of edges and properties that will be used to construct a concept hierarchy 1828. Each time aggregator 1822 runs, the newly constructed arc list 1824 replaces any previously constructed arc list. Vertex list 1826 is a persistent list of globally unique concepts that monotonically increases—maintaining a set of stable concept identifiers over the iterations of aggregator 1822's processing, and growing only when a concept not previously seen is encountered by aggregator 1822, which is then appended to the list.

As described in more detail below, hierarchy builder 1830 constructs hierarchy 1828 using arc list 1824 and additional information such as a list of subtree preferences 1832 and information obtained from index 1806. The subtree preferences list 1832 includes rules to be considered by hierarchy builder 1830 when evaluating arc list 1824. In various embodiments, hierarchy 1828 is stored as a list of pairs of concepts, a weight, and optionally other arc attributes such as homonym and synonym indicators. The weight is a rank indicating whether the arc is the primary arc between a concept and a parent ("1") or whether the arc is an additional arc (e.g., "2" or "3") that was inserted into the hierarchy after the primary arc was selected.

In some embodiments, hierarchy builder 1830 constructs hierarchy 1828 by building a directed graph based on the information it receives, and then extracting a directed minimum spanning tree ("DMST") from that graph (in which every concept (also referred to herein as a "node") present in the tree except the root has exactly one parent, and no cycles or orphans are present). A variety of techniques for finding a minimum spanning tree have been developed. One example is the Chu/Liu-Edmonds algorithm.

Hierarchy builder 1830 optionally employs a DAG builder 1834, which inserts additional nodes into the DMST to form a directed acyclic graph ("DAG") of concepts. An optional interface allows an administrator to view why nodes are placed in the hierarchy where they are and to audit the effects of making changes to the rules used in constructing the hierarchy. For example, if certain nodes are not consistently being placed under appropriate parents, an administrator can make additions to the subtree preferences list 1832 or add entries to editorial arc list 1820 as applicable. For example, an administrator may use the interface to specify that when B has C as a parent and A has a choice of parent B or C, A should select B as its parent so that a deeper hierarchy is created. This property of A, B, and C is sometimes referred to as transitive reduction.

FIG. 19A is a portion of an arc list according to one embodiment. In the example shown—a portion of aggregated arc list 1824—lines 1902 and 1904 were provided by the Wikipedia arc list 1818, lines 1906-1910 were provided by the automobile directory arc list 1818, and line 1912 was provided by editorial arc list 1820. As described in more detail below, one task performed by hierarchy builder 1830 is a determination of a "best parent" for a concept from among its candidate parents. In the example shown, "Car Manufacturers" has two candidate parents. The first is "Transportation" as suggested by Wikipedia (1902) and the second is "Kosmix Autos" as suggested by the editorial arc list (1912).

One factor that can be considered in the determination of which candidate parent is the best, is what score is assigned (e.g., by an administrator) to each of the candidate parents' concept source (referred to herein as an "arc rank" score). Typically, the arcs provided by specialized concept sources (such as the automobile directory) are preferred over more general concept sources (such as Wikipedia). In the example shown in FIG. 19A, a lower arc rank score indicates a better (preferred) source. In some embodiments, arc rank generators 1816 are configured with what arc rank score should be assigned their respective arcs, and those scores are included in the source specific arc rank files 1818. In other embodiments, aggregator 1822 is configured by an administrator with a list of sources and their respective scores.

Wikipedia as a source has a score of 20, as indicated in region 1914. The automobile directory is considered a "better" source of information than Wikipedia for its specialized information on automobiles, and therefore, each of the arcs that are contributed to arc list 1824 by its arc list 1818 receive a score of 10, as indicated in region 1916. The editorial arc list is intended to override entries in arc list 1824 provided by source specific arc lists 1818 and has an even better (lower preference order) score as indicated in region 1918. As described in more detail below, a graph constructed from the data shown in FIG. 19A would include a leaf "Honda Civic RX" which is a "Honda Civic" which is made by "Honda" which is a "Car Manufacturer(s)" which is contained by "Kosmix Autos."

FIG. 19B is a portion of a vertex list according to one embodiment. The vertex list 1826 represents a list of all known concepts and is used by crawler 1804 to perform document frequency counts as described in more detail below. In the example shown, the vertex list is maintained in the form of human readable concept (column 1) and unique identifier (column 2). For example, "Kosmix Root," which serves as the root of the DMST produced by hierarchy builder 1830 has a unique ID of "000000," while the concept "rabbit" has a unique ID of "103817."

FIG. 19C is a portion of an arc list according to one embodiment. Some word n-grams, such as "jaguar," have ambiguous meanings absent additional context. For example, "jaguar" could refer to the automobile, the mammal, an operating system, etc. Wikipedia attempts to mitigate such ambiguity by presenting a "disambiguation page" in scenarios such as where a user types in the ambiguous term into a search box. A related problem is that of synonyms. For example, "puma," "mountain lion," "panther," and "cougar" are all terms used to refer to the animal *Felidae Puma P. concolor*. Wikipedia attempts to mitigate the proliferation of entries by designating one of the terms as a "main" entry, and redirecting to the main entry any attempts to access information by using the synonymous term. For example, "J_K_Rowling" (a pen name) is the main entry for the author whose legal name is "Joanne Murray." If a user of Wikipedia attempts to access an article on "Joanne Murray," they are redirected to the entry titled "J_K_Rowling." The homonym and synonym annotations are made available in hierarchy 1828 and can be used by a lighting system as described in more detail below.

In the example shown in FIG. 19C—a portion of aggregated arc list 1824—each of the lines was provided by the Wikipedia arc list 1818. The Wikipedia arc generator 1816 is configured to recognize disambiguation pages when parsing the Wikipedia source XML file and record as arcs the ambiguous term and each of the disambiguated options in the arc list 1818 as a pair, along with a "hom" (for homonym) flag. Each disambiguated word is given a separate entry in the vertex file, such as the "Jaguar_animal" line shown in FIG. 19B. The Wikipedia arc generator 1816 is also configured to recognize redirection pages when parsing the Wikipedia source XML file and records as arcs each of the synonyms and the main entry ("cougar") in the arc list 1818 as a pair, along with a "syn" (for synonym) flag. In some embodiments, different weights are given to homonyms and/or synonyms over normal arcs instead of or in addition to the use of flags.

In some embodiments aggregator 1822 is configured to remove homonym arcs in which the ambiguous term and the disambiguated term do not begin with the same word, so that the over generation of homonym arcs is reduced. For example, since "Mac OS Jaguar" does not begin with "Jaguar," it is removed (or omitted, as applicable) from arc list 1824. As another example, Wikipedia offers "Fiona Apple" as a disambiguation of "Apple." Such an arc would likewise be deleted or omitted from arc list 1824.

FIG. 19D is a portion of a subtree preferences list according to one embodiment. In the example shown, the first column is the name of a concept, the second column is a score, and the third column is a depth. When hierarchy builder 1830 determines a best parent for a concept from among its candidate parents, one factor that can be considered is whether there is relevant information in the subtree preferences list. A subtree preferences list can be used to reduce the likelihood that a bad parent (e.g., that does not maintain the "is a"/containing relationship) will be selected over a better parent (e.g., that does preserve the relation). For example, many famous people will have as a candidate parent the concept "living people." There are over 300,000 such entries in Wikipedia. Entry 1982 in the subtree preferences list states that any arc in which a concept has as a candidate parent "living people" is to be disfavored. Concepts such as "living people" and "things in 1900" exist in Wikipedia but their inclusion in hierarchy 1828 is generally disfavored. While Stephen Hawking and Sting are both "living people" and contained by that Wikipedia category, a more meaningful hierarchy can be constructed if their respective parents are "Scientists" and "Musicians." Virtually all people present in the living people category of Wikipedia have something to recommend about themselves beyond the fact that they are alive. Such arcs are disfavored rather than discarded in some embodiments to avoid creating orphan nodes.

In contrast, entry 1980 states that any chain of arcs (with up to 3 levels distance) that includes a parent of "countries by continent" is to be preferred. In some embodiments, entries in the subtree preferences list are applicable at all depths and the depth column is omitted. What entries should be included in the subtree preferences list (and what scores/depths should be assigned) is generally subjective, and can be refined over time, such as by evaluating logs. The subtree preferences provide a mechanism for an administrator to remove or favor a potentially large number of arcs without having to manually enter rules for each arc. For example, by preferring "countries by continent," all countries listed in Wikipedia will tend to be grouped under countries by continent (possibly at varying depth levels), and an administrator need not specify a rule for each country.

Figure 20:
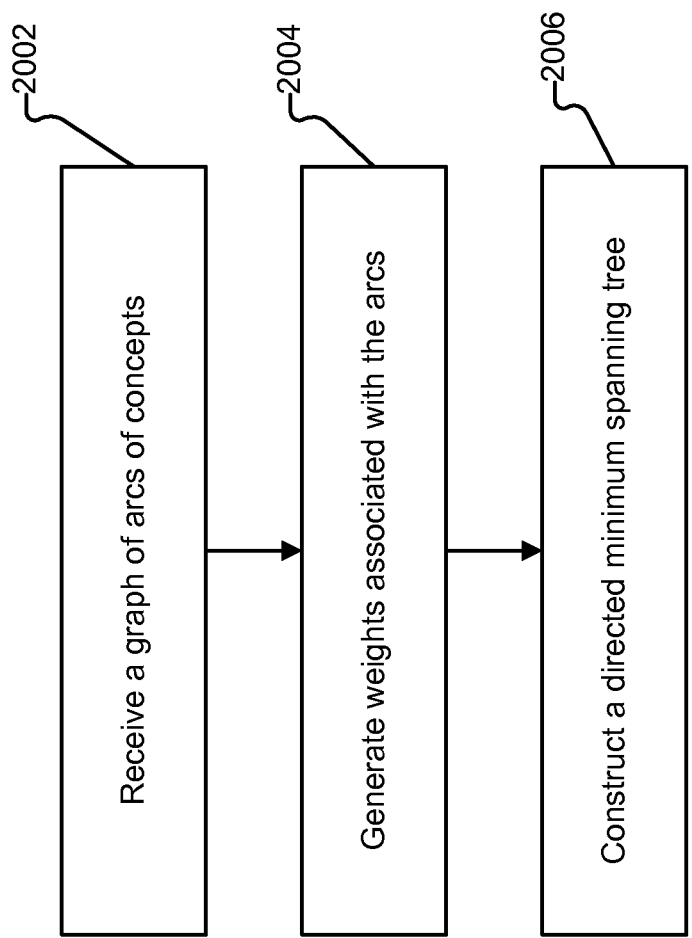
FIG. 20 is a flow chart illustrating an embodiment of a process for creating a hierarchy of concepts from a corpus of documents.

FIG. 20 is a flow chart illustrating an embodiment of a process for creating a hierarchy of concepts from a corpus of documents. In some embodiments, the process shown in FIG. 18 is performed by hierarchy builder 1830.

The process begins at 2002 when a graph of arcs of concepts is received. In some embodiments, the graph includes the XML representation of Wikipedia. In some embodiments, the graph comprises an arc list such as arc list 1824. Other sources of arcs of concepts, at least some of which can be connected to form a graph (irrespective of whether that graph contains some orphans or cycles) may also be used, as applicable. For example, in some embodiments a graph or portions thereof is received from a third party at 2002.

At 2004, weights associated with the arcs in the graph are generated. As described in more detail below, a variety of techniques can be used, individually and in combination, to generate weights at 2004. For example, arc rank scores, Boolean values, cooccurrence scores, mutual information, etc., can be used to form a single weight or a vector of weights at 2004.

At 2006, a directed minimum spanning tree is extracted from the graph received at 2002. In some embodiments, preprocessing is performed, such as to remove orphan nodes which cannot be reached from the root, and the directed minimum spanning tree is extracted from the preprocessed graph rather than the graph as received at 2002. One way of constructing a DMST is as follows. For each node in the graph, a single parent is selected, such as by using the vector of weights generated at 2004 to evaluate candidate parents. By biasing the selection of parents toward the best parent (e.g., the one with the lowest source score), an attempt is made to preserve the consistency of the "is a"/containing relationship up the DMST, such as that calculus is a form of mathematics. Next, any cycles in the graph are detected by hierarchy builder 1830. An example of a cycle is an arc from "ships" to "boats" and another from "boats" to "ships" both being present in the graph. Sometimes cycles are created in Wikipedia data because two nodes are imputed to have a hierarchical relationship when they are in fact peers. For example, a node "Bert" may have as a parent "Ernie" and vice versa. Hierarchy builder 1830 runs a process to reduce the number of cycles. The selection of a best parent, the detection of cycles, and the reduction of cycles continues iteratively until an acyclic tree is formed. As described in more detail below, optional post processing can be performed on the acyclic tree.

FIG. 21 illustrates an example of a vector of weights according to one embodiment. Suppose that two arcs for the concept "Ronald Reagan" (2102) are present in arc list 1824. As mentioned previously, one portion of the process for constructing a DMST from a graph of directed arcs is to select one parent from among the candidate parents of a node. Generally, if only one arc for a concept exists, that arc is used. If the candidate parent must be selected from multiple candidates, in some embodiments, a pairwise lexicographical comparison is performed between the vectors of weights of those candidates. In the example shown in FIG. 21, the two candidate parents of "Ronald Reagan" are "U.S. President" and "Actor" (2104). Indeed, Ronald Reagan was both a U.S. President and an actor, so the selection of either candidate would result in the preservation of the "is a" meaning between the node in column 2102 and the node in column 2104.

In various embodiments, some values included in the vector of weights are read in from files, and others are provided by additional processes (e.g., plugins) which calculate and provide scores. The first portion of the vector of weights to compare between the two candidates is the "variance" score, indicated in column 2106. The variance score indicates the number of internal links which point to the candidate parent. Both candidate parents have a score of three, meaning that the vectors are tied, so the next portion of the vector is evaluated.

The next portion of the vector of weights to compare between the two candidates is the "vertical correction" score, indicated in column 2108. In some embodiments the construction of a DMST is performed twice. The first time it is run, the vertical correction score is zero. The second time it is run, a vertical correction score is determined by a process that attempts to keep nodes that are peers grouped together under the same parent. For example, suppose that 95% of house plants are placed under "botany," but 5% select as best parents "health" on the first run. The vertical correction process is configured to detect the discrepancy and will indicate that a "botany" parent should be selected by returning a nonzero score in column 2108 (such as a Boolean value) during the second run. In various embodiments, normalization and/or a threshold is applied so that in cases such as a 60/40 split, the vertical correction process does not attempt to group peers under the same parent. In the example shown, both candidates have a score of zero. The vectors are tied, so the next portion of the vector is evaluated.

The next portion of the vector of weights to compare between the two candidates is the "templates" score, indicated in column 2110. The value for the templates score is provided by a process that evaluates nodes against groups or lists of concepts and attempts to keep those groups together. If concepts are present in multiple groups, the process attempts to keep the most number of groups; or the most important groups together, etc., as applicable. The lists/groups may be provided by a third party and/or configured by an administrator or otherwise obtained. For example, Wikipedia provides set information for certain entries which can be scraped by crawler 1804. Examples of groups include a list of the planets in the solar system, a list of human diseases, a list of the seven dwarves, British Commonwealth countries, etc. In the example shown, Ronald Reagan appears in a list of United States presidents. As such, a score of one is present in column 2110 for "U.S. President" but not for "Actor." Since there is no longer a tie between the two vectors, "U.S. President" would be selected as the best parent for the concept "Ronald Reagan." If both values in column 2110 were equal, however, the next portion of the vector would be evaluated, and so on, until the tie was broken. In the example shown, the remaining columns are as follows. Column 2112 reports whether a process evaluating the loaded subtree preferences list 1832 has determined that a positive or negative preference exists for the arc. If no such preference is found, column 2112 reports a zero. If a preference is found, it is indicated in some embodiments as a positive or negative value. Column 2114 is the arc rank score described previously.

Columns 2116, 2118, and 2120 report various statistics about the presence of the concept and its candidate parent within the documents stored in index 1806.

The "occ" column (2116) includes a score that represents a frequency count for the concept. A frequency count indicates the frequency of the occurrence of the concept within the pages in index 1806. The frequency count is determined in some embodiments by crawler 1804 using vertex list 1826 to scan through each of the documents in index 1806 and increment the "occ" for the concept for each page in the index that includes at least one occurrence of the concept. The "pocc" column similarly represents a frequency count for the candidate parent.

The "cooc" column includes a score that represents the cooccurrence of the concept and candidate parent in the pages in index 1806. Cooccurrence scores are determined in some embodiments by crawler 1804 evaluating the cooccurrence of concepts which are connected by an arc (e.g., are present in arc list 1824). Techniques such as using a running window of words can also be employed to avoid quadratic blowup.

Figure 22:
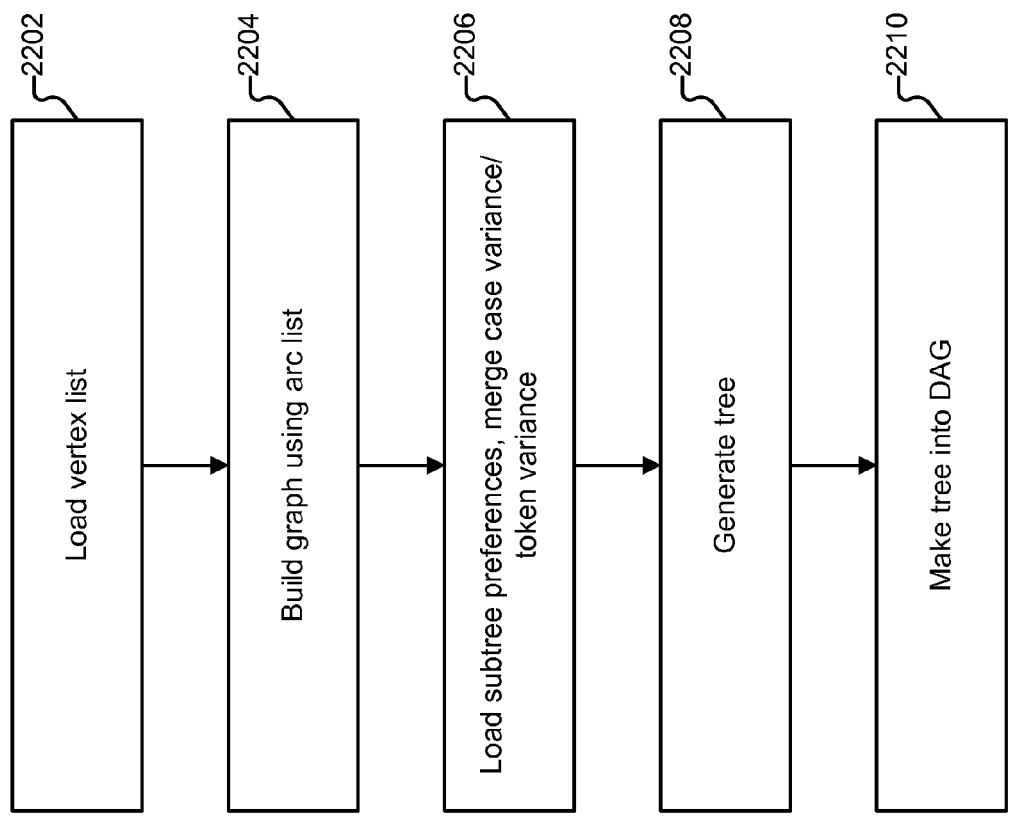
FIG. 22 is a flow chart illustrating an embodiment of a process for creating a hierarchy of concepts from a corpus of documents.

FIG. 22 is a flow chart illustrating an embodiment of a process for creating a hierarchy of concepts from a corpus of documents. In some embodiments, the process shown in FIG. 22 is performed by hierarchy builder 1830.

The process begins at 2202 when vertex list 1826 is loaded, allowing hierarchy builder 1830 to map concept names (e.g., human readable concept names) to concept IDs. At 2204, a graph is built using arc list 1824—for example by connecting pairs of concepts together and storing any associated properties. If duplicate arcs are encountered, the properties of the duplicate arcs are merged. For example, if one line in arc list 1824 reads Physics:Science:20 and another line in arc list 1824 reads Physics:Science:10, the arcs are "merged" with the best weight being preserved (e.g., Physics:Science:10). If one source indicates that an arc is a homonym arc, and another source indicates that the arc is a synonym arc, the arcs are merged and both flags are set for the merged arc. At 2206, subtree preferences list 1832 is loaded, as are any applicable case variance or tokenization variance information.

At 2208, a DMST is constructed. First, a best parent is selected for each node by performing a local decision comparing vectors of weights. Next, cycles are detected. One way of detecting cycles is to traverse the graph, marking each node as "seen" as it is visited. If a node is reached again during the traversal, a cycle has been located. For each cycle, an evaluation is made between the cost of removing an arc and the cost of adding an incident arc, and selecting the appropriate arcs whose addition/removal have the lowest associated cost. In some embodiments, the comparison is a difference of vectors, and is computed by replacing the values in the vectors with minwise elements. As stated previously, the selection of a single parent, the detection of cycles, and the reduction of cycles continues until each node (except the root) has exactly one parent. In some embodiments, post processing is performed, such as vertical correction.

At 2210, the DMST is extended to a DAG using additional arcs. For example, at 2210, synonym arcs are inserted into the DMST, as are homonym arcs, so long as acyclicity is preserved. In some cases, additional concept arcs are included in the DAG where doing so would not result in the formation of a cycle. For example, including "Actor" as a second parent of "Ronald Reagan" will not result in a cycle and will preserve the "is a" relationship up the hierarchy. However, the insertion of other arcs (not previously shown), such as between "Ronald Reagan" and "Hollywood Walk of Frame," might be inappropriate, e.g., because the "is a"/containing relation would be skewed away (e.g., if the parent of "Hollywood Walk of Frame" is "Landmarks"—Ronald Reagan is not a Landmark). One way of inserting additional arcs into the DMST is to first globally rank the omitted arcs. Rules can be used, such as that additional arcs will be inserted into the DAG, in the globally ranked order, so long as the arc to be inserted is of a smaller depth than the existing single parent for the node, or that arcs can be inserted within the same vertical but only one additional arc may be added into a different vertical from the existing single parent, or that additional arcs must have a threshold cooccurrence score before they are placed into the DAG.

In some embodiments at least some orphan nodes are placed back into the DMST at 2210. One way of placing orphans is to perform a search using the orphan as an input to the query categorization techniques described in more detail below. If the results are sufficiently dense, the orphan can be placed in the appropriate place in the DAG. Similarly, the hierarchy of concepts can be expanded by crawling the documents 1808 for word n-grams and also attempting to place them into the DAG by using the word n-grams as an input to the query categorization techniques described in more detail below.

Figure 23:
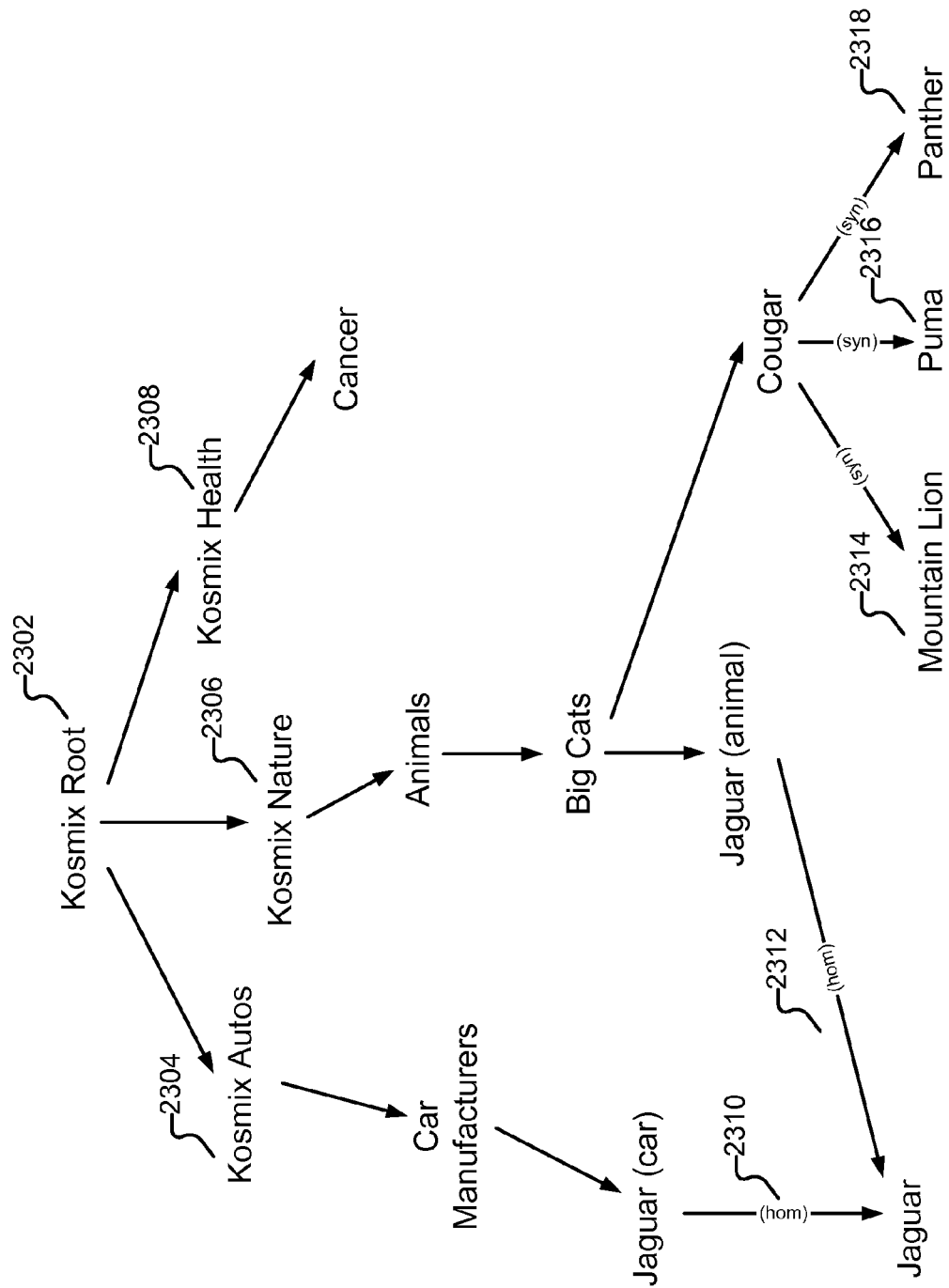
FIG. 23 illustrates an example of a portion of a concept hierarchy.

FIG. 23 illustrates an example of a portion of a concept hierarchy. The example shown is an example of a portion of a DAG created using the process shown in FIG. 22. At the root of the hierarchy is a root node 2302. Assorted verticals 2304-2308 have a containing relation to their respective children. For example, Kosmix Autos contains Car Manufacturers which contains the Jaguar automobile manufacturer. Homonym arcs 2310 and 2312 exist between the ambiguous term, Jaguar, to two of the disambiguated meanings of the concept. Synonym arcs 2314-2318 exist between the main instance of the concept "Cougar" and assorted synonyms for the concept.

Tagging Documents with Concepts

Figure 24:
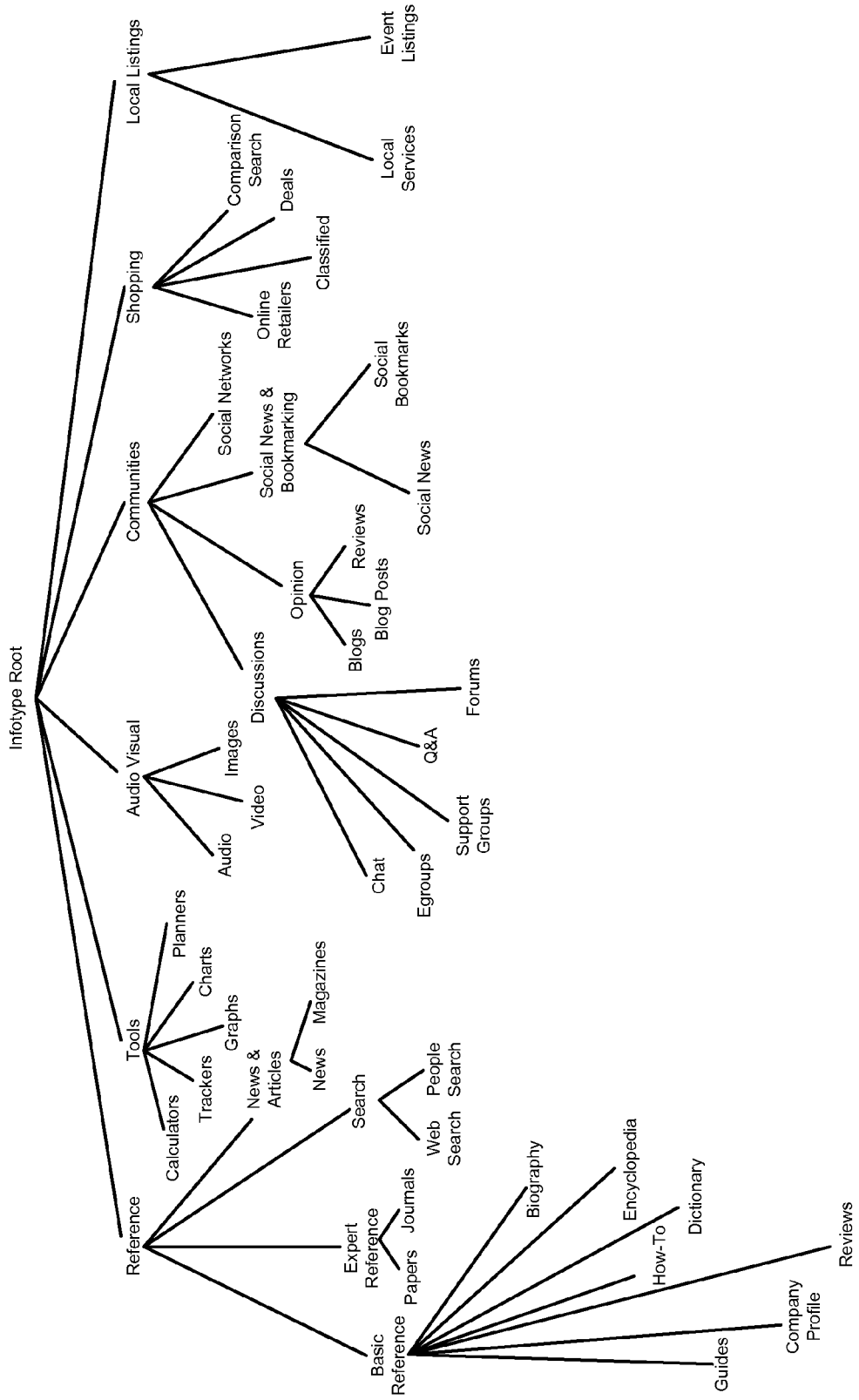
FIG. 24 illustrates an example of a hierarchy of information types according to some embodiments.

FIG. 24 illustrates an example of a hierarchy of information types according to some embodiments. Both the hierarchy of subject type concepts 1828 constructed by hierarchy builder 1830 (or received, for example from a third party such as by using the Open Directory) and a hierarchy of infotypes, such as is shown in FIG. 24, can be used to tag the documents stored in index 1806 using a variety of techniques.

One way of tagging a document in index 1806 with subject type concepts is as follows. For each concept in vertex list 1826, use the concept as a search query against the documents in index 1806. Evaluate the results using standard text match and link scoring techniques (e.g., by examining the number of occurrences of the query on the page, the page title, the link text, metadata, whether the concept appears in bold, etc). Such techniques, which measure how well the text of a query matches a document are collectively referred to herein as "text match scoring" techniques producing "text match scores," although more than just the text of the document may be evaluated by such techniques.

For any particular page, the concept (query) which results in the highest text match score for the page is that page's top concept. The concept which results in the second highest text match score for the page is that page's second concept, etc. Any given document may include thousands of concepts from vertex list 1826. Thus, in some embodiments, a threshold is applied and the document is tagged with its resulting top n concepts, such as the top 30 concepts.

Websites typically have common elements across the various pages that are included in that site. For example, a news website may include a left or right navigational section that includes the terms, "Health," "Finance," "World News," etc. The site may also include a prominent logo on every page. In some embodiments such common elements are identified and ignored or stripped during indexing so that text match scores are not skewed by the prolific presence of those common elements. Identifying and ignoring or stripping common elements allows text match scores and infotype rules to be applied specifically to the distinct content of each document.

One way of tagging a document in index 1806 with an infotype is to determine whether any rules associated with those infotypes is satisfied by the document. For example, documents hosted by a known image hosting service (e.g., stock-photo library), or having an image with a certain minimum pixel size may be indicative of an image type document (e.g., a document having one or more informative images), and be tagged as having an infotype "images." Conversely, documents with discouraging ALT text (e.g., "advertisement"), a standard advertisement size or location, and generic filenames suggestive of being merely decorative or formatting elements (e.g., "pixel.gif", "footer.jpg") indicate that while including an image, the document is unlikely to be of interest to a user seeking images and are not tagged with the "images" infotype.

Documents hosted by a known news site (e.g., www.wsj.com), having a title indicative of a news source (e.g., "Breaking News"), or including a copyright notice from a known news agency/newswire (e.g., "Associated Press") are tagged as being of infotype news. Documents with a title that includes words such as "event," "calendar," "upcoming," etc., are tagged with the "events" infotype. Documents that include terms specific to categories of local venues (e.g., amusement parks, toy stores, police stations, That restaurants, dentists) or including links to map services are tagged with the "local" infotype. Documents that include terms (e.g., appearing on a wordlist) such as "add to cart," "coupon," and "checkout" are tagged with a "shopping" infotype, etc.

If multiple rules for different infotypes are satisfied by a document, the document is tagged with multiple infotypes as applicable. For example, a photojournalist's blog about current events might be tagged with both the "images" and the "news" infotypes.

Although the foregoing embodiments have been described in some detail for purposes of clarity of understanding, the invention is not limited to the details provided. There are many alternative ways of implementing the invention. The disclosed embodiments are illustrative and not restrictive.

Processing Of Real-Time Data Streams

Many computational methods depend on processing large volumes of real-time data in a distributed manner using a large number of computers. Recent years have seen an explosive growth in the volume of real-time data that may be used by computational methods in many domains. Real-time data is increasingly being made available and being used by a large number of people, for example, through popular social networking services, such as the Twitter™ and Facebook™ social networking websites. The increasing availability, use and growth of real-time data raise real-time data overload issues and the need for sophisticated computational methods that are able to process and track desired information in the real-time data in a rapid, distributed and fault-tolerant manner.

Exemplary embodiments provide devices, systems and methods for performing large-scale long-running stream computations on real-time data streams in which input data in the data streams is selectively read and output data is written to durable storage. Exemplary embodiments allow computations to be performed on input data streams that are dynamic and evolving in real-time as the computations are being performed. That is, exemplary embodiments are not restricted to performing computations on static snapshots of data streams or static data sets. Nonetheless, one of ordinary skill in the art will recognize that exemplary embodiments may also be used to perform stream computations on non real-time data streams and on computations on non-stream data, e.g., static data or static snapshots of data streams.

Exemplary embodiments may allow one or more applications to perform real-time stream computations using one or more map operations and/or one or more update operations. A map operation is a stream computation in which stream events in one or more real-time data streams are processed in a real-time manner to generate zero, one or more new stream events. The map operation may publish the generated stream events to one or more real-time data streams in a real-time manner. In an exemplary embodiment, a map operation may publish stream events to a data stream from which it receives stream events as input. An update operation is a stream computation in which stream events in one or more real-time data streams are processed in a real-time manner to create or update one or more static "slate" data structures for persistent storage in durable disk storage. In some exemplary embodiments, an update operation may generate zero, one or more new stream events. The update operation may publish the generated stream events to one or more real-time data streams in a real-time manner. In an exemplary embodiment, an update operation may publish stream events to a data stream from which it accepts stream events as input.

Conventional mechanisms of performing computations on large volumes of data include search engines that provide a gateway to the World Wide Web. An exemplary conventional search mechanism offered is by Google Inc. which includes hardware components including clusters of commodity nodes connected through commodity networking means, and software components including the Google File System and the MapReduce software framework. The MapReduce software framework supports distributed computing on large data sets on clusters of computers. MapReduce employs, inter alia, map operators that partition input data and distribute them to worker nodes, worker nodes that processes the data partitions to generate answers, and reduce operators that collect the answers and combine them to form the output.

However, conventional mechanisms like MapReduce are not suitable for use in processing or performing computations on data streams because data streams possess certain fundamentally different properties from the types of non-stream data sets that may be processed by MapReduce. MapReduce is only capable of being run on a static snapshot of a data set in which the input data set does not and cannot change between the start of the MapReduce computation and the end of the computation. For example, in MapReduce, no reduce operator can be run until all of the map operators have completed processing data. In contrast, exemplary embodiments allow stream computations to be performed on data streams that are changing and evolving in real-time as the computations are being performed. That is, exemplary embodiments are not restricted to performing computations on static snapshots of data streams or static data sets.

Every MapReduce computation has a definite "start" point and a definite "finish" point, i.e., the computation does not continue forever or for an indeterminate period of time. In MapReduce, for every key that the reduce operators view, the operators need to view all of the values associated with the key, which is not possible to view in a streaming model. In contrast, exemplary embodiments allow stream computations to be performed on data streams that may continue forever or for an indeterminate period of time. Since exemplary stream computations may proceed for an indeterminate period of time, a large amount of state may begin to accumulate in the system. Exemplary embodiments provide mechanisms for storing state so that the state is efficiently accessed and updated in stream computations, e.g., update operations. In addition, in order to avoid an explosive and continual growth in the state saved in the system, exemplary embodiments provide mechanisms to "forget" or delete desired portions of the state.

Conventional computational mechanisms are not susceptible to spikiness in the input data because, since these mechanisms operate on static snapshots of the data over time, spikes in the input data are smoothed away. As a result, conventional mechanisms are able to achieve natural load balancing by partitioning the input data in any suitable manner. In contrast, stream computations performed in exemplary embodiments are susceptible to spikiness in the flow of stream events in the input data streams. For example, a particular topic or link may suddenly become "hot" or popular in an input data stream, resulting in a sudden surge and a subsequent sudden subsidence in the number of stream events in the input data streams that are related to that topic or link. In a distributed computing model, spikiness in input data streams can result in "hot spots" in the data structures and nodes used to perform computations relating to a popular topic or link. In order to maintain computational efficiency in the face of this issue, exemplary embodiments are able to react in a fast and efficient manner to surges in input data streams, and to balance computational loads relating to the "hot spots" so that that the data structures and nodes are still able to operate efficiently and generate output in short response times.

In conventional computational mechanisms like MapReduce, it is possible to re-start a computation in case of a software error or hardware failure. However, it may not be possible to re-start stream computations performed on real-time data streams as the data streams may continue to flow at their own rate oblivious to computational or processing issues. Exemplary embodiments allow computational processes to recover from software errors and hardware failures in a fast and efficient manner to avoid lagging behind input data streams.

Conventional mechanisms like the MapReduce software framework typically read and produce large files that are stored in disk storage that may be represented as a distributed storage layer, like the Google File System and the Hadoop™ Distributed File System (HDFS). In contrast, there is a reduced need for a large disk storage or a large distributed storage layer in exemplary embodiments. Exemplary stream computations may be less disk-heavy and more memory-heavy than conventional mechanisms like the MapReduce software framework. This is because exemplary data stream computations may read a stream as it flows by, maintain in disk storage data structures pertaining to the stream, and maintain in memory one or more active or recently accessed data structures to facilitate fast and efficient access of the in-memory data structures.

I. Definitions of Certain Relevant Terms

Certain terms are defined below to facilitate understanding of exemplary embodiments.

As used herein, the terms "data stream," "event stream" and "stream" refer to a sequence of one or more units of data that are published or transmitted in a real-time manner.

As used herein, the terms "stream event" and "event" refer to a unit of data published or transmitted in a data stream in a real-time manner. A stream event may have any suitable data structure or format. In an exemplary format, a stream event may include a collection of one or more attribute-value pairs.

As used herein, the term "slate" refers to a static data structure that may be used to record data about a set of one or more related stream events. A slate may have any suitable data structure or format. In an exemplary format, a slate may include a collection of one or more attribute-value pairs. A slate may be stored corresponding to its unique slatekey attribute value and corresponding to an update operation that updates the slate.

As used herein, the terms "operator" and "operation" refer to a set of one or more computations performed at least partially on one or more stream events in a data stream.

As used herein, the terms "map operation," "map operator" and "mapper" refer to a stream operation performed in exemplary embodiments in which stream events in one or more real-time data streams are processed in a real-time manner to generate zero, one or more new stream events. The generated stream events may be published to one or more real-time data streams. In an exemplary embodiment, a map operation may publish stream events to a data stream from which it accepts stream events as input.

As used herein, the terms "update operation," "update operator" and "updater" refer to a stream operation performed in exemplary embodiments in which stream events in one or more real-time data streams are processed in a real-time manner to create or update one or more persistent static "slate" data structures that are stored in a persistent manner in a durable disk storage. In some exemplary embodiments, an update operation may generate zero, one or more new stream events. The generated stream events may be published to one or more real-time data streams. In an exemplary embodiment, an update operation may publish stream events to a data stream from which it accepts stream events as input.

As used herein, the term "stream computation" refers to a computation performed in real-time on an input that is received from a real-time data stream. That is, the input received by the stream computation may be dynamic and may change over time even as the stream computation is being performed. A stream computation may generate an output that takes the form of a stream event that is published to a real-time data stream, or a data structure that is updated in real-time based on the computation. A stream computation may be performed by one or more map operations and one or more update operations. Exemplary stream computations may include, but are not limited to, determining one or more "hot" or popular topics on Twitter™, determining the time of the last post published by a Twitter™ user, performing K-rank computations to determine a user's influence on other users, performing analytics on data published on a website, determining a user's current interests based on their postings on social networking websites, grouping web page view events into "visits" and generating aggregate statistics over "visits" (such as, a rate at which the web page view is terminated, the number of page views per "visit"), determining different sets of links on a web page to identify a set that maximizes the click-through rate (CTR), and the like.

As used herein, the term "distributed" refers to a system or framework in which a data computation layer and/or a data storage layer may be implemented so that different portions of the data computation or different portions of a data storage are distributed over a plurality of computing devices, e.g., commodity nodes, worker nodes, etc. The computing devices may be geographically proximal to or remote from one another.

As used herein, the term "computer-readable medium" refers to a non-transitory storage hardware, non-transitory storage device or non-transitory computer system memory that may be accessed by a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM, etc.) and the like.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

II. Exemplary Data Types

Exemplary embodiments provide one or more data types suitable for real-time data stream processing including, but not limited to, data streams, stream events and slates.

A stream event is a unit of data in a real-time data stream. An exemplary event may be implemented in any suitable data structure or format. An exemplary event data structure may include one or more attributes and corresponding attribute values. In exemplary embodiments, the attributes may be atomic and the attributes values may be atomic or collection types, e.g., sets, lists, etc.

In an object-oriented implementation, an "Event" class or object may be defined to represent stream events. Exemplary embodiments may provide functionality to create one or more new stream event objects, and to access information contained in the one or more event objects, for example, using get methods in an object-oriented implementation. In an exemplary embodiment, events may be immutable, i.e., may not be altered once created. In this embodiment, if it is necessary to add or alter an attribute of an event, exemplary embodiments may create a new event copied from the existing event, add or alter the attribute, and publish the new event to an appropriate data stream. In another exemplary embodiment, events may be mutable, i.e., may be altered. In this embodiment, exemplary embodiments may provide functionality to alter one or more attributes of an event, for example, using set methods in an object-oriented implementation.

Figures 25, 26:
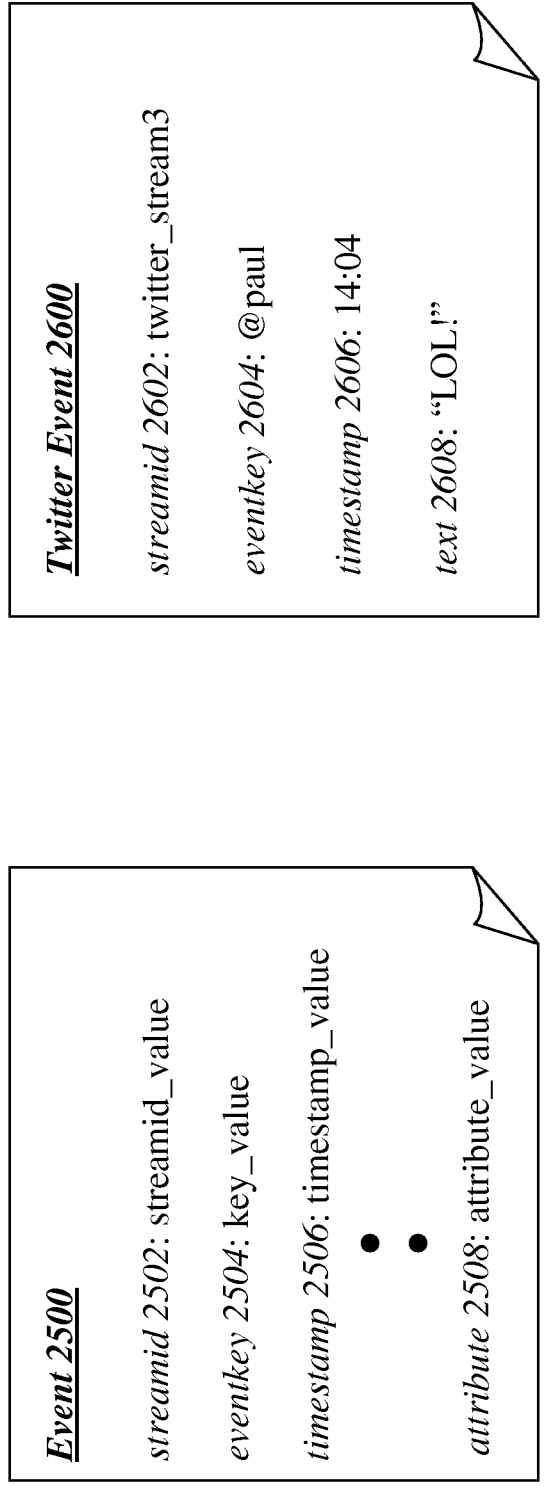
FIG. 25 is a block diagram representing an exemplary generic stream event.
FIG. 26 is a block diagram representing an exemplary "tweet" stream event transmitted in a Twitter™ data stream.

FIG. 25 is a block diagram representing an exemplary generic stream event 2500. In exemplary embodiments, an event 2500 may include a streamid attribute 2502 having a value that denotes a stream to which the event belongs. In exemplary embodiments, an event 2500 may include an eventkey attribute 2504 having an atomic value that designates a desired characteristic of the event that may be common to two or more events. The eventkey attribute 2504 may be used to group related events, and there is no requirement that the value of the attribute be unique across events. In one example in which "tweet" events in a Twitter™ stream are grouped by the user, an eventkey attribute value for a "tweet" may be the user ID of the user who generated the "tweet." In another example in which events in a stream are grouped by category, an eventkey attribute value for an event may be one or more categories of the event, e.g., news, music, and the like.

In exemplary embodiments, a stream event 2500 may include a timestamp attribute 2506 having a value indicating the time at which the event was generated. In an exemplary embodiment, the time recorded in the timestamp attribute value may be a global time that is applicable uniformly across all real-time data streams of interest, e.g., Twitter™ and Facebook™ data streams. That is, the global timestamp attribute value may be generated by the system, and not by each data stream individually. In an exemplary embodiment, each data stream may also add a local time relative to the stream to the timestamp attribute value. The timestamp attribute values may monotonically increase in some exemplary embodiments.

Exemplary events may include one or more additional attribute-value pairs 2508 based on the type of the data streams or the type of the events. For example, "tweet" events may include Twitter™-specific attributes and corresponding values, e.g., a text attribute that has as its value the entire text of a particular "tweet."

FIG. 26 is a block diagram representing an exemplary "tweet" event 2600 received in a Twitter data stream. The "tweet" event 2600 may include a streamid attribute 2602 whose value denotes that the event belongs to a Twitter™ stream titled "twitter_stream3." The "tweet" event 2600 may include an eventkey attribute 2604 whose value denotes that the username of the user generating the event is "paul." The "tweet" event 2600 may include a timestamp attribute 2606 whose value denotes the global and/or local time "14:04" at which the event was generated. The "tweet" event 2600 may also include a text attribute 2608 whose value includes the entire text of the "tweet," e.g., "LOL!"

A set of one or more stream events may be modeled and implemented as a data stream having a streamid attribute with the same value as that of the streamid attributes of its constituent events. That is, a data stream includes one or more stream events having the same streamid attribute value indicating that the events belong to the same data stream. In an object-oriented implementation, a "Stream" class or object may be defined to represent data streams. An input data stream may be generated by and received from an external application, e.g., Twitter™, Facebook™, etc. An intermediate data stream may be generated by and received from a map operation and/or update operation provided in accordance with exemplary embodiments. In an exemplary embodiment, all of the data streams (input and intermediate data streams) may be provided in a collective manner in a stream bus that may be accessed by any operation or computation provided in accordance with exemplary embodiments.

Exemplary data streams may include, but are not limited to, streams of text files, html files, profiles, updates and posts from social networking websites (e.g., the Twitter™, Facebook™, MySpace™ social networking websites), video and photo publishing websites (e.g., the Flickr™, Youtube™ content publishing websites), blog publishing websites (e.g., the Blogger™ publishing website), transactional data streams (e.g., purchase data, inventory data), updates or feeds from any suitable dynamic data repository, logs, maps, RSS feeds, combinations of any of the above, and the like. An exemplary data stream may include more than one type of stream events, for example, both text publications, photos and videos.

Figure 27:
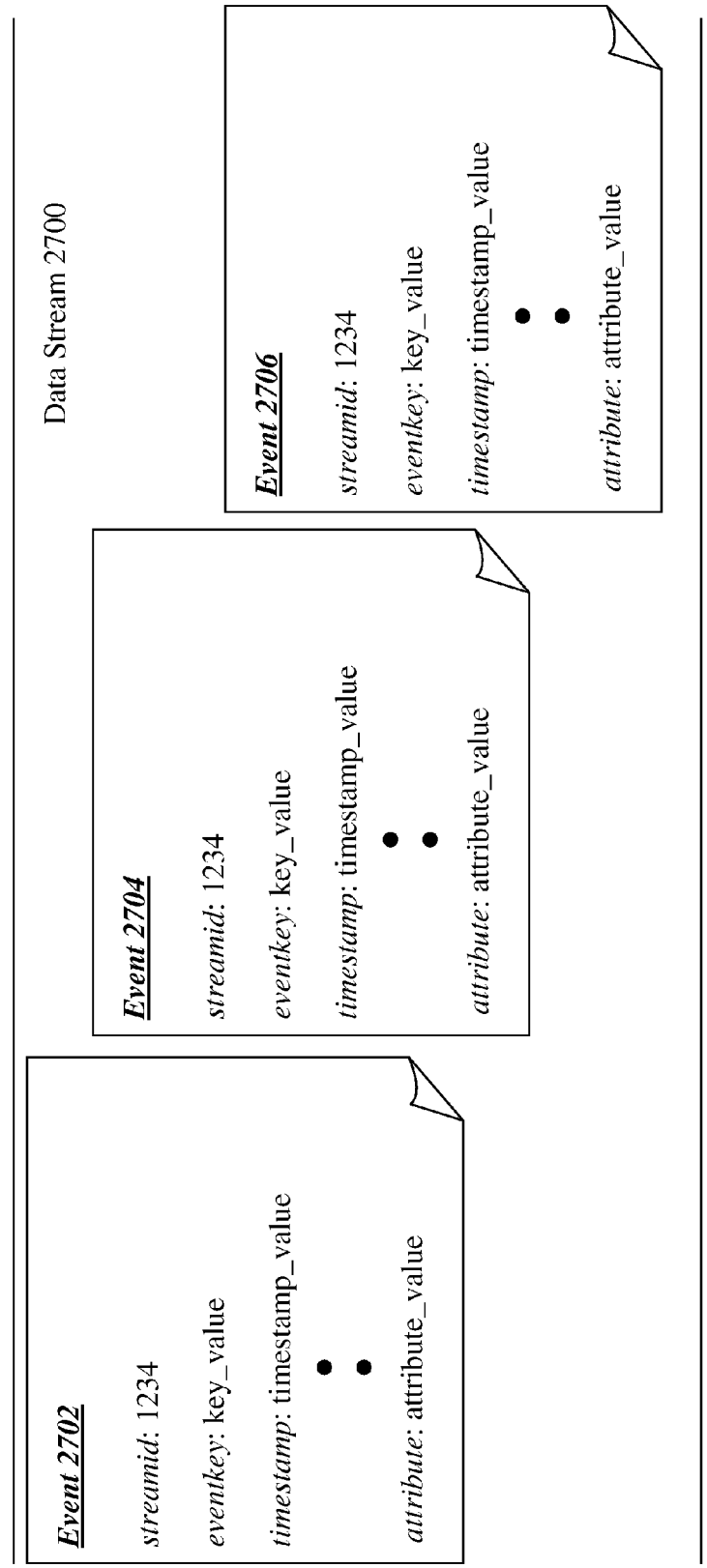
FIG. 27 is a block diagram representing an exemplary generic data stream.

FIG. 27 is a block diagram representing an exemplary generic real-time data stream 2700 including a plurality of the generic events 2702, 2704 and 2706 illustrated in FIG. 25. All of the events in the data stream 2700 may have the same streamid attribute value, e.g., "1234."

Figure 28:
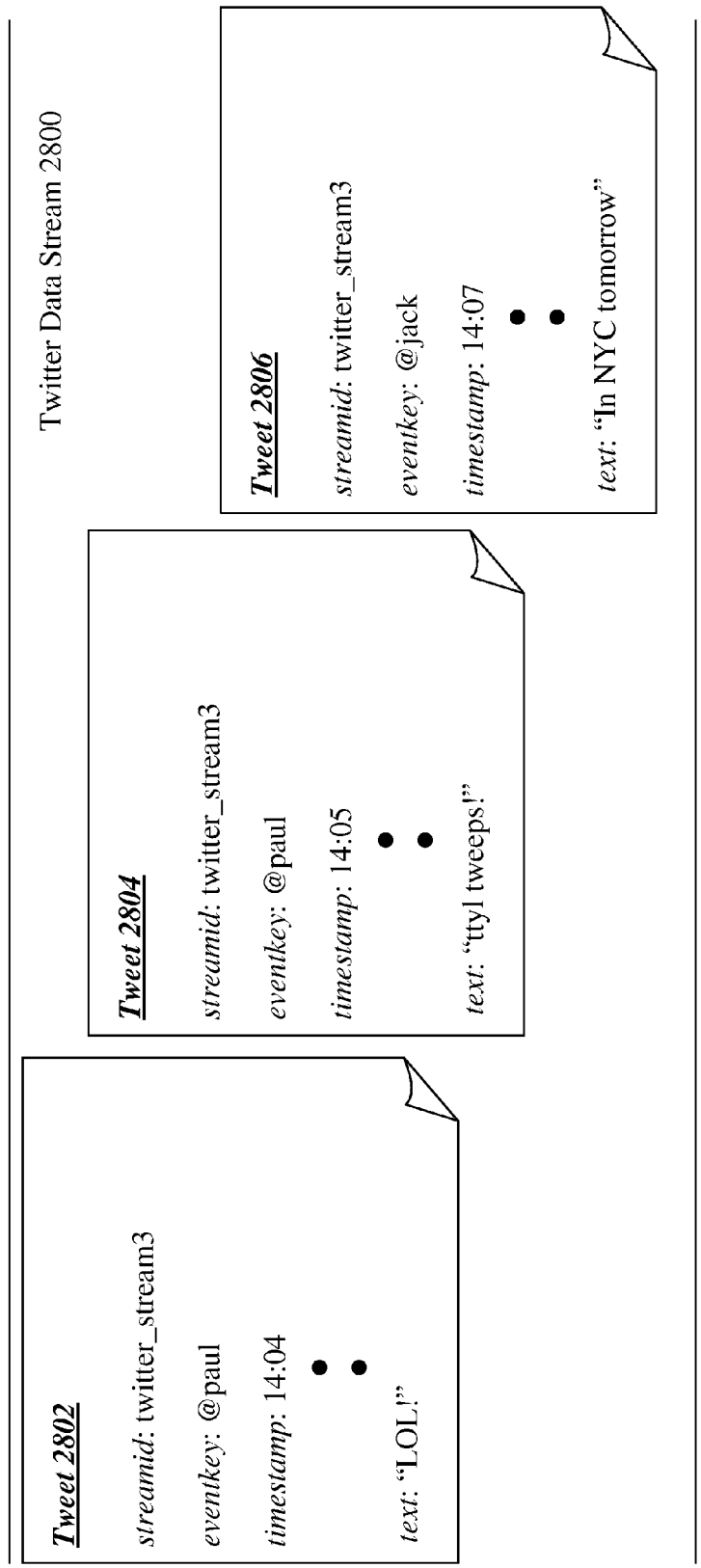
FIG. 28 is a block diagram representing an exemplary Twitter™ data stream.

FIG. 28 is a block diagram representing an exemplary real-time Twitter™ stream 2800 including a plurality of "tweet" events generated in real-time. All of the "tweet" events in the stream 2800 may have the same streamid attribute value, e.g., "twitter_stream3." The stream 2800 may include "tweet" events 2802 and 2804 generated by a user named "paul" and a "tweet" event 2806 generated by a user named "jack." The "tweet" events 2802, 2804 and 2806 may include timestamps 14:04, 14:05 and 14:07, respectively, and "tweet" text "LOL!," "ttyl tweeps!," and "In NYC tomorrow," respectively.

A slate is a static data structure that may be used by update operations to record data about a set of one or more related stream events. A slate may be implemented in any suitable data structure or format. In an exemplary embodiment, a slate data structure may include a collection of one or more attribute-value pairs. A plurality of stream events may be related based on one or more suitable characteristics. For example, a slate may be defined for "tweet" events that all mention a particular webpage link or that are all related to a particular news story or topic. A slate may be stored corresponding to its unique slatekey attribute value and corresponding to an update operation that updates the slate.

In an object-oriented implementation, a "Slate" class or object may be defined to represent slates. Exemplary embodiments may provide functionality to create one or more new slate objects, and to access information contained in one or more slate objects, for example, using get methods in an object-oriented implementation. In an exemplary embodiment, slates may be mutable, i.e., may be altered. In this embodiment, exemplary embodiments may provide functionality to alter one or more attributes of a slate, for example, using set methods in an object-oriented implementation.

Figure 29:
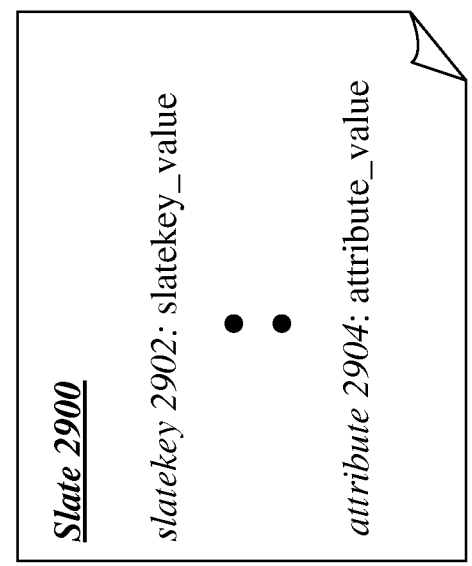
FIG. 29 is a block diagram representing an exemplary generic slate.

FIG. 29 is a block diagram representing an exemplary generic slate 2900. A slate 2900 may include a unique slatekey attribute 2902 having a value that is a primary key for the slate. That is, exemplary embodiments may ensure that there is exactly one slate with a particular slatekey attribute value. Exemplary embodiments persist slates in disk storage and make it efficient to access a specific slate by a combination of its slatekey attribute value and an updater operation that updates the slate. In an exemplary embodiment, one or more active slates may be stored in memory (e.g., in cache) in addition to being stored in a durable disk storage, while less active slates may only be stored in a durable disk storage. This allows fast and efficient look-up of the active slates stored in memory. Exemplary slates may include one or more additional attribute-value pairs 2904 necessary for an application that uses the slates.

In an exemplary embodiment, slates may be accessed by one or more applications that implement one or more stream computations. In one example, a K-rank computation application may use slates in a disk storage to store influence ranks of each user publishing stream events. In another example, a clustering application may use slates in a disk storage to store the actual text contained in stream events and metadata about individual clusters of text.

In an exemplary embodiment, a special type of slate named "application slate" may be implemented to store data accessible by applications, while the general data type named "slate" may only be accessible at the system-level. Isolation between the system slates and application slates may be maintained by using separate keyspaces. A keyspace may be specified by a prefix placed in front of a key with a colon separating the keyspace name and the key. For example, "foo:bar" denotes the key "bar" in keyspace "foo." Only the system may create slates in the "system:" namespace, while applications may create slates in any other namespace.

Update operations may create, access and modify application slates by the key. In an exemplary application of slates and keyspaces, a K-rank computation may store an individual user's k-scores separately in the disk storage indexed by a key which is the user ID. In an exemplary embodiment, the system may use keyspaces to provide information on improving execution, for example, designating the same worker node as the primary worker node for all the keys in an application keyspace.

III. Exemplary Map Operations

Map operations are stream computations performed on one or more stream events in one or more real-time data streams to generate zero, one or more new stream events for publishing to zero, one or more data streams. Exemplary map operations may be implemented in any suitable programming language, for example, a scripting programming language, an object-oriented programming language (e.g., Java), and the like. Map operations may be started, paused and stopped at any suitable time.

A map operation may subscribe to receive as input stream events from one or more real-time data streams (input data streams and/or intermediate data streams), and may be invoked for every stream event in the subscribed data streams. In exemplary embodiments, the streamid attribute value of a data stream to which a map operation is subscribed or to which a map operation publishes may be defined in a static manner, e.g., in a configuration file including any suitable parameters that may be necessary for an application. The configuration file may include tunables that provide instructions or guidance to the system on how to allocate resources among the various map and update operations.

A map operation may perform one or more real-time computations on a received stream event, and may publish zero or more new stream events to zero or more intermediate data streams. In an exemplary embodiment, the intermediate data streams may be provided in an aggregated real-time data stream bus that provides in a collective manner all of the input and intermediate data streams, so that any map or update operation may subscribe to receive stream events from any of the data streams in the stream bus.

In exemplary embodiments, an "at-least-once" guarantee may be provided to ensure that, regardless of hardware failures and software errors, every map operation subscribed to a data stream will receive every event in the stream and will successfully execute computations for that event, at least once.

In exemplary embodiments, map operations may be stateless computation units, i.e., do not store state. A generic map operation may be denoted as: map(event) (event)*

An exemplary stream event may be defined as:

⟨ s=destination stream, k=key, v=value⟩ where the destination stream s represents a set of operators that have subscribed to receive the event, the key k represents one or more keys or attributes of the events, and the value v represents one or more values associated with the keys.

Figure 30:
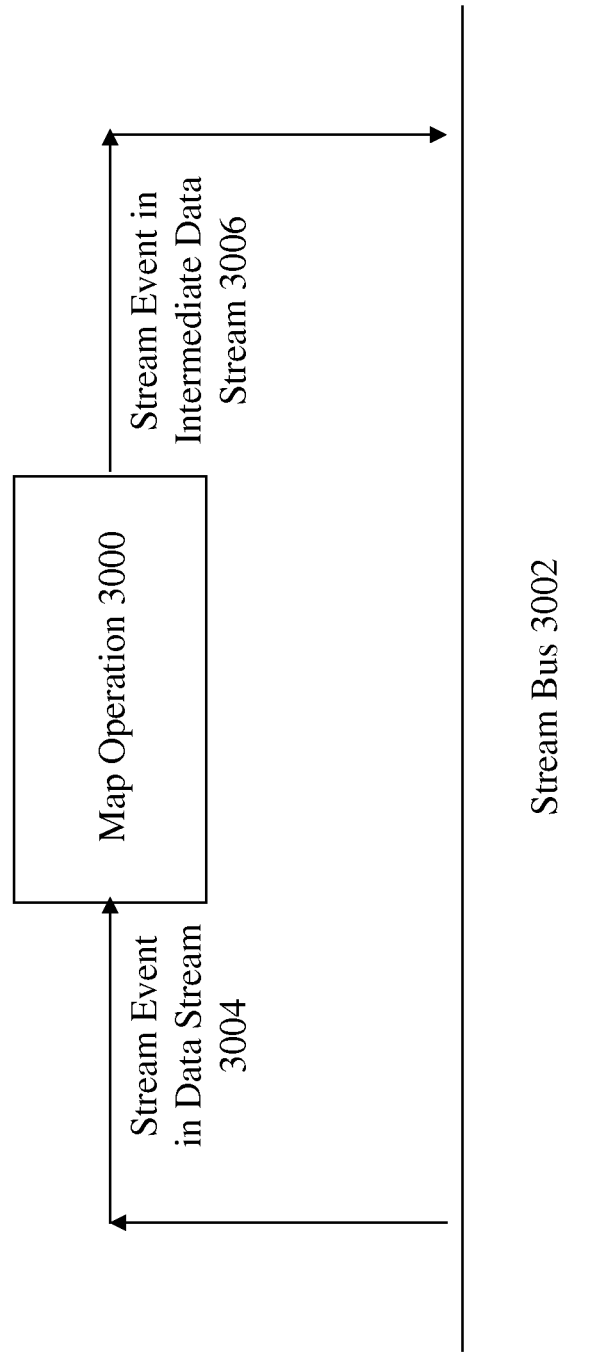
FIG. 30 is a block diagram representing an exemplary generic map operation.

An exemplary map operator F may be defined as a function on a subset of all possible events E:

$F: \langle s,k,v \rangle \in \rightarrow \langle (e_1, e_2, e_3,) $ where $e_i \in E$ FIG. 30 is a block diagram representing an exemplary generic map operation 3000. The map operation 3000 receives one or more stream events 3004 in one or more real-time data streams. The data streams may be provided in a stream bus 3002. The map operation 3000 performs one or more computations on the stream events, for example, one stream event at a time, and may generate zero or more stream events 3006 for publishing to zero or more real-time intermediate data streams. The intermediate data streams may be provided in the same stream bus 3002 as the input data streams.

Figure 31:
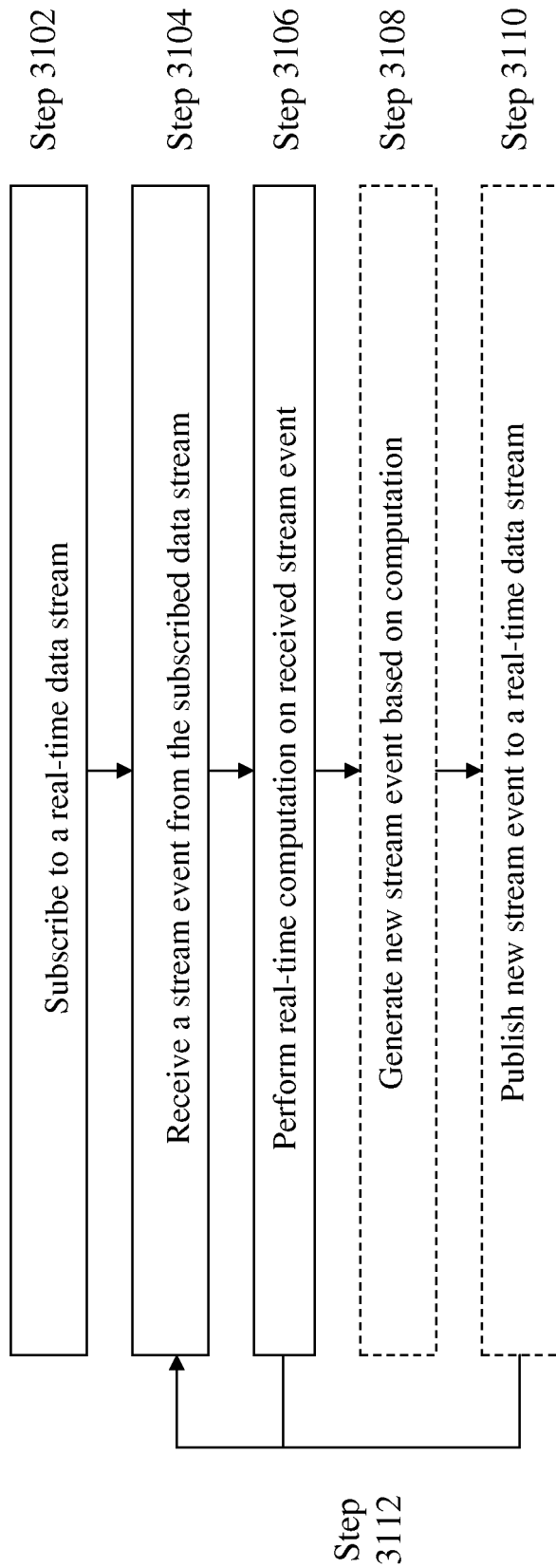
FIG. 31 is a flow chart of an exemplary method performed by a generic map operation.

FIG. 31 is a flow chart of an exemplary method performed by a generic map operation. In step 3102, the map operation may subscribe to one or more real-time data streams, e.g., a Twitter™ data stream. The data streams may be generated by an external application or may be intermediate data streams generated by one or more map or update operations.

In step 3104, the map operation may receive a stream event contained in the subscribed data stream, e.g., a "tweet" contained in a Twitter™ data stream. Since map operations are stateless operations, i.e., do not store state, a plurality of map operations may be allowed to concurrently receive and process events in the same stream.

In step 3106, the map operation may perform one or more computations on the received stream event, e.g., determine the topic discussed in the received "tweet." In step 3112, the map operation may continue to receive each additional stream event in the subscribed data stream.

In step 3108, the map operation may generate a new stream event based on the computation, e.g., a stream event that indicates the topic of the "tweet." In step 3110, the map operation may, in some embodiments, publish the new stream event to one or more intermediate data streams. The intermediate data stream may be provided in conjunction with all other data streams in the system in a stream bus so that the stream events in the intermediate data stream may be received by other map and update operations. In step 3112, the map operation may continue to receive each additional stream event in the subscribed data stream.

Exemplary map operations may be implemented in any suitable programming language, for example, a scripting programming language, an object-oriented programming language (e.g., Java), and the like. In an exemplary object-oriented implementation, a general Mapper class or interface may be defined by the system to generally specify attributes and functionality of a generic map operation. For each desired map operation, a sub-class may be created based on the Mapper class. For example, a TopicTagger class may be sub-classed from the Mapper class to define a specific map operation that processes a Twitter™ data stream and extracts topics associated with the "tweets" in the Twitter™ data stream. The TopicTagger operation may subscribe to the Twitter™ data stream and may publish events to a separate data stream, each published event including the topic extracted from a "tweet" and the hour of the day during which the topic was extracted. One or more object instances may be created from each sub-class at a worker node, for example, a TopicTagger object may be instantiated from the TopicTagger class.

Figure 32:
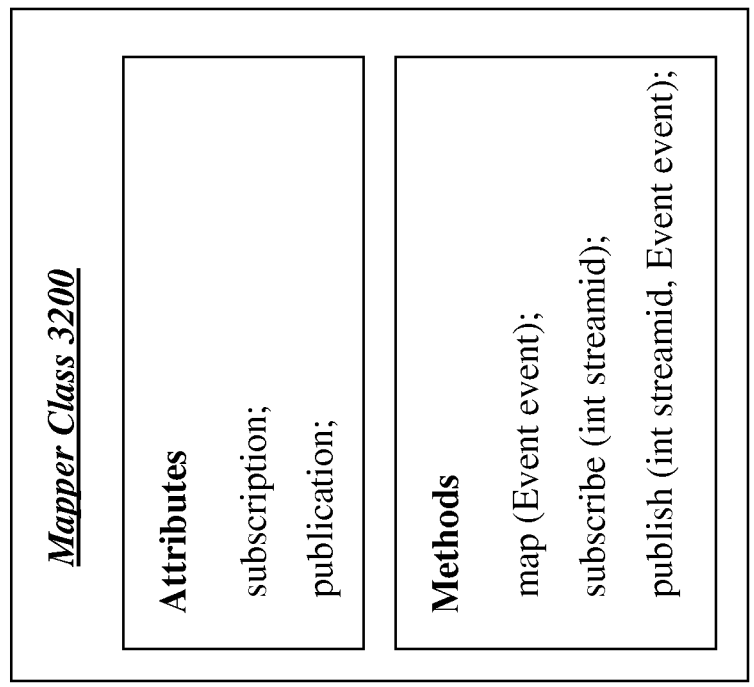
FIG. 32 is a block diagram representing an exemplary object-oriented class implementation of a generic map operation.

FIG. 32 is a block diagram representing an exemplary Mapper class 3200 for implementing a general map operation. The Mapper class 3200 may include zero, one or more attributes and zero, one or more methods. One of ordinary skill in the art will recognize that FIG. 32 represents exemplary attributes and methods of the class in pseudo-code form, and does not represent specific computer-implemented code that may be used to implement the class.

The Mapper class 3200 may include zero, one or more attributes associated with properties or characteristics of sub-classes. Each sub-class based on the Mapper class may include the zero, one or more attributes associated with properties or characteristics of the class objects. The attribute values may be specified for a particular object instantiation of the class. In an exemplary embodiment, in the Mapper class 3200, a "subscription" attribute may be provided to indicate one or more data streams to which an object instantiation is subscribed, e.g., a Twitter™ data stream S0. Similarly, in an exemplary embodiment, in the Mapper class 3200, a "publication" attribute may be provided to indicate one or more data streams to which an object instantiation may publish stream events, e.g., an intermediate data stream S1. In other exemplary embodiments, the Mapper class 3200 may not include the "subscription" and/or "publication" attributes.

The Mapper class 3200 may include zero, one or more methods associated with the behavior of an object instantiation at run-time. Each sub-class may include the zero, one or more specific methods associated with the behavior of the object instantiations of the sub-class at run-time.

Since exemplary embodiments operate in a streaming model, new stream events may trigger the performance of one or more operations, e.g., a map operation. In order to implement the streaming model, a map operation may subscribe to receive events from one or more real-time data streams and may publish events to one or more real-time data streams. In the Mapper class 3200, a subscribe method may be provided to allow an object instantiation to subscribe to one or more data streams in order to receive stream events from the data streams. The subscribe method may accept as input a value of the attribute streamid which identifies a data stream to which an object instantiation subscribes. The subscribe method may be a system-defined and system-provided method. When an object instantiation of a Mapper sub-class subscribes to one or more data streams, information on the subscriptions may be stored in the system and consulted by a conductor to transmits stream events in the data streams to those objects that are subscribed to those data streams. In an exemplary static event-flow configuration, applications may not need to call the subscribe method and this method may not be necessary.

In the Mapper class 3200, a publish method may be provided to publish one or more stream events generated by an object instantiation to one or more intermediate data streams. The publish method may accept as input a value of the attribute streamid which identifies a data stream to which an object instantiation publishes stream events.

The Mapper class 3200 may include a map method that encapsulates the functionality of a generic map operation. In an exemplary embodiment, in the Mapper class 3200, the map method may generally indicate a stream event and a stream event as input parameters of the method, and may not specify the functionality of a specific Map operation. One or more sub-classes of the Mapper class 3200 may further define the map method specific to the sub-classes. For example, a TopicTagger sub-class (that determines the topic of an incoming stream event) may include a map method that accepts a stream event from a subscribed real-time data stream as input and that invokes doctagger which is capable of extracting one or more topics from textual data in the stream event.

Exemplary embodiments may provide a code generation module for generating code associated with the methods of any of the classes provided in exemplary embodiments. The code may be executed at run time to perform the functionality encapsulated in the methods of the classes.

IV. Exemplary Update Operations

Update operations are stream computational units or methods performed on one or more stream events from one or more real-time data streams to create and/or update one or more slate data structures for persistent storage. Update operations may be implemented in a thread-safe manner in any suitable computer programming language, for example, a scripting programming language, an object-oriented programming language (e.g., Java), and the like. Update operations may be started, paused and stopped at any suitable time.

An update operation may subscribe to receive as input stream events from one or more real-time data streams (input data streams and/or intermediate data streams), and may be invoked for every stream event in the subscribed data streams. In exemplary embodiments, an "at-least-once" guarantee may be provided to ensure that, regardless of hardware failures and software errors, every update operation subscribed to a data stream will receive every event in the stream and will successfully execute computations for that event, at least once. An update operation may also receive one or more slates corresponding to one or more stream events, in particular, slates whose slatekey attribute values matches the eventkey attribute values of the corresponding events.

Since exemplary embodiments operate in a streaming model, new stream events may trigger the performance of one or more operations, e.g., an update operation. In order to implement the streaming model, an update operation may subscribe to receive events from one or more real-time data streams and may publish events to one or more real-time data streams. An update operation may perform one or more real-time computations on a received stream event and/or slate, and may publish zero or more new stream events to zero or more intermediate data streams. In an exemplary embodiment, the intermediate data streams may be provided in an aggregated real-time data stream bus that includes all of the input and intermediate data streams, so that any map or update operation may subscribe to receive stream events from any of the data streams in the stream bus.

The update operation may also create and/or update one or more slates associated with the stream events processed by the update operation. The slates may be stored in a persistent manner on a disk storage. In exemplary embodiments, a "persistent update" guarantee may be provided to ensure that, after successful completion of an update operation, any changes made by the operation to one or more slates are stored in a persistent manner. In an exemplary embodiment, one or more slates may be scheduled to expire from the disk storage after a pre-defined period of time, e.g., one hour. In some exemplary embodiments, the update operation may store one or more slates (e.g., last accessed slates, most active slates, etc.) in memory for easy access.

In exemplary embodiments, a "per-slate in-order" guarantee may be provided to ensure that, when an update operation receives an event, one or more slates corresponding to the update operation will reflect all and only those updates that are due to all events with the same eventkey attribute value and earlier timestamp attribute values. This ensures that events are operated on in the order of their timestamps. In some exemplary embodiments, the "per-slate in-order" guarantee may be relaxed to provide for a more distributed update computation. The update operation may, for example, combine slates that represent the processing of different subsets of input events. The update operation may then process separate subsets of input events separately and may subsequently merge them. Such exemplary update operations may be expressed as:

update (Slate*)->Event*
update (Slate, Slate)->Event*

In some exemplary embodiments, slate processing by the update method may be amortized over a plurality of stream events. As such, the update method may be represented as update (Event* event*, Slate slate). Other update methods may operate on multiple events and/or multiple slates to generate a plurality of events, and may be represented as:

update (Event, Event, Slate)->Event*
update (Event, Slate, Slate)->Event*

In exemplary embodiments, update operations may be stateful computation units, i.e., may store state. A generic update operation may be denoted as: update(event, slate) 4 (event)*

An exemplary stream event may be defined as:
⟨s=destination stream, k=key, v=value⟩
where the destination stream s represents a set of operators that have subscribed to receive the event, the key k represents one or more keys or attributes of the events, and the value v represents one or more values associated with the keys.

An exemplary update operator F may be defined as a function on a subset of all possible events E:

$F:\langle s, k, v \rangle \in E \rightarrow \langle e_1, e_2, e_3 \ldots \rangle$ where $e_i \in E$ In an exemplary embodiment, if the operator F is an updater U, the operator may receive an intermediate event from an output data stream, and perform one or more operations on data contained in the intermediate event to generate output data. In an exemplary embodiment, the updater U may also create or read and modify a slate having key <U, k> as part of its operation.

Figure 33:
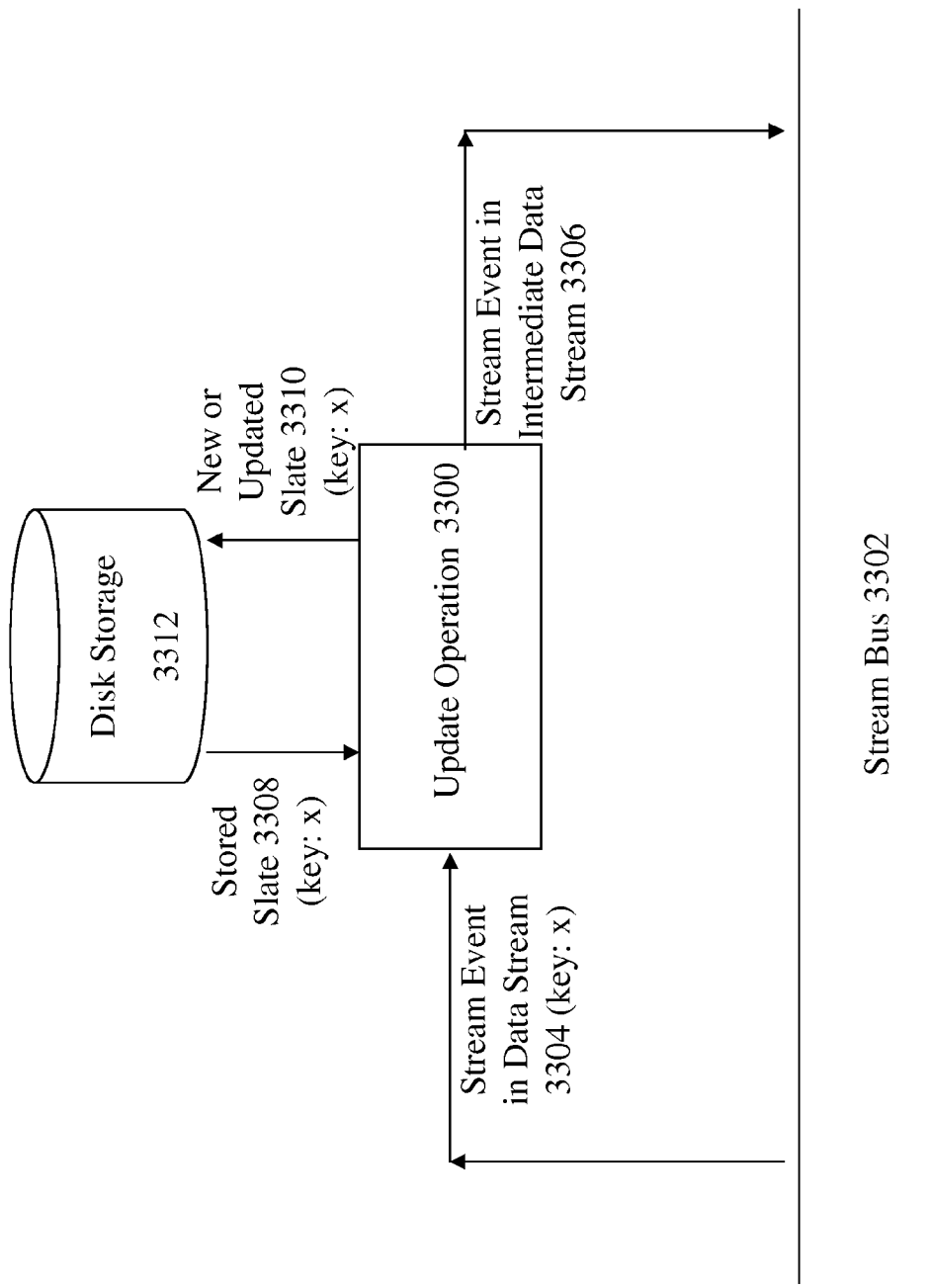
FIG. 33 is a block diagram representing an exemplary generic update operation.

FIG. 33 is a block diagram representing an exemplary generic update operation 3300. The update operation 3300 may receive as input one or more stream events 3304 in one or more real-time data streams. The real-time data streams may be provided in a stream bus 3302. In an exemplary embodiment, the update operation 3300 may receive as input one or more stored slates 3308 corresponding to the received stream events. The slates 3308 may be received from a persistent disk storage 3312 or from memory. In another exemplary embodiment, the update operation 3300 may not receive slates corresponding to the received stream events and may create one or more of the slates.

The update operation 3300 performs one or more computations on the stream events 3304 and/or the slates 3308, for example, one stream event and a corresponding slate at a time. The update operation 3300 may generate zero, one or more stream events 3306 for publishing to zero, one or more real-time intermediate data streams. The intermediate data streams may be provided in the same stream bus 3302 as the input data streams. The Update operation 3300 may also save one or more new or updated slates 3310 associated with the stream event processed by the Update operation. The slates 3310 may be stored in a persistent manner on the disk storage 3312.

In the exemplary block diagram of FIG. 33, the eventkey attribute value of the input stream event(s) 3304, the slatekey attribute value of the stored slate 3308 and the slatekey attribute value of the new or updated slate 3310 are the same.

Figure 34:
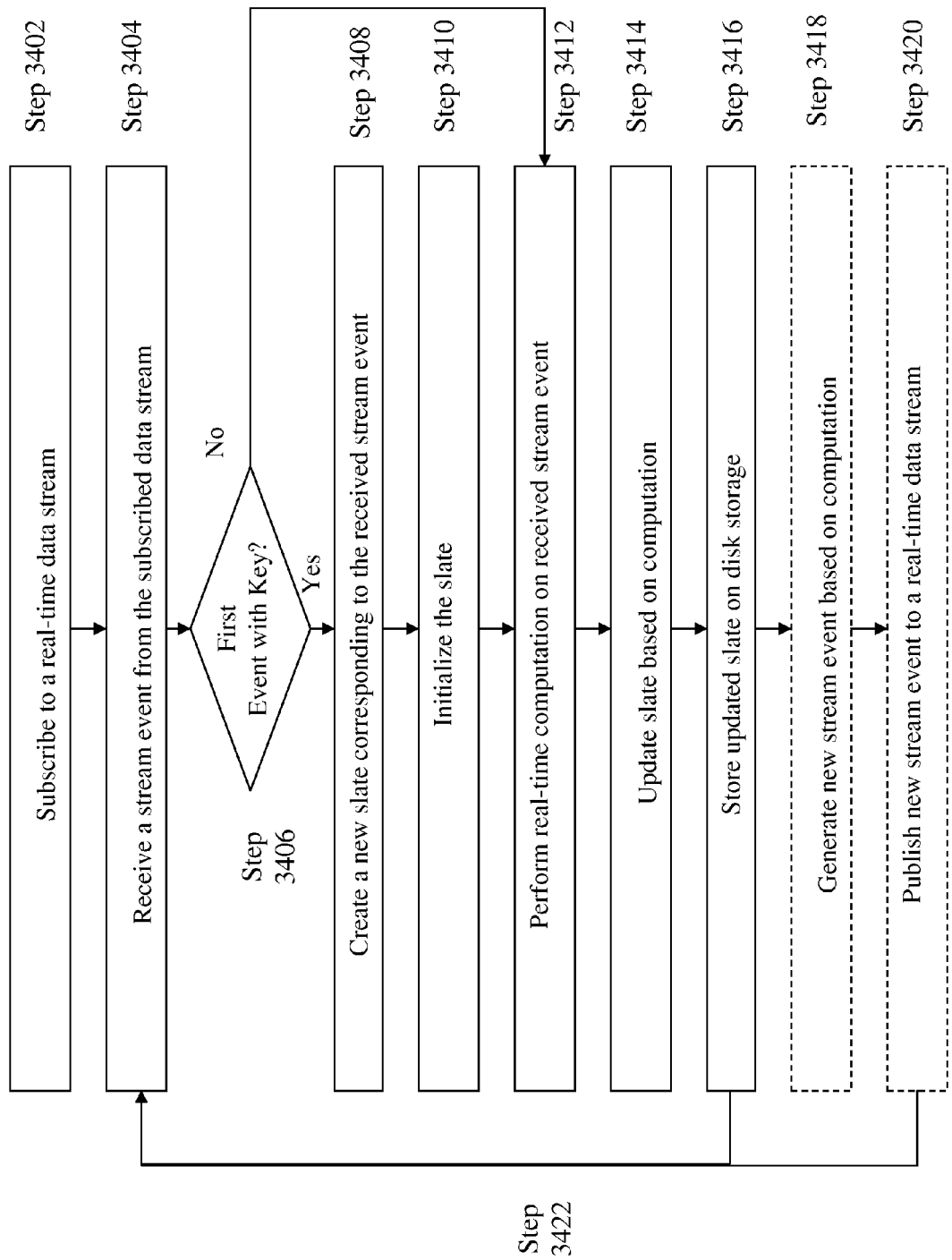
FIG. 34 is a flow chart of an exemplary method performed by a generic update operation.

FIG. 34 is a flow chart of an exemplary method performed by a generic update operation. In step 3402, the update operation may subscribe to one or more real-time data streams, e.g., a Twitter™ data stream. The data streams may be generated by an external application or may be intermediate data streams generated by one or more map or update operations.

In step 3404, the update operation may receive a stream event contained in the subscribed data stream, e.g., a "tweet" contained in a Twitter™ data stream. Since update operations are stateful operations, i.e., store state, concurrency problems may be caused by a plurality of update operations processing events for the same stream. In order to avoid these concurrency problems, in an exemplary embodiment, the entire execution of an update operation may be atomic. The atomic execution of an update operation may be ensured by preventing two update operations for input events having the same eventkey attribute value from running concurrently. In another exemplary embodiment, a lock method may be defined to lock the state of a slate during critical stages in an operation. Exemplary embodiments may schedule a plurality of update operations on the same slate concurrently since the state of the slate will be locked during critical stages. This mechanism allows for great concurrently, especially if the update operations are read-only in most cases. In an exemplary embodiment, a Reader sub-class of an Updater class (corresponding to a specific type of update operation) may be defined so that multiple Reader operations may be scheduled concurrently.

In step 3406, the update operation may determine if the stream event received from the subscribed data stream is the first event having a particular eventkey attribute value. If so, in step 3408, the update operation may create one or more new slates having a slatekey attribute value set equal to the eventkey attribute value of the first event received.

In step 3410, the update operation may initialize the slate, for example, by calling an init method. In an exemplary embodiment, the slate may be initialized to include application-specific data structures in the slate. In exemplary embodiments, initialization of the slate may include scheduling the slate to be in existence for a predefined period of time (i.e., a time-to-live or TTL), for example, using a set_ttl method. If the slate is not accessed (i.e., read or written to) for a period of time that equals or is greater than the predefined TTL, the system may automatically destroy the slate and remove it from the disk storage. The TTL may be set in a static manner, e.g., in a configuration file including any suitable parameters that may be necessary for an application. The configuration file may include tunables that provide instructions or guidance to the system on how to allocate resources among the various map and update operations. It is advantageous to set the predefined TTL and to automatically remove slates based on the TTL, because this allows the system to "forget" very old data, e.g., old clusters, and prevents the stored stream data from growing without limit.

In another exemplary embodiment, a predefined TTL may not be set or may be set to infinity so that the slate persists forever. The TTL may subsequently be set to any suitable number.

In exemplary embodiments, a slate may be scheduled to expire by setting an explicit expiry time, for example, using a set_expiry method. In an exemplary embodiment, a finalize method may be called by the set_expiry method on a particular slate to remove the slate from the system.

In step 3412, the update operation may perform one or more computations on the received stream event, e.g., determine the topic discussed in the received "tweet." In step 3414, the update operation may update one or more associated slates based on the computation. In step 3416, the update operation may store the updated slate in memory on a temporary basis and persistently in disk storage.

In step 3422, the update operation may continue to receive each additional stream event in the subscribed data stream.

In an exemplary embodiment, in step 3418 the update operation may generate a new stream event based on the computation, e.g., a stream event that indicates the number of occurrences of a topic in a stream of "tweets." In step 3420, the update operation may publish the new stream event to one or more intermediate data streams. The intermediate data stream may be provided in conjunction with all other data streams in the system in a stream bus so that the stream events in the intermediate data stream may be received by other map and update operations. In step 3422, the update operation may continue to receive each additional stream event in the subscribed data stream.

Exemplary update operations may be implemented in any suitable programming language, for example, a scripting programming language, an object-oriented programming language (e.g., Java), and the like. In an exemplary object-oriented implementation, a general Updater class or interface may be defined by the system to generally specify attributes and functionality of a generic update operation. For each desired update operation, a sub-class may be created based on the Updater class. For example, a TopicCounter class may be sub-classed from the Updater class to define an Update operation that processes a Twitter™ data stream and counts the occurrences of one or more topics associated with the "tweets" in the Twitter™ data stream. The TopicCounter operation may subscribe to the Twitter™ data stream and may publish events to a separate data stream, each published event including the number of occurrences in the Twitter™ data stream of a topic corresponding the currently processed "tweet" and the hour of the day during which the "tweet" was generated. One or more object instances may be created from each sub-class at a worker node, for example, a TopicCounter object may be instantiated from the TopicCounter class.

FIG. 35 is a block diagram representing an exemplary object-oriented Updater class 3500 that may be used to implement a general update operation. The Updater class 3500 may include zero, one or more attributes and zero, one or more methods. One of ordinary skill in the art will recognize that FIG. 35 represents exemplary attributes and methods of the class in pseudo-code form, and does not represent specific computer-implemented code that may be used to implement the class.

The Updater class 3500 may include zero, one or more attributes associated with properties or characteristics of sub-classes. Each sub-class based on the Updater class may include the zero, one or more attributes associated with properties or characteristics of the class objects. The attribute values may be specified for a particular object instantiation of the class. In an exemplary embodiment, in the Updater class 3500, a "subscription" attribute may be provided to indicate one or more data streams to which an object instantiation is subscribed, e.g., a Twitter™ data stream S1, an intermediate data stream S2. Similarly, in an exemplary embodiment, in the Updater class 3500, a "publication" attribute may be provided to indicate one or more data streams to which an object instantiation may publish stream events, e.g., an intermediate data stream S3. In other exemplary embodiments, the Updater class 3500 may not include the "subscription" and/or "publication" attributes.

The Updater class 3500 may include zero, one or more methods associated with the behavior of a class instantiation at run-time. Each sub-class may include the zero, one or more specific methods associated with the run-time behavior. In the Updater class 3500, a subscribe method may be provided to allow an object instantiation to subscribe to one or more data streams in order to receive stream events from the data streams. The subscribe method may accept as input a value of the attribute streamid which identifies a data stream to which an object instantiation subscribes. The subscribe method may be a system-defined and system-provided method. When an object instantiation of an Updater sub-class subscribes to one or more data streams, information on the subscriptions may be stored in the system and consulted by a conductor to transmits stream events in the data streams to those objects that are subscribed to those data streams. In an exemplary static event-flow configuration, applications may not need to call the subscribe method and this method may not be necessary.

In the Updater class 3500, a publish method may be provided to publish one or more stream events generated by an object instantiation to one or more intermediate data streams. The publish method may accept as input a stream event and a value of the attribute streamid which identifies a data stream to which an object instantiation publishes the event.

The Updater class 3500 may include a createSlate method that may accept as input a stream event and create one or more new slates with the slatekey attribute value of the slate being set equal to the eventkey attribute value of the stream event. The Updater class 3500 may also include an init method that may accept a slate as input and initialize the state of the slate, e.g., by setting a predefine time-to-live or an expiry time of the slate. When a slate expires, a finalize method may be called to remove or delete the slate from disk storage.

The Updater class 3500 may include an update method that encapsulates the functionality a generic update operation. In an exemplary embodiment, the Updater class 3500, the update method may generally indicate a stream event and a slate as input parameters of the method, and may not specify the functionality of a specific update operation. One or more sub-classes of the Updater class 3500 may further define the update method specific to the sub-classes. For example, a TopicCounter sub-class (that counts the number of occurrences of a topic in a data stream) may include an update method that accepts as input a stream event from a subscribed real-time data stream and a slate that corresponds to an hour of day and a particular topic, e.g., a topic determined by a TopicTagger sub-class or object derived from the Updater class. The update method may maintain a variable count in the slate that counts the number of occurrences of the particular topic in a particular hour of the day. That is, upon receiving a stream event corresponding to the same hour of day and the same topic, the update method may increment the variable count by one in the corresponding slate. In an exemplary embodiment, the update method may call an additional method, e.g., a method called updateSlate, to perform its functionality.

Exemplary embodiments may provide a code generation module for generating code associated with the methods of any of the classes provided in exemplary embodiments. The code may be executed at run time to perform the functionality encapsulated in the methods of the classes.

V. Exemplary Stream Processing Systems and Methods

Exemplary stream computation mechanisms may be implemented in any suitable computing hardware and software architecture that includes a scalable, fault-tolerant and durable storage layer that is available at all times for storing slates used by exemplary map and update operators. Exemplary embodiments may provide a cluster of one or more commodity nodes interconnected by communication means, e.g., Ethernet, in order to process real-time data streams in a distributed manner. Exemplary stream computational mechanisms may be less disk-heavy and more memory-heavy than conventional mechanisms like the MapReduce software framework. This is because exemplary data stream computations may read a stream as it flows by, maintain in durable disk storage data structures pertaining to the stream, and maintain in memory one or more certain data structures to facilitate fast and efficient access of the data structures.

Figure 36:
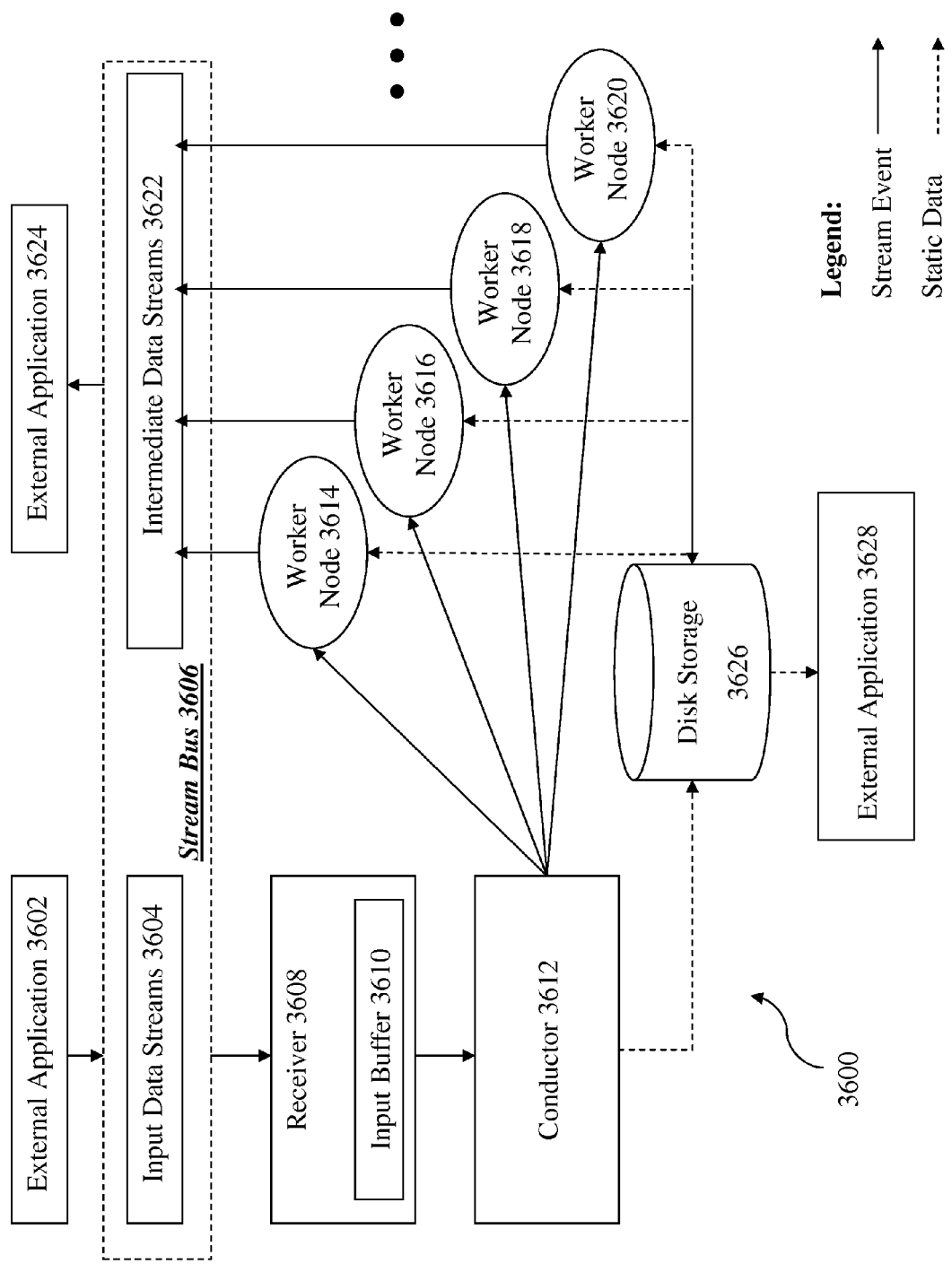
FIG. 36 is a block diagram representing an exemplary distributed computational system provided in accordance with exemplary embodiments for performing one or more real-time stream computations.

FIG. 36 is a block diagram of an exemplary distributed computational system 3600 provided in accordance with exemplary embodiments for performing a real-time stream computation. Exemplary system 3600 may provide a stream bus 3606 that receives one or more real-time data streams from one or more external applications 3602 (i.e., input data streams) and/or from one or more map and update operations provided in accordance with exemplary embodiments (i.e., intermediate data streams). Input real-time data streams may include, but are not limited to, streams of text files, html files, profiles, updates and posts from social networking websites (e.g., the Twitter™, Facebook™, MySpace™ social networking websites), video and photo publishing websites (e.g., the Flickr™, Youtube™ content publishing websites), blog publishing websites (e.g., the Blogger™ publishing website), transactional data streams (e.g., purchase data, inventory data), updates or feeds from any suitable dynamic data repository, logs, maps, RSS feeds, combinations of any of the above, and the like. An exemplary data stream may include more than one type of stream events, for example, both text publications, photos and videos.

The stream bus 3606 may reformat stream events received from an external application to a suitable format, e.g., by adding suitable attribute-value pairs to the stream events. In an exemplary embodiments, an application programming interface (API) may be provided to interface with any source of data streams to receive stream events. The stream bus 3606 may interface with one or more external application 3624 for providing one or more real-time data streams to the external applications. The stream bus 3606 may reformat stream events for transmission to an external application to a suitable format. For example, exemplary embodiments may provide a stream containing real-time information on popular topics in one or more data streams, a streaming containing popular or trending videos in one or more data streams, and the like.

The stream bus 3606 may provide one or more real-time data streams in a collective manner for access by one or more components of the system, for example, by a receiver, a conductor, and/or one or more operations running at worker nodes. The components of the system may subscribe to receive stream events from one or more data streams provided by the stream bus 3606. In an exemplary embodiment, all map and update operations may share the same stream bus 3606. In an exemplary embodiment, the stream bus 3606 may resend a stream event to a client module (e.g., a receiver, a conductor, or a worker node) until the event is successfully received and processed. The stream bus 3606 may also buffer stream events in the real-time data streams to ensure that events are not lost. The stream bus 3606 may also include an archival system to store portions or entirety of one or more data streams for a predefined period of time or for an unlimited time. For example, the last stream event in each stream may be archived at all times at the stream bus 3606 or at any other component in the system, e.g., in a slate in disk storage. The stream bus 3606 may replay a data stream from any selected timestamp, for example, from the archival system.

An exemplary stream bus 3606 may be implemented using any suitable application framework including, but not limited to, the Gearman application framework for distributed processing written in Perl. Servers in the Gearman framework run on bus hosts, i.e., machines suitable for hosting Gearman servers. In an exemplary embodiment in which the Gearman framework is used to provide the stream bus, each instance of the map-update system may have at least two Gearman servers for redundancy running on separate bus hosts. In an exemplary embodiment, different Gearman servers may be maintained for different event sources and applications to avoid slowing down the event sources.

In an exemplary embodiment, a single stream bus may be provided. In other exemplary embodiments, a plurality of stream buses may be provided, for example, as a set of event-queue servers, each responsible for a subset of events in transit among the map and update operations. In an exemplary embodiment, the subsets may be disjoint partitions.

Exemplary system 3600 may include one or more receivers 3608 that interface with the real-time data streams 3604 to continually receive stream events in the data streams in a real-time manner as the data streams flow past the systems. The receiver 3608 may include one or more buffers 3610 for buffering the stream events as they flow into the receiver 3608 in order to prevent loss of the stream events. In some exemplary embodiments in which a stream computation is mission-critical, the buffer 3610 of the receiver 3608 may be configured as a message queue, e.g., using Java Message Service, in which the stream events placed in the buffer 3610 are stored until the stream events are retrieved. In an exemplary embodiment, the buffer may be provided at the conductor 3612 and/or the stream bus 3606.

In exemplary embodiments, an "at-least-once" guarantee may be provided to ensure that, regardless of hardware failures and software errors, every map operation subscribed to a data stream will receive every event in the stream and will successfully execute computations for that event, at least once. To ensure at-least-once event processing, the buffer 3610 may buffer the data streams so that the events are not lost. In some exemplary embodiments, "at-most-once" event processing may be provided even under overload conditions so that each event is processed no more than once, for example, by allowing the system to selectively prune its buffers (e.g., a buffer at the stream bus 3606, the receiver 3608, or the conductor 3612) to control the event load. In some exemplary embodiments, some events may be prioritized over others by allowing the system (e.g., the stream bus 3606, the receiver 3608, the conductor 3612, or the worker nodes) to reorder events accordingly.

Exemplary system 3600 may include one or more conductors 3612 that may interface with the receiver 3608 to continually receive the stream events from the receiver 3608 in a real-time manner. The conductor 3612 may act as a task scheduling mechanism to provide instructions to designate worker nodes for performing map and update operations. The conductor 3612 may also transmit stream events to the worker nodes that are subscribed to receive the stream events. In an exemplary embodiment, the conductor 3612 may protect a worker node from bad or faulty events that cause repeated failures, for example, by discarding the faulty events from subscription to the operation running on the worker node.

In an exemplary embodiment, the conductor 3612 may provided as a separate component from the worker processes. In another exemplary embodiment, the conductor 3612 may be provided so that each worker process is provided as an extension of a conductor class, thereby making the conductor effectively distributed and multi-threaded.

The conductor 3612 may have visibility into the performance of the worker nodes and may perform load balancing by reassigning tasks to the worker nodes. In an exemplary embodiment, the conductor 3612 may read and write slates in a disk storage and/or in memory. In an exemplary embodiment, the conductor 3612 may record the last event processed for each data stream when a worker completes processing the event.

The conductor 3612 may maintain metadata about the available worker nodes in the system including, but not limited to, the computational specifications of the worker nodes, the current status of each worker node (e.g., whether it is operational, is in a failed state, etc.), the current processing load at each worker node, the data streams from which each worker node are subscribed to receive stream events, the data streams to which each worker node publishes events, the particular slatekey that is the primary slatekey handled by each worker node, and the like.

In cases in which the conductor 3612 may fall behind the influx of the stream events or in cases in which the conductor 3612 may suffer a software error or a hardware failure, the buffer 3610 of the receiver 3608 prevents loss of stream events.

In an exemplary embodiment including multiple conductors, a super-conductor (not pictured) may be provided to coordinate the operation of the conductors and to set up and provide instructions to the conductors. Message broadcasting services may be implemented over the multiple conductors so that outage or failure of a conductor may be announced to the other conductors. The operation of the failed conductor may be transferred to another functional conductor.

Exemplary system 3600 may include'one or more worker nodes 3614, 3616, 3618, 3620 that provide a pool of one or more worker processes for performing computations on real-time data streams. The worker nodes may interface with the conductor 3612 to receive stream events in a real-time manner in order to perform real-time computations on the stream events. The worker nodes may be assigned to perform one or more stream computations concurrently at a given time so that a desired functionality may be achieved by distributing different tasks over the nodes.

This distributed implementation provides scalability, wherein one or more additional worker nodes may be added to perform additional map and update operations and to accommodate increased computational requirements, additional data streams, increased data stream flows, and the like. The system overhead is minimal and does not increase with the scale of the system. Information on the new worker nodes may be transmitted to the conductor and may be stored by the conductor as meta-data. The conductor may assign stream processing operations to the new worker nodes and may transmit stream events to the new worker nodes.

The distributed implementation also provides fault-tolerance so that there is no single point of failure, wherein a task at a failed worker node may be assigned to a different worker node without affecting the entire distributed system.

In an exemplary embodiment, each worker node may include and may be capable of running one or more worker processes. For example, each worker node process may include all necessary computer-implemented instructions, i.e., software code, for running any map and update operator in the system, and may be capable of running any map and update operator in the system. In another exemplary embodiment, each worker node may receive computer-implemented instructions for running a specific map or update operation when the operation is scheduled to run on the worker node. The computer-implemented instructions may be provided to the worker node in a binary file format that may be loaded onto a process running on the worker node.

The worker nodes may receive instructions from the conductor 3612 which determine the operations that the nodes will perform. In an exemplary embodiment, a worker node may perform a single map or update operation at a time. In another exemplary embodiment, a worker node may perform a plurality of map and/or update operations at a time, for example, using multiple processors, multiple cores or multiple threads.

The worker nodes may be provided in a distributed manner at a plurality of computing devices that may be geographically remote from one another, or may be provided as separate modules or cores in the same computing device.

The map and/or update operation that is run by a worker node process at a particular time may be determined based on the instructions received from the conductor 3612. Upon selection of a particular map and/or update operator for running on a worker node process, the worker node may automatically determine one or more data streams from which stream events should be received for performing the operator. Alternatively, one or more data streams necessary for a particular map or update operator may be pre-identified and stored in association with the operator. The worker node may subscribe to the one or more data streams required by the selected operator by sending a subscription request to the conductor 3612. Upon registering the subscription request, the conductor 3612 may begin to send stream events in the requested data streams to the worker node.

That is, the data on which the assigned map and/or update operator is run at a worker node process may be determined by the stream events transmitted to the worker node from the conductor 3612. In an exemplary embodiment, the conductor 3612 manages subscriptions of the worker nodes to different data streams. The conductor may store the subscription information associated with the worker node and an identification of the data streams requested by the worker node, and may transmit input stream events corresponding to the requested data streams to the worker node that subscribed to the requested data streams. In this case, the conductor 3612 may store a table of mappings between each worker and one or more data streams from which the worker is subscribed to receive stream events. For each stream event received by the conductor 3612, the conductor may consult the table of mappings to determine which worker nodes are to receive the stream event.

Upon performing a computational operation, a worker node may generate one or more stream events to be published to one or more intermediate data streams 3622. In an exemplary embodiment, one or more map operations performed by worker nodes may result in the generation of stream events published to one or more intermediate data streams 3622. The intermediate data streams 3622 may be provided in a manner similar to the input data streams 3604 in the stream bus 3606 so that the receiver 3608 may receive stream events from the intermediate data streams 3622 as well. One or more worker nodes may be subscribed to receive stream events from one or more intermediate data streams 3622 through the receiver 3608 and the conductor 3612.

In addition or alternatively, upon performing a computational operation, a worker node running an update operation may generate static output data, for example, slates that are stored as key-value combinations. The slates may be stored temporarily in memory and persistently in a durable disk storage 3626. Each slate generated may be indexed by its slatekey and a corresponding update operation in the disk storage 3626. A worker node running an update operation may have exclusive access to a slate while it is performing the operation to prevent inconsistencies in the data stored in the slate.

In an exemplary embodiment, the worker nodes may access the disk storage 3626 to retrieve and/or store slates, and may store one or more slates on a temporary basis in memory, e.g., a write-through cache. In an exemplary embodiment, each worker node may maintain a least recently used (LRU) cache of slates. The storage of one or more slates in memory at worker nodes allows scheduling computation near the data.

To fetch data maintained in a map-update application, the system may provide a slate-fetch operation so that requests from outside the application may retrieve a slate for any <update operation, key> value. To reduce the network requirements and computational costs of applications using data saved in the disk storage 3626, exemplary embodiments may provide a slate-postprocess operation so that requests from outside an application may retrieve a slate for any <update operation, key> value and may run a particular function on the slate before returning it to the application. In one example, such a slate-postprocess operation may select only individual attributes of interest, thereby returning less data that is stored in the slate. For example, the operation may compute an aggregate of select attributes in the slate. In another example, if the slate contains information on two numbers, a slate-postprocess operation may provide the average of the numbers to an external application.

To provide a consistent interface to a map-update application's data even as its implementation changes, some exemplary embodiments may provide a node-fetch operation that runs a particular function (implemented by the application) to return a desired result. The node-fetch operation may execute slate-fetch operations and slate-postprocess operations as well as its own code to "normalize" the data maintained in the application to generate a result. In exemplary embodiments, the node-fetch operation may also perform other processing and optimization operations.

To provide a consistent interface to a map-update application's data even as its implementation changes, some exemplary embodiments may provide a view-fetch operation that runs a particular function (implemented over the application) to return a desired result. The view-fetch operation may execute node-fetch operations as well as its own code to "normalize" the data maintained in the applications to generate a result. In exemplary embodiments, the view-fetch operation may also perform other processing and optimization operations.

In an exemplary embodiment, a worker node may be preferentially assigned to perform computations on stream events with a particular eventkey that is equal to the slatekey for which the node is a primary worker node. A worker node that is the primary worker node for a particular slatekey may be capable of handling all events associated with the slatekey, i.e., with the particular slate, and may store in memory, e.g., cache, all slates corresponding to the slatekey. Each worker node may maintain an in-memory cache of slates, i.e., key-value combinations, for which the worker node is the "primary" worker node. The cache of slates may be saved, for example, in a solid-state drive (SSD) that stores persistent accessible data. In exemplary embodiments, the cache may be write-through in which write operations performed on the cache by an operation running on the worker node is written back to the disk storage. In an exemplary embodiment, write operations performed on the cache may be written through to the disk storage immediately. In another exemplary embodiment, write operations performed on the cache may be written through to the disk storage after a time delay. A write-delay parameter may be configured to adjust the time delay to control the write-through behavior of the cache. The write-delay parameter may relax the immediate write-through behavior of the cache and may allow the cached slate to be written back at certain times, for example, every few seconds.

The storage of the slates in memory minimizes the number of disk read operations that need to be performed to access slates. This is because, when an Update operation is scheduled on a slate, the operation is scheduled on a worker node that is the primary worker node for the slate. As such, it is likely that the most recent value of the slate is stored in the cache of the primary worker node. This makes it unnecessary for the worker node to perform a read operation on the disk storage in order to determine the most recent value of the slate, and may instead look up the value in its own cache.

The large number of slate accesses required in some stream computations adversely affect performance. For example, in a data stream of N events/second, each event may trigger K slate accesses in which each slate may have a size of S bytes.

Therefore, the system must support NK slate accesses/second and a data volume of NKS bytes over the network. For exemplary values of 10,000 events/second for N, 10 slate accesses for K, and 10 KB for S, the system must support at least 100K lookups/second and a flow of 8 Gbps. An exemplary implementation that allows computation near the data at worker nodes lowers the number of slate accesses in disk storage that must be performed, and lowers the serialization overhead involved in accessing and storing slates in disk storage. Similarly, the number of slate write operations to the disk storage may be reduced by batching the write operations.

Data streams are subject to spiky behavior in which bursts of activity may arise for stream events corresponding to the same eventkey value. Implementation of a write-delay parameter and assigning worker nodes as primary worker nodes allows the system to harness spiky bursts of activity to improve system performance and efficiency. A slate for a hot or popular or very active eventkey value may remain in memory, e.g., in cache, at one or more worker nodes that are the primary worker nodes assigned to that eventkey value. As such, for every access to the disk storage for the slate, the slate may be read and written several times in memory, thus saving the time and computations, e.g., serialization, that would otherwise be required in multiple read and write operations to the disk storage.

In some cases, due to hot spots in the flow of incoming stream events, a computational load at a worker node may increase beyond a certain threshold. In order to avoid such increased loads, the conductor may periodically determine load data for the worker nodes, e.g., by polling the worker nodes. In order to schedule an update operation associated with a stream event, the conductor may schedule the update operation to run on the primary worker node associated with the event's key only if the primary node has a load less than a specified threshold, e.g., 80% of the threshold. Otherwise, the conductor may select another worker node with the lightest computational load as the new primary worker node for the key. The conductor may wait for a time period slightly longer than the write-delay parameter before scheduling subsequent update operations for the key on the new primary worker node. This ensures that any update operations from the old primary worker node have already updated the disk storage, before subsequent update operations are scheduled on the new primary worker node. The new primary worker node thus receives the most recent slate value from the disk storage.

In an exemplary embodiment, a storage layer 3626 may be implemented in a distributed manner, e.g., over multiple storage devices that may be geographically remote from one another. For example, an exemplary storage layer may be implemented using Cassandra which is a distributed storage system. A distributed storage layer may provide a high available service with no single point of failure, and may be accessible to the plurality of worker nodes in the system. In an exemplary embodiment, the storage layer may be provided at the worker nodes in a distributed manner. In addition to the ability to persist data, the distributed storage layer may have one or more additional characteristics including, but not limited to, scalable and robust solutions for load balancing, replica synchronization, membership and failure detection, failure recovery, overload handling, state transfer, concurrency and job scheduling, request marshalling, request routing, system monitoring and alarming, configuration management, and the like. In an exemplary embodiment, the disk storage 3626 may be provided in a distributed manner run on a set of two or more nodes that are separate from the worker nodes in some exemplary embodiments, and that are the worker nodes in other exemplary embodiments. That is, in some exemplary embodiments, the nodes providing the disk storage 3626 may be separate from the nodes providing the map and update operations. The two or more nodes running the disk storage 3626 may be provided on separate computing devices and/or provided at separate geographical locations.

The worker nodes may have access to the disk storage 3626 to retrieve and store slates on the disk storage. Slates may be maintained in the disk storage 3626 and/or in memory at worker nodes and/or at the conductor at any suitable time granularity, e.g., hourly, daily, weekly, monthly. Versioning may be applied to maintain and identify different states of the slates at different times. Older states of a slate may be stored or archived for a predefined time or for an unlimited time as the slate is updated. The disk storage 3626 may also store information received or processed by the conductor, for example, metadata pertaining to the worker nodes.

Exemplary system 3600 may allow one or more external applications 3628 to interface with the system to receive the static output data. The external applications 3628 may interface with the disk storage 3626 to receive static output data stored on the disk storage. The external applications 3628 may be any suitable external data consumers, e.g., a web application that displays the Top N topics in a Twitter™ feed at a given time. In this example, the web application may retrieve a key-value combination stored in the disk storage 3626 that provides the values of the Top N topics in a Twitter™ feed at a given time.

The different components of the system 3600 may be coupled to each other using any suitable communication mechanism, e.g., gigabit Ethernet.

Figure 37:
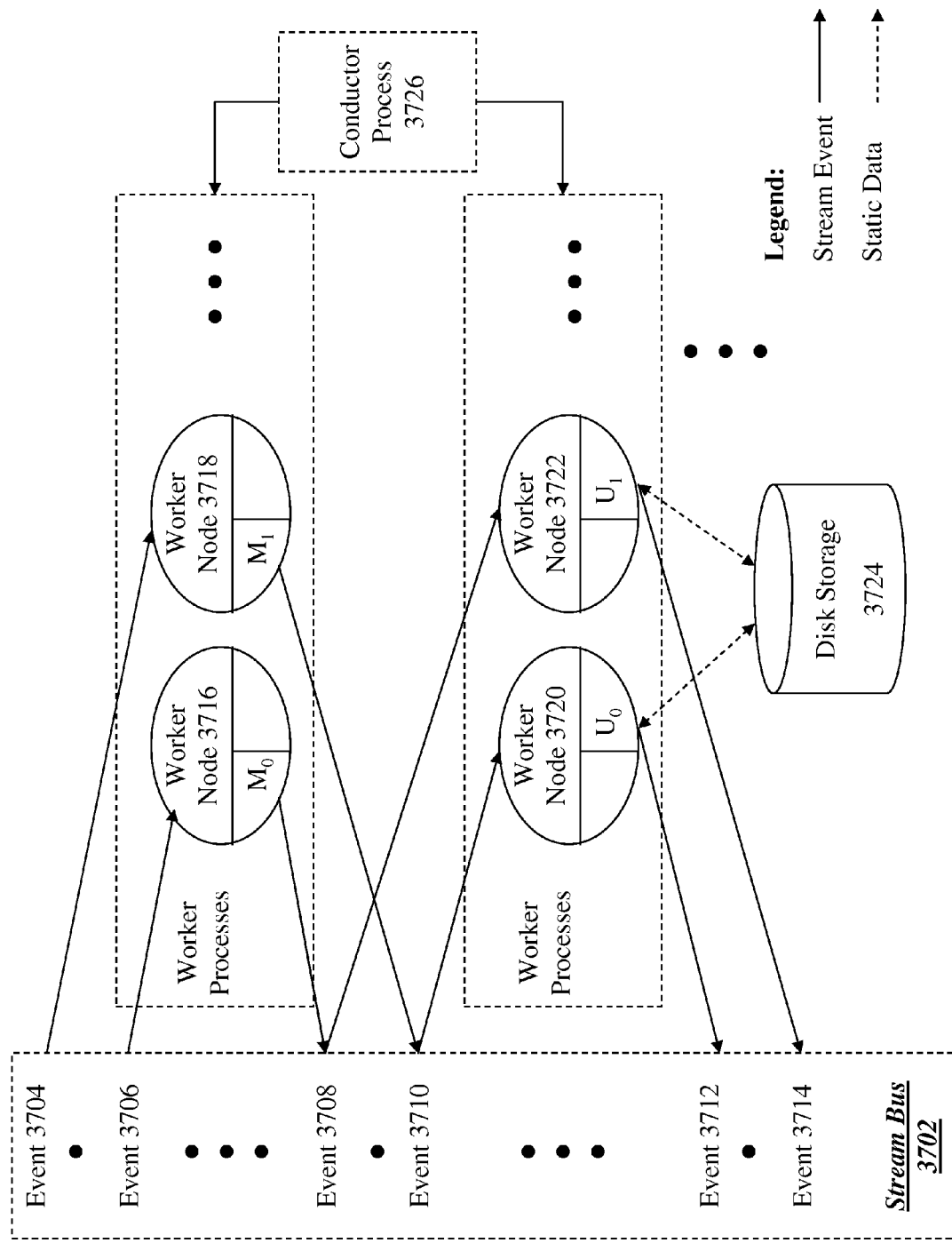
FIG. 37 is a block diagram representing exemplary distributed computational processes provided in the exemplary system of FIG. 36 for performing one or more real-time stream computations.

FIG. 37 is a block diagram of exemplary distributed computational processes provided in accordance with exemplary embodiments for performing a real-time stream computation. The system may include a stream bus 3702 including one or more streams (not pictured) in which real-time stream events (e.g., events 3704, 3706, 3708, 3710, 3712 and 3714) are published to the streams by external applications and/or worker nodes provided in accordance with exemplary embodiments. For example, stream events 3704 and 3706 may be published by external applications, while stream events 3708, 3710, 3712 and 3714 may be published by worker nodes.

The system may include one or more disk storage devices 3724, e.g., in the form of a distributed storage layer, for storing one or more slates. In some exemplary embodiments, the disk storage 3724 may be provided in a distributed manner over the conductors or the worker nodes, or separately therefrom.

The system may include one or more conductors running one or more conductor processes 3726. In exemplary embodiments, during an initial setup stage, the conductor process 3726 may delegate one or more map operations to one or more worker nodes (so that the worker nodes are primarily responding for performing the map operations) and/or one or more update operations to one or more other worker nodes (so that the worker nodes are primarily responding for performing the update operations). In exemplary embodiments, the conductor process 3726 may receive and transmit stream events to appropriate worker nodes that are subscribed to receive events from the stream. In an exemplary embodiment, the conductor process 3726 may itself be a task that is initiated and instructed by a super-conductor process (not pictured).

The system may include one or more worker processes running on one or more worker nodes 3716, 3718, 3720 and 3722. Each worker node may be capable of running one or more processes for performing one or more map operations (M) and/or one or more update operations (U). For example, each worker node may be able to access instructions for performing the operations. Each process thread at a worker node may be invoked based on the particular task assigned to the worker node. In an exemplary embodiment, the number of worker processes may be equal to the number of worker nodes or machines available in the system, i.e., one worker process per machine. In another exemplary embodiment, two or more worker processes may be used in each of the worker nodes or machines in the system. If a worker process fails, its task may be reassigned to another worker process by the conductor process 3726 and measures may be taken to repair or replace the failed worker process.

In an exemplary embodiment, the worker node 3716 may be designated a primary worker for performing a first map operation ($M_0$). The worker node 3716 may be subscribed to receive event 3706 from the stream bus 3702, may run a worker process to perform the first Map operation ($M_0$) on the event, and may publish intermediate event 3708 to one or more streams in the stream bus 3702. Similarly, the worker node 3718 may be designated a primary worker for performing a second map operation ($M_1$). The worker node 3718 may be subscribed to receive event 3704 from the stream bus 3702, may run a worker process to perform the first map operation ($M_1$) on the event, and may publish intermediate event 3710 to one or more streams in the stream bus 3702.

In an exemplary embodiment, the worker node 3720 may be designated a primary worker for performing a first update operation ($U_0$). The worker node 3720 may be subscribed to receive event 3710 from the stream bus 3702 and one or more slates from the disk storage 3724. The worker node 3720 may run a worker process to perform the first update operation ($U_0$) on the events and/or slates. The worker node 3720 may publish intermediate event 3712 to one or more streams in the stream bus 3702 and/or save new and/or updated slates to the disk storage 3724. Similarly, the worker node 3722 may be designated a primary worker for performing a second update operation ($U_1$). The worker node 3722 may be subscribed to receive event 3708 from the stream bus 3702 and one or more slates from the disk storage 3724. The worker node 3722 may run a worker process to perform the second update operation ($U_1$) on the events and/or slates. The worker node 3722 may publish intermediate event 3714 to one or more streams in the stream bus 3702 and/or save new and/or updated slates to the disk storage 3724.

Figure 38:
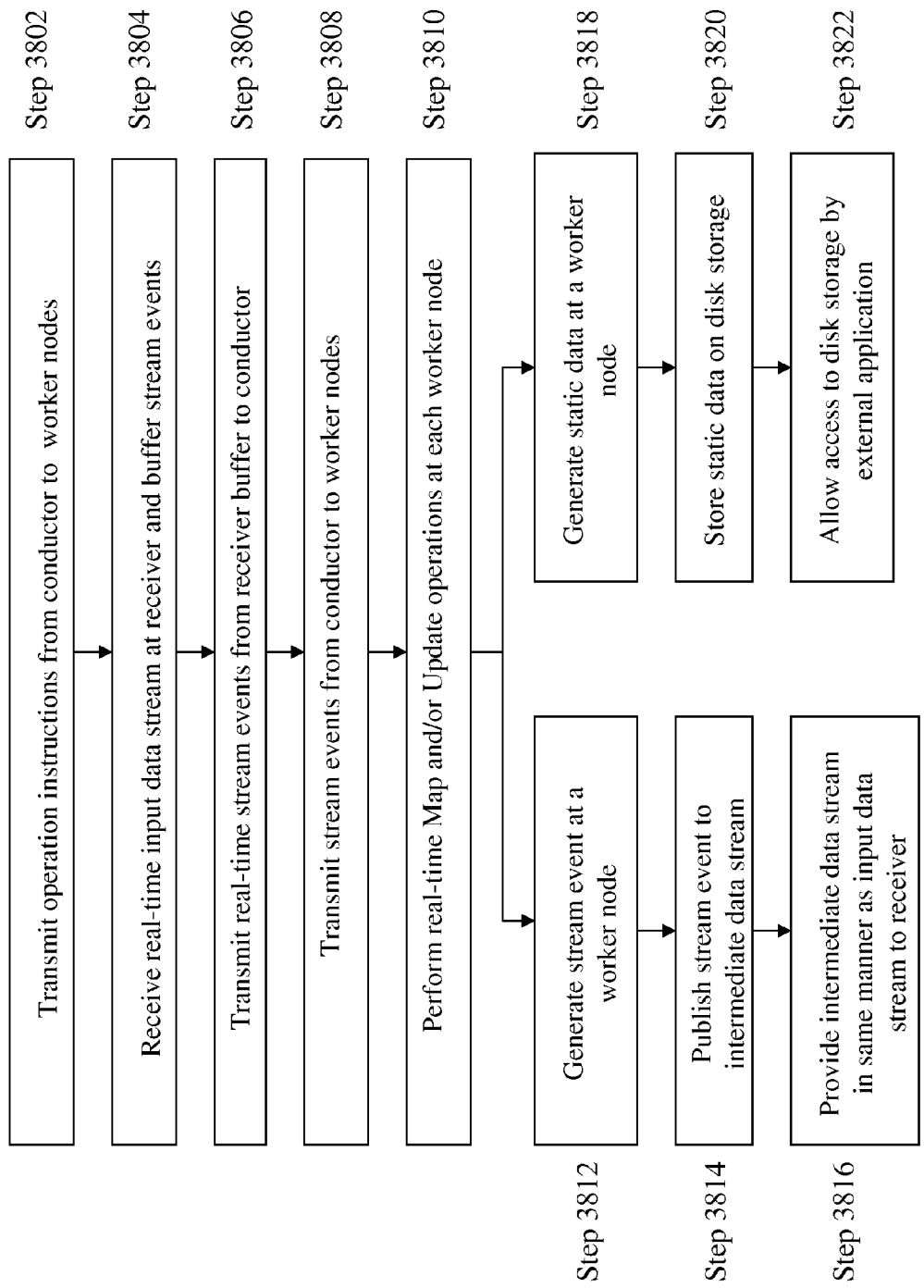
FIG. 38 is a flow chart of an exemplary method performed by the exemplary computational system of FIG. 36.

FIG. 38 is a flow chart of an exemplary method performed by the exemplary computational system of FIG. 36. In step 3802, a conductor may transmit instructions to one or more worker nodes to perform one or more map and/or update operations. In an exemplary embodiment, the operation assigned to each worker node may be pre-defined. In another exemplary embodiment, the operation assigned to each worker node may be determined automatically and in real-time by the conductor in a task scheduling operation. Task scheduling may be performed by the conductor in a manner to balance the loads among the worker nodes, prevent "hot spots" from arising at any worker node and to reduce the response time required by each worker node to generate an output. Any suitable task scheduling mechanism may be used by the conductor. Some exemplary task scheduling mechanisms are described with reference to FIGS. 40 and 41.

Upon selection of a particular map and/or update operator for running on a worker node process in step 3802, the worker node may automatically determine one or more data streams from which stream events should be received for performing the operator. Alternatively, one or more data streams necessary for a particular map or update operator may be pre-identified and stored in association with the operator. The worker node may subscribe to the one or more data streams required by the selected operator by sending a subscription request to the conductor.

In an exemplary embodiment, step 3802 may be performed at start-up of the system, and may be repeated to provided updated instructions to the worker nodes.

In step 3804, one or more receivers may receive one more real-time input data streams. The receiver may extract one or more stream events from each data stream and place the stream events in one or more buffers.

In step 3806, the receiver may transmit the stream events from the buffer in a real-time manner to one or more conductors.

In step 3808, for each stream event that the conductor receives, the conductor may determine the data stream to which the stream event belongs. The conductor may then determine which worker nodes, if any, are subscribed to receive stream events in that data stream. The conductor may then transmit the received stream event to the worker nodes subscribed to the data stream corresponding to the stream event.

In step 3810, the worker nodes may perform map and/or update operations in a continual real-time manner on the stream events received from the conductor. Each worker node may generate one or more stream events for publishing on intermediate data streams and/or static output data.

In step 3812, a worker node may generate a stream event. In step 3814, the stream event may be published to an intermediate real-time data stream by the worker node. In step 3816, the intermediate data stream may be provided to the receiver in the same manner as the input data streams.

In step 3818, a worker node may generate static output data. In step 3820, the static output data may be stored durably on a disk storage. In step 3822, one or more external applications may interface with and access the static output data stored on the disk storage.

Figure 39:
FIG. 39 is a flow chart of an exemplary method performed by the exemplary computational processes of FIG. 37.

FIG. 39 is a flow chart of an exemplary method performed by the exemplary computational processes of FIG. 37. In step 3902, a first worker process may receive a first input stream event from a first real-time input data stream. In step 3904, the first worker process may process the first input stream event in a first map operation to generate first intermediate output data. In step 3906, the first worker process may transform the first intermediate output data to generate a first intermediate stream event corresponding to the first input stream event and comprising the first intermediate output data. In step 3908, the first worker process may publish the first intermediate stream event to a first real-time intermediate data stream. The first worker process may be scheduled to run on one or more worker nodes. One of ordinary skill will recognize that one or more additional worker processes may be scheduled to run additional instances of the first map operation or one or more additional map operations, for example, concurrently with the first worker process. The computational load for a map operation may be distributed among multiple instances of the operation in an exemplary embodiment.

In step 3910, a second worker process may receive the first intermediate stream event from the first real-time intermediate data stream. In step 3912, the second worker process may process the first intermediate output data in the first intermediate stream event in a first update operation to generate first final output data. In step 3914, the second worker process may store the first final output data in a first data structure associated with the first intermediate output data on a storage device. The first data structure may be generated by the second worker process, or an existing data structure may be updated with the first final output data. One of ordinary skill will recognize that one or more additional worker processes may be scheduled to run additional instances of the first update operation or one or more additional update operations, for example, concurrently with the second worker process. The computational load for an update operation may be distributed among multiple instances of the operation in an exemplary embodiment.

In some embodiments, one or more additional worker processes may be scheduled to run additional update operations. For example, in step 3916, the second worker process may transform the first final output data to generate a second intermediate stream event corresponding to the first intermediate stream event and comprising the first final output data. In step 3918, the second worker process may publish the second intermediate stream event to a second real-time intermediate data stream. In step 3920, a third worker process, may receive the second intermediate stream event in the second real-time intermediate data stream. In step 3922, the third worker process may transform the first final output data in the second intermediate stream event in a second update operation to generate second final output data. In step 3924, the third worker process may store the second final output data in a second data structure associated with the second intermediate output data on a storage device.

VI. Exemplary Task Scheduling Mechanisms

An exemplary task scheduling mechanism implemented at a conductor may be used to assign one or more map operations and/or one or more update operations to worker nodes in a distributed system based on a suitable task scheduling policy. Exemplary task scheduling policies include, but are not limited to, random assignment, round robin assignment, assignment first to worker nodes with the lightest computational load, assignment to minimize communication costs, assignment to minimize disk accesses, and the like.

Figure 40:
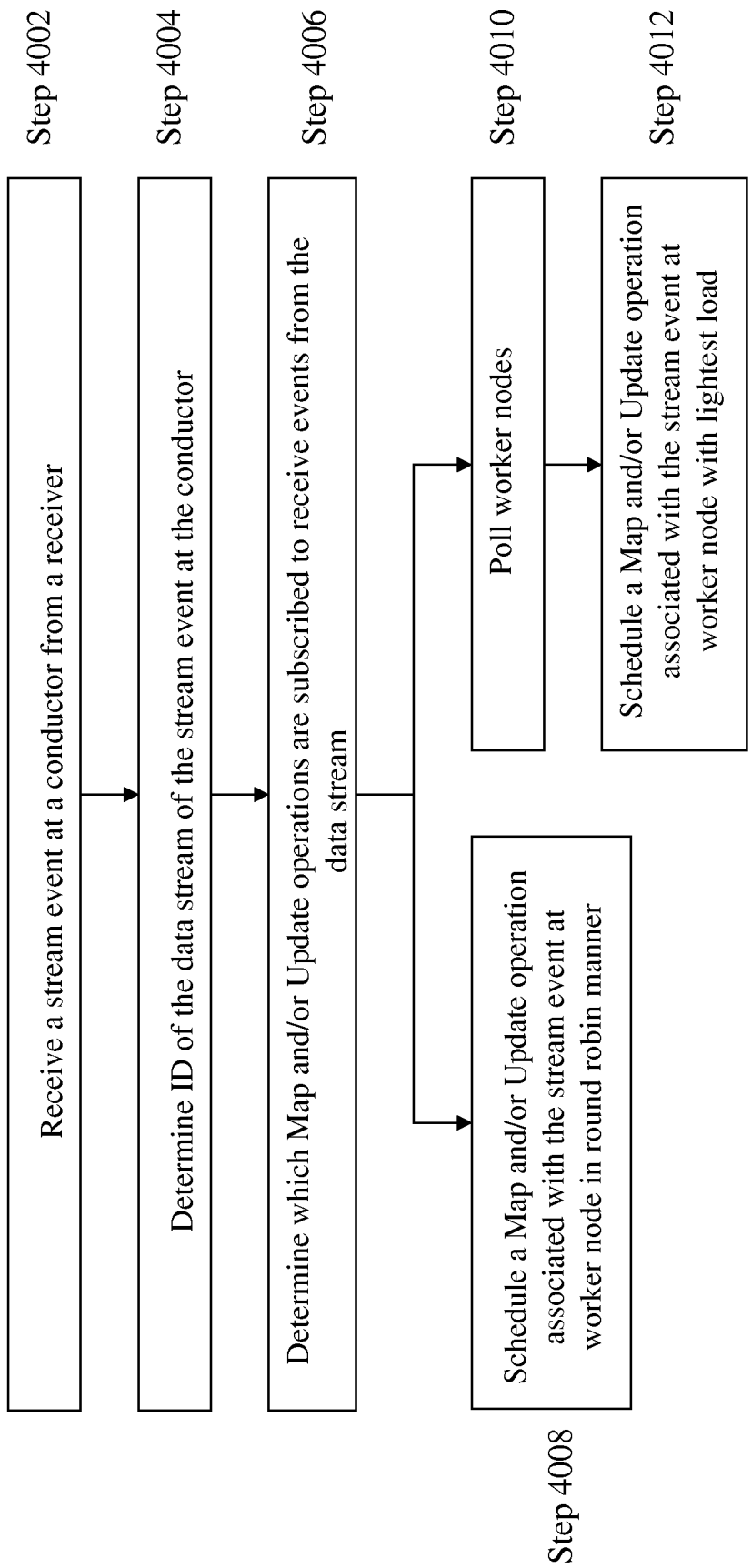
FIG. 40 is a flow chart of an exemplary method performed by a scheduling mechanism to schedule operations at one or more worker nodes.

FIG. 40 is a flow chart of an exemplary method performed by a scheduling mechanism to schedule operations at one or more worker nodes. In step 4002, the conductor may receive a stream event in real-time from a receiver or directly from a stream bus. In step 4004, the conductor may determine the identification of the data stream that included the stream event, for example, by looking up the value of the streamid attribute. The conductor may then determine one or more map and/or update operations that are subscribed to receive stream events in the data streams having the streamid attribute value in the stream event. In step 4006, the conductor may determine which worker nodes should be scheduled to run the map and/or update operations associated with the incoming stream event. The conductor may then schedule the map and/or update operations determined in step 4008 on one or more worker nodes to perform one or more real-time computations on the incoming stream event.

In an exemplary embodiment, in step 4010, the conductor may schedule the map and/or update operations associated with the incoming stream event in a round robin fashion among available worker nodes. That is, a first map or update operation may be scheduled to run on a first worker node, a second map or update operation may be scheduled to run on a second worker node, and the like. The round robin task scheduling may allocate a roughly equal computational load to the worker nodes at most points in time.

In another exemplary embodiment, in step 4012, the conductor may schedule the map and/or update operations associated with the incoming stream event in a manner that balances the computational load among the worker nodes. In an exemplary embodiment, the conductor may receive information on their current computational loads at any suitable time. For example, the conductor may poll the worker nodes at step 4010 or at pre-defined intervals of time. In another exemplary embodiment, the worker nodes may automatically transmit their load information to the conductor, for example, at pre-defined periods of time or upon prompting by the conductor. Upon receiving load information from the worker nodes, the conductor may schedule the map and/or update operations associated with the incoming stream event on the worker nodes with the lowest computational loads in step 4012.

In another exemplary embodiment, a conductor may schedule a map operation and/or an update operation in a random manner among the available worker nodes.

The exemplary task scheduling method illustrated in FIG. 40 may give rise to issues in maintaining consistency of state among update operations performed by different worker nodes since update operations are stateful operations, i.e., they store state at the end of each operation. To ensure atomicity in the system, every time an update operation is scheduled, the operation reads its associated slate from the disk storage on start-up. Upon performing the update operation, the operation writes back the updated slate to the disk storage if any updates are made during the operation. The slates have to be written to the distributed disk storage accessible by all of the worker nodes, because the next update operation may be scheduled on any worker node and must be able to access the latest state in the disk storage. As a result, in some exemplary embodiments, scheduling different update operations to worker nodes in a round robin fashion may require many data read and write operations in the disk storage performed by different worker nodes, which may lead to inefficiencies and bottlenecks in the system.

For example, assuming that an exemplary system processes n stream events per second, that each stream event accesses k slates, and that each slate is s bytes in size, a total of nk key-value operations per second must be performed on the disk storage. The nk key-value operations may transfer nks bytes of data per second between the disk storage and the worker nodes.

In an example in which the exemplary system uses input data streams from Twitter™, an exemplary value for n may be about 10,000 (i.e., a Twitter™ data stream contains about 10,000 Twitter™ updates per second), an exemplary value for k may be about 10 (i.e., each Twitter™ update accesses about 10 slates), and an exemplary value for s may be about 10 KB (i.e., each slate has a size of about 10 KB). These values yield about 100,000 key-value operations per second, which is at the outer limits of the capabilities of conventional disk storage devices. The data transferred between the disk storage and the worker nodes is about one (1) gigabyte per second, i.e., eight (8) gigabits per second, which would require network communication mechanisms capable of supporting at least ten (10) gigabytes of data. Conventional commodity nodes are typically equipped with network communication mechanisms capable of supporting up to one (1) gigabyte of data. Thus, the task scheduling method illustrated in FIG. 40 may create inefficiencies and bottlenecks due to the large amount of data being read from and written to the disk storage and the high rate at which data is being read from and written to the disk storage.

However, the exemplary task scheduling illustrated in FIG. 40 does not give rise to the same issue when scheduling map operations, because map operations are stateless operations and do not access or store state in the disk storage.

Figure 41:
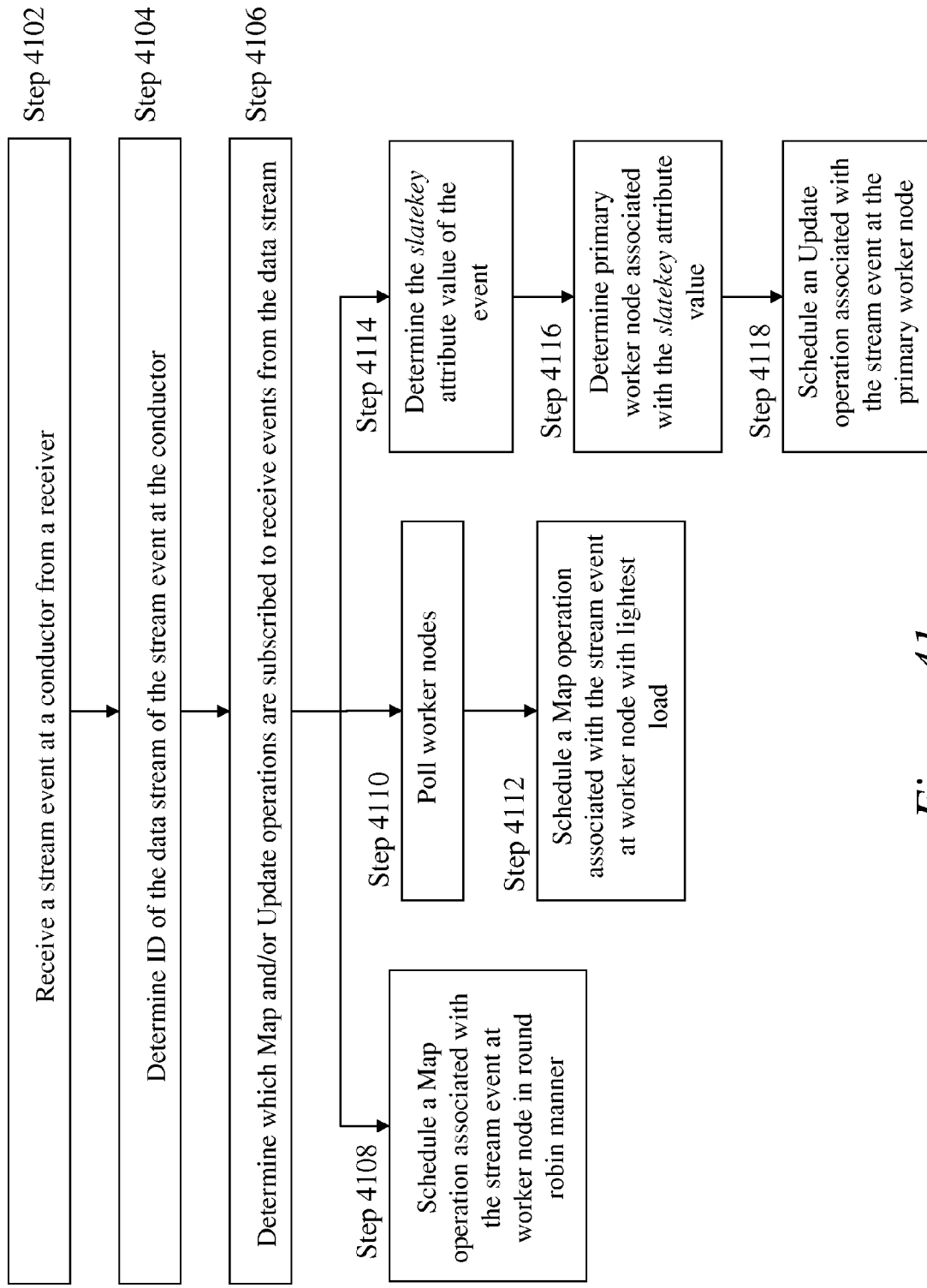
FIG. 41 is a flow chart of another exemplary method performed by a scheduling mechanism to schedule operations at one or more worker nodes.

FIG. 41 is a flow chart of another exemplary method performed by a scheduling mechanism to schedule update operations at one or more worker nodes. This exemplary method avoids the deficiencies of the method of FIG. 40 without adding greater computational complexity, and avoids the inefficiencies caused by the update operations of FIG. 40 and their associated disk storage read and write operations.

Since map operations are stateless operations, they may be scheduled to run on worker nodes in accordance with method 4000 of FIG. 40. Exemplary task scheduling policies that may be used to assign map operations to worker nodes may include, but are not limited to, random assignment, round robin assignment, assignment to worker nodes with the lightest computational loads, assignment to worker nodes to minimize communication costs, and the like.

In another exemplary embodiment, a conductor may assign map operations among the worker nodes in a manner that minimizes the cost of communications between the conductor and the worker nodes. For example, a conductor may assign one or more map operations "close" to the conductor (i.e., at worker nodes that have short communication paths to the conductor) in order to reduce communication costs, like serialization costs or network costs. This task scheduling policy is suitable for assigning map operations, as map operations are stateless and may be assigned to worker nodes anywhere, including at worker nodes that are "close" to a conductor.

The exemplary scalable method of FIG. 41 moves the update operations performed by the worker nodes closer to the data read and written by the worker nodes. More specifically, for each slatekey associated with stream events, a single worker node is designated as the "primary" or preferred worker node for performing update operations on slates having the slatekey. The conductor may store mappings between each slatekey and its associated primary worker node. That is, an update operation that receives a stream event is scheduled to run on the primary worker node associated with the slatekey value of the stream event.

In step 4102, the conductor may receive a stream event in real-time from a receiver. In step 4104, the conductor may determine the identification of the data stream that included the stream event, for example, by looking up the value of the streamid attribute in the stream event. The conductor may then determine one or more map and/or update operations that are subscribed to receive stream events in the data streams having the streamid attribute value in the stream event.

If a map operation is subscribed to receive the stream event, the conductor may determine which worker node should be scheduled to run the map operation associated with the incoming stream event, in step 4106. In an exemplary embodiment, in step 4108, the conductor may schedule map operations associated with the incoming stream event in a round robin fashion among the worker nodes. Alternatively, in another exemplary embodiment, the conductor may schedule the map operations associated with the incoming stream event in a manner that balances the computational load among the worker nodes. In an exemplary embodiment, the conductor may receive information on the current computational loads at the worker nodes at any suitable time. For example, the conductor may poll the worker nodes at step 4110 or at pre-defined intervals of time. In another exemplary embodiment, the worker nodes may automatically transmit their load information to the conductor, for example, at pre-defined periods of time or upon prompting by the conductor. Upon receiving load information from the worker nodes, in step 4112, the conductor may schedule the map operations associated with the incoming stream event on the worker nodes with the lowest computational loads.

Update operations associated with slates having a particular slatekey attribute value may be scheduled on one or more worker nodes designated to be the primary worker nodes for that slatekey attribute value. This allows the primary worker nodes to store the slates in memory, which allows fast and efficient access of the slates. If an update operation is subscribed to receive the stream event, in step 4114, the conductor may determine the value of the slatekey attribute of the stream event. In step 4116, the conductor may determine the primary worker node assigned to perform update operations associated with the given slatekey value. The conductor may look up the primary worker node in a table of mappings between slatekey values and their associated primary worker nodes. In step 4118, the conductor may schedule the Update operation to the primary worker node associated with the given slatekey value and may transmit the stream event to the worker node.

VII. Exemplary Failure Handling Mechanisms

Exemplary embodiments provide failure handling mechanisms for handling software errors and hardware failures at any of the worker nodes in the system. In an exemplary embodiment, a conductor may poll the worker nodes at predetermined intervals of time for load data and to detect failures. In an exemplary embodiment, the worker nodes may send load data and information on software errors and hardware failures to the conductor at predetermined intervals of time. Upon receiving information that a worker node has experienced a software error or hardware failure, the conductor may mark the worker node as failed, e.g., in meta-data associated with the worker node. In some embodiments, the system may restart or attempt to repair the worker node and/or the operation running on the worker node.

When a stream event arrives at the conductor with a eventkey attribute value for which the failed worker node is the primary worker node, the conductor may select another worker node to be the primary worker node for the key. In an exemplary embodiment, one or more new worker nodes may be added to the system to replace the failed worker node. Information on the new worker nodes may be transmitted to the conductor and may be stored by the conductor as meta-data. The conductor may assign stream processing operations to the new worker nodes and may transmit stream events to the new worker nodes.

To ensure consistency, the conductor may wait for a pre-defined period of time that is slightly longer than the write-delay once the failure is detected before scheduling update operations for the events associated with the failed worker node. This allows the events to be buffered at the receiver or the conductor for a period of time equal to the write-delay.

When a worker node fails, there is a risk that the system may lose any data in memory at the worker node (e.g., in cache) that has not yet been written to the disk storage. The system may also lose the stream events that the failed worker node was processing at the time of failure. However, such losses are not catastrophic in applications of exemplary embodiments. In exemplary embodiments, redundancy in data storage and storage of events (e.g., at other worker nodes) may be provided to prevent such losses in cases of worker node failure.

Exemplary embodiments provide failure handling systems and methods for handling software errors and hardware failures at a conductor in the system. In an exemplary embodiment, the conductor may maintain metadata about the available worker nodes in the system including, but not limited to, the computational specifications of the worker nodes, the current status of each worker node (e.g., whether it is operational, is in a failed state, etc.), the current processing load at each worker node, the data streams from which each worker node are subscribed to receive stream events, the data streams to which each worker node publishes events, the particular slatekey that is the primary slatekey handled by each worker node, and the like.

In exemplary embodiments, the meta-data stored at the conductor may change at a slow rate compared to the rate of the real-time data streams being processed. As such, the conductor may use a pure write-through cache with no write delay for the meta-data. If the conductor experiences a software error or a hardware failure, a new conductor may be started (e.g., by initiating a new conductor process on the same or a different machine) that reads the meta-data from the disk storage and continues the operation of the failed conductor. During the time between the failure of the conductor and the handling of events by the new conductor, the receiver may buffer events so that the only events lost are those that were in the process of being scheduled by the failed conductor. In order to avoid issues regarding designating worker nodes as being primary worker nodes for certain eventkey attribute values and to ensure consistency, the conductor may wait for a predefined period of time equal to and/or greater than the write delay before scheduling new tasks.

VIII. Exemplary Stream Event Ordering Mechanisms

Exemplary embodiments may provide replay equivalence to ensure that a particular event processing occurs exactly once. For example, if no software crashes or hardware failures occur, then every event is processed once and the results of the update operations are saved to the persistent disk storage. If a software crash or hardware failure occurs, the input data streams may be replayed (e.g., may be rewound to a previous point in time and played from that previous point again), and the slates of the update operations may be saved in snapshots so that the effects of every event is either preserved or replayed.

To ensure replay equivalence, every update operation must receive all of its stream events for a key attribute k in a well-defined consistent order within each and between all external stream events. In an exemplary embodiment, a stronger guarantee may be provided that all events must be delivered to their destination operations in a consistent order. This stronger guarantee may be implemented by creating a complete ordering of all operations in an application.

For an application in which the flow of events through operations forms a directed line, the complete ordering is equivalent to the enumeration of that line's operations. For an application in which the flow of events through operations forms a tree or directed acyclic graph (DAG), the complete ordering is an arbitrary but fixed (i.e., unspecified) topological sort of the flow. Because the topological sort of a cyclic graph is not well-defined, this approach does not apply to cyclic-event-flow-graph applications even if the event flow for all external events is otherwise guaranteed to termination.

The exemplary pseudocode represents an exemplary method for running an application. Methods enqueue(Q, v) and dequeue(Q) represent order-preserving queue operations. One queue is used for each defined operation, one queue is used for each update operation with more than one state, and two queues are used for each instance of each operation (one queue for events into the instance for processing and one for return values after processing). All enqueue (U) calls in line 3 of the pseudocode may run in parallel without affecting correctness.

| Algorithm 1 run_application |
| --- |
| Require: $F_0$ is the operator that receives incoming events (with key 0).<br>Require: seqno is a sequence number for the first incoming external event (e.g., 0).<br>1: epoch ← current_epoch(application) {For simplicity, define epoch ← 0.}<br>2: for all U ∈ updaters with multiple states do<br>3:   enqueue(U, nil) {Allow updaters to start execution. (See Algorithm 4, run_updater.)}<br>4: end for<br>5: for all external events do<br>6:   e ← ⟨ $F_0$, k = ⟨ epoch, seqno⟩ , v = external event data⟩<br>7:   e_seq ← ⟨ e⟩<br>8:   enqueue($F_0$, e_seq)<br>9:   seqno ← seqno + 1<br>10: end for |

The exemplary pseudocode represents an exemplary method for running an exemplary operation F.

| Algorithm 2 run_operator for operator F |
| --- |
| 1: if F is a state of an updater with multiple states then<br>2:   U ← updater for operator F<br>3: else<br>4:   U ← nil<br>5: end if<br>6: loop<br>7:   if U ≠ nil and F is the first state of U then<br>8:      dequeue(U) {i.e., wait until previous external event is done with U.}<br>9:   end if<br>10:  in ← dequeue(F)<br>11:  assert in is a (possibly empty) sequence of events<br>12:  out ← ⟨ ⟩<br>13:  for all ⟨ s, k, v⟩ ∈ in do<br>14:     if F subscribes to s then<br>15:        instance ← instance of F for key k<br>16:        enqueue(instance in, k, v)<br>17:     end if<br>18:  end for<br>19:  for all ⟨ s, k, v⟩ ∈ in do {in the same order as the above for loop}<br>20:     if F subscribes to s then<br>21:        events ← dequeue(instance out)<br>22:        out ← out + events<br>23:     else<br>24:        out ← out + ⟨ s, k, v⟩<br>25:     end if<br>26:  end for<br>27:  G ← succ(F) in the operator ordering for this application<br>28:  if G is not nil then<br>29:     enqueue(G, out)<br>30:  else<br>31:     assert out = ⟨ ⟩<br>32:  end if<br>33:  if U ≠ nil and F is the last state of U then<br>34:     enqueue(U, nil) {i.e., allow next external event to execute in U.}<br>35:  end if<br>36: end loop |

If the enqueue and dequeue loops are merged in the method, the method may become a strictly serial (blocking) execution of each external event, rather than a slightly parallel (izable) execution. If the enqueue and dequeue loops in the method are split further into separate threads of execution, then execution of multiple external events for an operation F may be slightly overlapped, for example, in a sufficiently parallel environment.

The exemplary pseudocode represents an exemplary method for running an exemplary map operation.

---
Algorithm 3 run_mapper for each instance of mapper F is trivial.
---
```
1: loop
2:    in ← dequeue(instance in)
3:    assert in is an event
4:    ⟨s, k, v⟩ ← in
5:    assert F subscribes to s
6:    out ← map_F(k, v) {Run the actual application code.}
7:    enqueue(instance out, out)
8: end loop
```
---

The exemplary pseudocode represents an exemplary method for running an exemplary update operation.

---
Algorithm 4 run_updater for each instance of updater F is easy (only) because its input is already queued (in required order of execution).
---
```
1: loop
2:    in ← dequeue(instance in)
3:    assert in is an event
4:    ⟨s, k, v⟩ ← in
5:    assert F subscribes to s
6:    slate ← exclusive reference to mutable slate of key ⟨U, k⟩
7:    out ← update_F(k, v, slate) {Run the actual application code.}
8:    if slate at slate has been modified in update_F then
9:       Add slate to list of dirty slates (if not already present).
10:   end if
11:   enqueue(instance out, out)
12: end loop
```
---

Additional optimizations may be implemented to any of the above methods. In an exemplary embodiment, in a tree-event-flow application, separate branches of operators may run in parallel if distinct branches never share slates. If the distinct branches share slates, then each queue(U) may need to be expanded into a full token ring threading all slates of U in some order. In an exemplary embodiment, the stronger guarantee of full-ordering for all operators may not be necessary for map operations which are stateless and, therefore, may not be implemented in some exemplary embodiments.

IX. Storage and Replay of Application-State Snapshots

Exemplary embodiments may provide replay equivalence to ensure that a particular event processing occurs exactly once. For example, if no software crashes or hardware failures occur, then every event is processed once and the results of the update operations are saved to the persistent disk storage. If a software crash or hardware failure occurs, the input data streams may be replayed (e.g., may be rewound to a previous point in time and played from that previous point again), and the slates of the update operations may be saved in snapshots so that the effects of every event is either preserved or replayed.

Application-state snapshots including, for example, external stream events, may be saved on demand and/or at periodic time intervals so that the saved slates represent the output of processing exactly all external events up to a particular one. Exemplary embodiments may replay the saved snapshots on demand, such as, after a software crash. Exemplary implementations of snapshots may be based on an event-ordered implementation.

A snapshot state may be stored in a durable disk storage by defining a snapshot index. An exemplary snapshot index may be formatted as variables epoch, seqno and status. The variable epoch may be an ordered identifier for a snapshot or a snapshot attempt that distinguishes one snapshot or snapshot attempt from any other snapshots or snapshot attempts. A snapshot attempt is an incomplete or failed snapshot. In an exemplary embodiment, values for the variable epoch may be monotonically increasing integers. The variable seqno may be the sequence number of the external event up to which an application-state snapshot will be saved. The value of the variable seqno thereby demarcates the external events whose effects are included in a snapshot from subsequent external events whose effects are not included in the snapshot. The variable status indicates whether a snapshot has been successfully, i.e., completely saved. If a snapshot has been completely and successfully saved, the value of the variable status is set to "complete." If a snapshot has not been completely saved, the value of the variable status may, in some exemplary embodiments, indicate a set of operators that have successfully saved their snapshots thus far in the process.

An exemplary dummy snapshot index is represented below. The dummy tuple <0, 0, { } may be omitted when constructing a minimal snapshot index value to run a new application. The minimal snapshot index value may be merely < >, i.e., the empty list.

⟨application, snapshots⟩ ← ⟨⟨epoch=0, seqno=0, status={ }⟩⟩

The value of the snapshot index may identify all snapshots and may be updated as new snapshots are written. A "timestamp" may be defined as a <epoch, seqno> pair. The "latest" of a set of timestamps is the one with the largest epoch; if multiple timestamps share the largest epoch, then the one with the largest seqno is latest. For example, the latest <epoch, seqno, status> tuple in the snapshot index is the one with the largest epoch value. A tuple indicates a fully written usable snapshot only if its status value indicates "complete." A write log may be maintained in durable disk storage to track a snapshot in process so that a partially failed snapshot may be fully reversed and repaired. To permit replay/restart of the snapshot without first repairing a failed snapshot, an application key may be defined as follows:

⟨application, run_state⟩ ← ⟨current_epoch=−1⟩

To ensure that a new snapshot includes processing up to a particular event and no processing of any subsequent events, the snapshot request is triggered in exemplary embodiments only between successive external events. For example at line 9 of Algorithm 1 entitled "run_application," the following call may be inserted before incrementing seqno. This initiates a request to save all processing up to and including external event seqno. A "sync_request" queue entry/message must be distinguishable from an event.

1: Append new tuple <epoch, seqno, status={ }> to the snapshot-index value.

2: enqueue($F_0$, sync_request(epoch, seqno))

Once a new snapshot request is triggered, a sync request propagates to each slate, i.e., to each update operation instance, in the same way as events, which ensures that the request arrives in order consistent with event processing. In particular, the sync request arrives in exemplary embodiments at each update operation when its slates are in the desired state, e.g., right after processing external event seqno and right before processing external event seqno+1. In order to implement the desired propagation of the sync request, Algorithm 2 entitled "run_operator" may be modified at line 11 so that the method can handle sync requests as well as events. The following pseudocode represents the following modification to Algorithm 2.

```
 1: if in is a sync_request then
 2:    if F is an updater state then
 3:       for all instance ← instance of F do
 4:          enqueue(instance in, in)
 5:       end for
 6:       for all instance ← instance of F do
 7:          r ← dequeue(instance in, in)
 8:          assert r = true
 9:       end for
10:    end if
11:    if G is nil then
12:       ⟨epoch, seqno⟩ ← in
13:       status ← snapshot-index value for ⟨epoch, seqno⟩
14:       if status ∪ F = {all operator sinks in application} then
15:          Replace status ← "complete" in snapshot-index value.
16:       else
17:          Replace status ← status ∪ {F} in snapshot-index value.
18:       end if
19:    else
20:       enqueue(G, in)
21:    end if
22:    restart loop
23: end if
24: assert in is a (possibly empty) sequence of events
```

A corresponding modification is made to Algorithm 4 entitled "run_updater" at line 3 so that "run_updater" actually writes the snapshot in response to a sync request. The following pseudocode represents this modification to Algorithm 4.

```
 1: U ← the updater corresponding to operator instance F
 2: if in is a sync_request then
 3:    ⟨epoch, seqno⟩ ← in
 4:    for all slate ∈ list of dirty slates do
 5:       key ← slate key
 6:       Log impending write for ⟨epoch, seqno, key, U⟩.
 7:       Append ⟨epoch, seqno, slate data⟩ to durable key-value storage
         for key ⟨key, U⟩.
 8:       Mark slate clean.
 9:    end for
10:    enqueue(instance out, true)
11:    restart loop
12: end if
13: assert in is an event
```

The "for" loop in the above "run_updater" method for enumerating dirty slates may be parallelized. As long as log writes are atomic, all slate data write operations may occur in parallel.

To restart an application for any reason, an exemplary embodiment may follow the following exemplary steps. The snapshot-index value may be read to determine the <epoch, seqno> of the latest snapshot having status="complete." If there is no tuple in the snapshot index in which the status value is equal to "complete," epoch=−1 and seqno=−1 may be selected. The log of impending writes may be read to remove all slate data whose <epoch, seqno> is later than the selected tuple. current_epoch=epoch+1 may be written into the application-key value. The "run_application" method shown in Algorithm 1 may be restarted from external event seqno+1 onwards, configured so that its current_epoch method in line 1 returns epoch+1. In reading a slate for <key k, updater U> from durable disk storage, if key <k, U> has no value in the durable disk storage, then no such slate exists, and if key <k, U> has a value in the durable disk storage, the slate data with the latest timestamp is returned.

In another exemplary embodiment, an application may be restarted without reversing incomplete syncs as long as epoch numbers are never reused. This alternative may provide a faster restart by deferring the repair operation in environments where epoch numbers neither run out nor wrap around. An exemplary embodiment may follow the following exemplary steps. The snapshot-index value may be read to determine the seqno of the latest snapshot having status="complete." If there is no tuple in the snapshot index in which the status value is equal to "complete," seqno=0 may be selected. The application-key value may be read to determine the last current_epoch and increment it. The new current_epoch may be written into the application-key value. The "run_application" method shown in Algorithm 1 may be restarted from external event seqno+1 onwards, configured so that its current_epoch method in line 1 returns the new current_epoch. In reading a slate for <key k, updater U> from durable disk storage, if key <k, U> has a value in the durable disk storage, the first one of the following options is selected: (a) select the latest slate data whose epoch=current_epoch, (b) select the slate data whose timestamp matches that of the latest status="complete" snapshot. If no slate data has been selected, the system determines that no such slate exists.

Additional improvements may be made to the application-state snapshot storage and replay mechanism. In an exemplary embodiment, if an update operation is used multiple times (i.e. has multiple states) in an application, each state may flush all dirty slates to storage even though only the last state of that update operation to run needs to flush the dirty slates. In an exemplary embodiment, in linear-event-flow applications, there may be only one event sink the entire application. For such applications, status may simply be a Boolean flag and does not need to hold a set of operators. In an exemplary embodiment, the snapshot-index value, individual slates and write logs may have obsolete or old history discarded automatically, for example, at periodic intervals of time. A tuple may be considered obsolete and may be discarded safely if its timestamp satisfies either of the following conditions: (a) the timestamp is earlier than the latest status="complete" snapshot timestamp, or (b) the timestamp epoch is larger than that of the latest status="complete" snapshot and is smaller than current_epoch.

X. Exemplary Implementation for Archival of the Last Stream Event in a Data Stream Exemplary embodiments may be used to determine and archive the last stream event in a real-time data stream, e.g., the last "tweet" in a user's Twitter™ stream. One of ordinary skill in the art will readily recognize that archival of the last stream event is an exemplary implementation of exemplary embodiments, and that exemplary embodiments are not limited to this illustrative implementation. In an exemplary embodiment, an update operation may subscribe to a selected data stream and may store the last successfully processed stream event in a slate that is maintained for the stream in a persistent manner.

XI. Exemplary Implementation of the Last Publication Time in a Real-Time Data Stream Exemplary embodiments may be used to determine the time of the last stream event published in a real-time data stream, e.g., the time of publication of the last "tweet" in a user's Twitter™ stream. One of ordinary skill in the art will readily recognize that real-time detection of popular topics is an exemplary implementation of exemplary embodiments, and that exemplary embodiments are not limited to this illustrative implementation.

In an exemplary embodiment, a map operation may subscribe to receive "tweets" in a Twitter™ stream T. The map operation may process each "tweet" in a real-time manner and publish a stream event to an intermediate real-time data stream S. The output stream event may have an eventkey attribute that is the user id of the Twitter™ who published the "tweet." The value of the eventkey attribute may be the time of publication of the "tweet."

An update operation may subscribe to the intermediate real-time data stream S and may extract the publication time for each user ID. The update operation may update a slate in disk storage having a slatekey attribute set to the eventkey attribute and a slatekey attribute value set to the eventkey attribute value. That is, the slate may store the last publication time for "tweets" published by the user identified in the slatekey attribute. A slate for a desired Twitter™ user may be looked up in disk storage by the slatekey attribute which designates the user ID.

XII. Exemplary Implementation of Real-Time Detection of Popular Topics

Exemplary embodiments may be used to perform real-time detection of an unusually high level of interest in a topic discussed in one or more real-time data streams. One of ordinary skill in the art will readily recognize that real-time detection of popular topics is an exemplary implementation of exemplary embodiments, and that exemplary embodiments are not limited to this illustrative implementation.

In an exemplary embodiment, interest in a particular topic T may be indicated by the number of stream events that mention the topic T in a certain amount of time, e.g., in the last hour, divided by the average number of stream events that mention the topic T in the same hour of the day. In another exemplary embodiment, interest in a particular topic T may be indicated by a z-score that takes into account both the mean and the standard deviation of hourly mentions of the topic T.

In an exemplary approach, a TopicTagger map operation may be performed to determine the topics discussed in the stream events. A TopicCounter update operation may be performed to count the number of occurrences of a particular topic in the stream events. A TopicThermometer update operation may be performed to indicate those topics that have an unusually high interest indicated by the interest exceeding a predefined threshold interest. A TopKTopic update operation may be performed to determine the top K topics at a time of day.

An exemplary TopicTagger map operation may subscribe to a real-time input data stream S0, e.g., a Twitter™ stream. A stream event in the exemplary Twitter™ stream may have an eventkey attribute value the user ID of a Twitter™ user, and a text attribute value containing the full text of the "tweet" event. The TopicTagger map operation may receive a stream event from the subscribed data stream and run a document parsing mechanism on the text attribute value of the "tweet" event. In an exemplary embodiment, the doctagger operator may be run on the text attribute value to extract a set of one or more topics (KCIDs) mentioned in the "tweet." For each KCID in the "tweet," the TopicTagger map operation may create and publish a new event on an intermediate real-time data stream S1. The eventkey attribute value of the new event may be a collection or combination of the KCID and the time at which the "tweet" was generated, e.g., {KCID, time_of_day}. The new event may also include a KCID attribute whose value is the KCID corresponding to the event, and a timestamp attribute whose value is the time at which the "tweet" was generated. The intermediate data stream S1 may be provided in a stream bus so that any of the map and update operations may access the new events.

The following pseudo-code represents an exemplary object-oriented class TopicTagger that may be used to implemented the TopicTagger map operation.

```
class TopicTagger(Mapper):
    def map(event):
        kcids = doctag(event.text)
        h = date( ).hh( ) // hour in hh format
        for kcid in kcids:
            self.publish("s1", Event(key:hh+kcid, topic:kcid))
```

An exemplary TopicCounter update operation may subscribe to the real-time intermediate data stream S1. For a particular topic and a time of day associated with a stream event in the data stream S1, the TopicCounter update operation may be called on a slate S corresponding to the topic and the time of day. The slate S may be expired in a predefined period of time, e.g., one hour. The TopicCounter update operation may maintain a variable count in the slate that counts the number of occurrences of the topic at the time of day associated with the slate. When the slate expires, the TopicCounter update operation may create and publish to a real-time intermediate data stream S2 a new stream event whose eventkey attribute is a collection or combination of the topic KCID and the time at which the "tweet" was generated, e.g., {KCID, time_of_day}. The value of the eventkey attribute may be the value of the count variable that indicates the number of occurrences of the topic at the time of day. The new stream event may be created and published by a finalize method of the TopicCounter update operation.

The following pseudo-code represents an exemplary object-oriented class TopicCounter that may be used to implemented the TopicCounter update operation.

```
class TopicCounter(Updater):
    def init(slate):
        slate.count = 0 // total number of mentions
        slate.set_expiry(next_hour( ))
        // assume we've written a utility fn to compute the
        // timestamp of the next hour
    def update(event, slate):
        slate.count += 1
    def finalize(slate):
        self.publish("s2", Event(key:slate.key, value:count))
```

An exemplary TopicThermometer update operation may subscribe to the real-time intermediate data stream S2. The update operation may be invoked with a slate S corresponding to a particular topic KCID and time of day. The TopicThermometer update operation may maintain the following variables: variable N that includes the total number of mentions of the topic at the time of day, variable D that includes the number of days that the information has been tracked, variable avg that includes the average number of mentions of the topic (i.e., N/D), and variable interest that includes an indication of the interest in the topic determined as count/avg. If the value of the interest variable is equal to and/or above a predefined threshold, the TopicThermometer update operation may create and publish to a real-time intermediate data stream S3 a new stream event with the topic KCID as the eventkey attribute and the interest level as the eventkey attribute value.

The following pseudo-code represents an exemplary object-oriented class TopicThermometer that may be used to implemented the TopicThermometer update operation.

```
class TopicThermometer(Updater):
    def init(slate):
        slate.n = 0
        slate.d = 0
    def update(event, slate):
        avg = (slate.n+1) / (slate.d+1) // avoid zero div
        intrst = event.count / avg
        if intrst > threshold:
            publish("s3",Event(key:slate.kcid,interest:intrst))
        // update stats
        slate.n += event.count
        slate.d += 1
```

In an exemplary embodiment, a data structure may be maintained to record the top K topics at any time of the day. A TopKTopic update operation may be used to maintain this data structure. The TopKTopic update operation may subscribe to the real-time intermediate data stream S3 and may use a slate to maintain a priority queue that tracks the top K interest scores in the events of stream S3. The TopKTopic update operation may also track the top K topics by location and/or category.

XIII. Exemplary Implementation of Real-Time K-Rank Computation

Exemplary embodiments may be used to perform real-time computation of K-ranks that indicate the degree of influence of content published by a particular user on other users. The computation may be based on stream events in a real-time input data stream, e.g., a Twitter™ stream. The stream events in the input data stream may have a streamid attribute value of S0, an eventkey attribute value of the user ID, and a text attribute value of the text of the "tweet." The output may be a hashtable in which the key is the user ID and the value is the K-rank of the user, i.e., <user ID, score>. All K-ranks may be initialized at time zero, e.g., to 1000. In an exemplary embodiment, a map operation named LinkPartitioner, a first update operation named GamePlayer and a second update operation named ScoreUpdater may be used to implement the K-rank computation functionality. One of ordinary skill in the art will readily recognize that real-time detection of popular topics is an exemplary implementation of exemplary embodiments, and that exemplary embodiments are not limited to this illustrative implementation.

In an exemplary embodiment, the LinkPartitioner map operation may subscribe to the input data stream S0 and may determine if the text of each stream event contains a link. The map operation may, for example, process the text attribute value of the stream event to determine if any portion of the text matches the format of a link. If the map operation determines that the stream event does not include a link, the map operation may not output anything. However, if the stream event is determined to include a link, the map operation may canonicalize the link and generate a new stream event in which the eventkey attribute is the canonicalized link and the value is the user ID of the user who published the input stream event. The map operation may publish the new stream event to a real-time intermediate data stream S1.

The following pseudo-code represents an exemplary object-oriented class LinkPartitioner that may be used to implemented the LinkPartitioner map operation.

```
class LinkPartitioner(Mapper):
    def map(event):
        link = extractLink(event.text)
        if link:
            ev = event.copy( )
            ev.key = canonicalize(link)
                self.publish("s1", ev)
```

In an exemplary embodiment, the GamePlayer update operation may subscribe to receive stream events from the real-time intermediate data stream S1. The GamePlayer update operation may be invoked with a slate S with slatekey attribute L and a stream event whose eventkey attribute is a link L and whose value is a user ID. The slate S may have an additional attribute named users with a value that holds an ordered list of the users who have published the link L. Every user V in the ordered list of users has in essence "won" a game against user U, i.e., have been preceded by user U in publishing the link L. In order to model this information, the GamePlayer update operation may generate a new stream event who eventkey attribute is a fixed value and whose value is the ordered pair of users, e.g., (U, V), indicating that "V defeated U." The GamePlayer update operation may publish the new stream event to a real-time intermediate data stream S2. In addition, the GamePlayer update operation may create a slate S or, if slate S already exists, may append U to the ordered list of users stored in the value of the users attribute in the slate S. A time-to-live parameter may be set for the slate S, e.g., for a day, which ensures that the slate S will be deleted if a link is not seen by the LinkPartitioner map operation in twenty-four hours.

The following pseudo-code represents an exemplary object-oriented class GamePlayer that may be used to implemented the GamePlayer update operation.

```
class GamePlayer(Updater):
    def init(slate):
        slate.users = [ ]
        slate.set_ttl(24*60*60) // set TTL to be 1 day
    def update(event, slate):
        u = event.users
        for v in slate.users:
            e = Event(key:"x", winner: v, loser: u)
            self.publish("s2", e)
                slate.users.append(u)
```

In an exemplary embodiment, the ScoreUpdater update operation may subscribe to receive stream events from the real-time intermediate data stream S2. The ScoreUpdater update operation may create a slate or, if the slate already exists, may update the slate containing a single attribute named scores which is a hashtable with a key attribute of user ID and value of the K-score associated with the user ID. The ScoreUpdater update may receive the result of every pairwise game performed by the GamePlayer update operation and may update the K-scores stored in the hashtable associated with each user ID. Any suitable rating system may be used in updating the K-scores, e.g., the Elo rating system.

The following Pseudo-code represents an exemplary object-oriented class ScoreUpdater that may be used to implemented the ScoreUpdater update operation.

```
class ScoreUpdater(Updater):
    def init(slate):
        slate.scores = Hashtable( )
    def update(event, slate):
        (win, lose) = (event["winner"], event["loser"])
        s = slate.scores
        // Assume a function ELO that takes old scores of
        // winner and loser and returns their new scores
        (s[win],s[lose]) = elo(s[win],s[lose])
```

In an exemplary embodiment which uses application slates and keyspaces, a K-rank computation may store an individual user's K-scores separately in the disk storage indexed by the user ID. A modification may be made to the ScoreUpdater update operation to create a keyspace "kscore." For every user ID u, the ScoreUpdater update operation may create an application slate with key "kscore:u" which stores the score associated with user ID u. These slates may be set up with a delayed write time, e.g., sixty seconds. The disk storage may be used to store the results of the stream computations and may allow efficient real-time access for applications that use the results. Any application, whether built using the map-update framework, may access the K-score of a user, correct to the last minute, by looking up the key "kscore:u" in the disk storage. In an exemplary embodiment, the system may use keyspaces as information on improving execution, for example, designating the same worker node as the primary worker node for all the keys in an application keyspace.

The following pseudo-code represents an exemplary object-oriented class ScoreUpdater class modified to implement application slates and keyspaces.

```
class ScoreUpdater(Updater):
    def gets(userid): // utility method
        try:
            /* get_slate( ) gets a slate by key. If no slate
            exists for the key, it raises KeyError */
            return self.get_slate("kscore:" + userid)
        except KeyError:
            /* create a new app slate and initialize it */
            s = Slate(("kscore:" + userid)
            s.score = 1000     // initial ELO score
            s.set_write_delay(60) // 60-second write delay
            return s
    def update(event, slate)
        winner, loser = (event.winner, event.loser)
        wins, loses = (self.gets(winner), self.gets(loser))
        wins.score, loses.score = elo(wins.score,loses.score)
        wins.update( )
        loses.update( )
```

XIV. Exemplary Implementation of Stream Clustering

Exemplary embodiments may be used to cluster stream events in real-time data streams based on a taxonomy of one or more topic categories. Exemplary stream clustering mechanisms may be used to cluster stream events in any desired data streams. In an exemplary application of a clustering search engine, a spider may crawl the web and categorize the web pages it gathers into topic pages. A "home page" or information repository may be provided for each topic to serve as a doorway to all of the most valuable information on the topic found on the web. Exemplary topics of interest may include, but are not limited to, health, cancer, travel, Hawaii vacation, autos, and the like.

In an exemplary application, stream clustering may be applied to a subset of stream events (e.g., "tweets" obtained from a Twitter™ stream) that contain links to external articles. Exemplary embodiments may cluster the external articles into news "stories." As the data stream flows, new stores may emerge, existing stories may divide into sub-stories, and certain stories may increase and diminish in importance. Exemplary embodiments may apply the stream clustering mechanisms to identify the top N stories at any time. Exemplary embodiments may also identify the top N stories in different topic categories. Exemplary embodiments may also generate a real-time story stream.

A taxonomy may be provided in exemplary embodiments to categorize information in stream events hierarchically. The taxonomy may provide a plurality of categories for categorizing information at different levels of granularity. In an exemplary embodiment, the information in each stream event may be analyzed and categorized based on one or more categories, for example, first, second and third-level categories indicating increasing granularities of categorization. For example, a first-level category may indicate a high-level concept associated with the information in a stream event, e.g., news. A second-level category may indicate an intermediate-level concept, e.g., politics. A third-level category may indicate a specific concept, e.g., American politics. One of ordinary skill in the art will recognize that additional levels of categories may be used and that, in an alternative embodiment, the granularity of categorization may decrease with increasing category levels.

In exemplary embodiments, the taxonomy may also reflect one or more relationships including, but not limited to, is-a relationships (e.g., San Francisco is-a city), member-of relationships (e.g., James Hetfield is a member-of Metallica), capital-of relationships (e.g., Canberra is the capital-of Australia), and the like. The resulting hierarchical structure may be implemented as a directed acyclic graph (DAG).

An exemplary stream clustering computation may be divided into two phases for ease of implementation. In a first phase of the stream clustering computation, stream events may be distributed among worker nodes in such a manner that if events A and B can be part of the same cluster, the events are routed to the same worker node. In order to implement this event routing mechanism, each stream event may be distributed to k different worker nodes corresponding to k different second or third-level topic categories corresponding to the stream event. If there are M second-level topic categories, M update operations may be executed, each update operation maintaining topic clusters in parallel. An assumption in this implementation is that stream events cannot cluster together unless they agree on at least one of their k second-level topic categories.

In an exemplary embodiment, the first phase of the stream clustering computation may be implemented with a map operation named DocTagger and an update operation named CategoryCluster. In an exemplary embodiment, the DocTagger map operation may run a document categorization engine named doctagger on the text contained in stream events. The DocTagger map operation may analyze the text of each stream event and generate a cluster vector of topic categories corresponding to the text in the stream event. The DocTagger map operation may also generate high-level topic categories corresponding to the text in the stream event (e.g., second or third-level topic categories in an exemplary taxonomy). For each high-level topic category, the DocTagger map operation may create a new stream event whose eventkey attribute is the topic category. The new stream event may include other attributes including, but not limited to, a docvector attribute containing the cluster vector and other attributes specific to the source that generated the input stream event, e.g., Twitter™. The DocTagger map operation may publish the new stream event to a real-time intermediate data stream S1.

In an exemplary embodiment, the CategoryCluster update operation may subscribe to the real-time intermediate data stream S1, and may be invoked with each stream event in the data stream S1 and a slate whose slatekey attribute is the topic category in the stream event. The CategoryCluster update operation may run a suitable clustering engine to add the stream event to the clusters maintained in the slate. For each cluster, only the metadata may be stored in the slate, and application slates with suitable time-to-live parameter values may be used to store the actual contents of the cluster and the stream event information. The CategoryCluster update operation may create a new stream event for each updated cluster with the eventkey attribute set to the cluster ID and the value set to the cluster vector and other cluster metadata. The CategoryCluster update operation may publish the new stream event to a real-time intermediate data stream S2.

In a second phase of the stream clustering computation, the clusters from the M different clusterings may be examined, and duplicates and near-duplicates are eliminated or merged. In an exemplary embodiment, each cluster may have a cluster vector of topic categories. An assumption in this implementation is that if two clusters are near-duplicates, the clusters will agree on their top-j topic category sets, i.e., the topic categories that have the j highest scores in the cluster vector viewed as a set (e.g., j–3). The cluster metadata may be distributed so that candidate near-duplicate clusters are routed to the same node where they may be merged or combined.

In some other exemplary embodiments, duplicates and near-duplicates may not be removed or merged, and may be tracked separately.

In an exemplary embodiment, the second phase of the stream clustering computation may be implemented with a map operation named KCIDGrouper, a first update operation named ClusterMerger, and a second update operation named OutputStreamer. In an exemplary embodiment, the KCIDGrouper map operation may subscribe to receive stream events from the real-time intermediate data stream S2. For every received stream event, the KCIDGrouper map operation may examiner the cluster vector and create an eventkey attribute with a value that combines the k highest-level topic categories in the cluster vector. The KODGrouper map operation may create a new stream event having the newly created eventkey attribute and value. The new stream event may have one or more additional attributes, e.g., corresponding to those of the received stream event in the data stream S2. The KCIDGrouper map operation may publish the created stream event to a real-time intermediate data stream S3.

In an exemplary embodiment, the ClusterManager update operation may subscribe to receive stream events from the real-time intermediate data stream S3. The ClusterManager update operation may run a suitable hierarchical clustering engine on the clusters in the received stream event to merge near-duplicate clusters. The ClusterManager update operation may create a new stream event corresponding to every second-level cluster. The ClusterManager may publish the new stream event to a real-time intermediate data stream S4.

In an exemplary embodiment, the OutputStreamer update operation may subscribe to receive stream events from the real-time intermediate data stream S4. The OutputStreamer update operation may examiner each second-level cluster and, based on predefined threshold levels, may publish stream events to one or more output data streams in which one data stream is provided for each stream speed. In an exemplary embodiment, slower data streams may have higher predefined threshold levels.

XV. Exemplary Computing Devices

Figure 42:
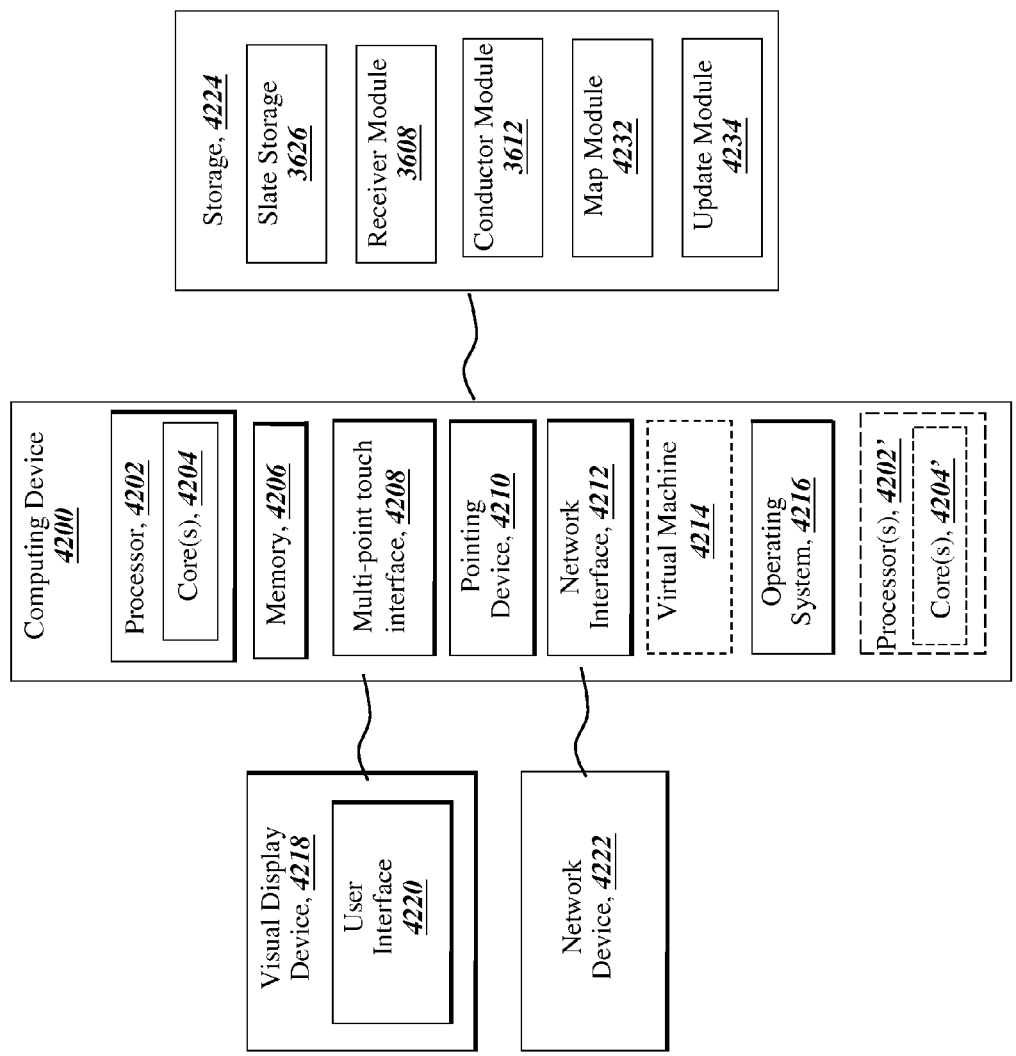
FIG. 42 is a block diagram representing an exemplary computing device that may be used to perform any of the exemplary methods disclosed herein.

FIG. 42 is a block diagram representing an exemplary computing device 4200 that may be used as a worker node, a receiver, a conductor, and the like, to perform any of the methods provided by exemplary embodiments. The computing device 4200 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 4200 includes one or more non-transitory computer-readable media having encoded thereon one or more computer-executable instructions or software for implementing exemplary methods. The non-transitory computer-readable media may include, but are not limited to, one or more types of hardware memory, non-transitory tangible media (for example, one or more magnetic storage disks, one or more optical disks, one or more USB flash drives), and the like. For example, memory 4206 included in the computing device 4200 may store computer-readable and computer-executable instructions or software for implementing exemplary embodiments. The computing device 4200 also includes processor 4202 and associated core 4204, and in some embodiments, one or more additional processor(s) 4202' and associated core(s) 4204' (for example, in the case of computer systems having multiple processors/cores), for executing computer-readable and computer-executable instructions or software stored in the memory 4206 and other programs for controlling system hardware. Processor 4202 and processor(s) 4202' may each be a single core processor or multiple core (4204 and 4204') processor.

Virtualization may be employed in the computing device 4200 so that infrastructure and resources in the computing device may be shared dynamically. A virtual machine 4214 may be provided to handle a process running on multiple processors so that the process appears to be using only one computing resource rather than multiple computing resources. Multiple virtual machines may also be used with one processor.

Memory 4206 may include a computer system memory or random access memory, such as DRAM, SRAM, EDO RAM, and the like. Memory 4206 may include other types of memory as well, or combinations thereof. Memory 4206 may be used to store one or more slates on a temporary basis, for example, in cache.

A user may interact with the computing device 4200 through a visual display device 4218, such as a screen or monitor, that may display one or more user interfaces 4220 that may be provided in accordance with exemplary embodiments. The visual display device 4218 may also display other aspects, elements and/or information or data associated with exemplary embodiments. The computing device 4200 may include other I/O devices for receiving input from a user, for example, a keyboard or any suitable multi-point touch interface 4208, a pointing device 4210 (e.g., a mouse, a user's finger interfacing directly with a display device, etc.). The keyboard 4208 and the pointing device 4210 may be coupled to the visual display device 4218. The computing device 4200 may include other suitable conventional I/O peripherals.

The computing device 4200 may include one or more audio input devices 4224, such as one or more microphones, that may be used by a user to provide one or more audio input streams.

The computing device 4200 may include one or more storage devices 4224, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. For example, the storage device 4224 may provide a slate storage 3626 for storing slates, and may store computer-executable instructions for implementing, for example, a receiver module 3608, a conductor module 3612, one or more map modules 4232, and one or more update modules 4234. Exemplary receiver, conductor, map and update modules may be programmatically implemented by a computer process as described in connection with FIGS. 8 and 36. The storage device 4224 may be provided on the computing device 4200 or provided separately or remotely from the computing device 4200. The storage device 4224 may be used to store one or more slates in a durable manner.

The computing device 4200 may include a network interface 4212 configured to interface via one or more network devices 4222 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 4212 may include a built-in network adapter, network interface card, PCMCIA network card, card bus network adapter, wireless network adapter, USB network adapter, modem or any other device suitable for interfacing the computing device 4200 to any type of network capable of communication and performing the operations described herein. The network device 4222 may include one or more suitable devices for receiving and transmitting communications over the network including, but not limited to, one or more receivers, one or more transmitters, one or more transceivers, one or more antennae, and the like.

The computing device 4200 may run any operating system 4216, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 4216 may be run in native mode or emulated mode. In an exemplary embodiment, the operating system 4216 may be run on one or more cloud machine instances.

Exemplary computer-executable methods, systems and devices taught herein may be used in various computer applications and to implement further computer-executable methods and techniques. For example, exemplary computer-executable methods, systems and devices taught herein may be used to populate and process data structures taught in U.S. Provisional Patent Application No. 61/415,279 entitled "Social Genome," filed Nov. 18, 2010 and in a U.S. non-provisional patent application Ser. No. 13/300,519 entitled "Social Genome," filed Nov. 18, 2011. Exemplary computer-executable methods, systems and devices taught herein may be used to perform analytics as taught in a U.S. non-provisional patent application Ser. No. 13/300,523 entitled "Real-time Analytics of Streaming Data," filed Nov. 18, 2011. Exemplary computer-executable methods, systems and devices taught herein may be used to process and provide data for methods taught in a U.S. non-provisional patent application Ser. No. 13/300,473 entitled "Methods, Systems and Devices for Recommending Products and Services," filed Nov. 18, 2011.

XVI. Exemplary Network Environments

Figure 43:
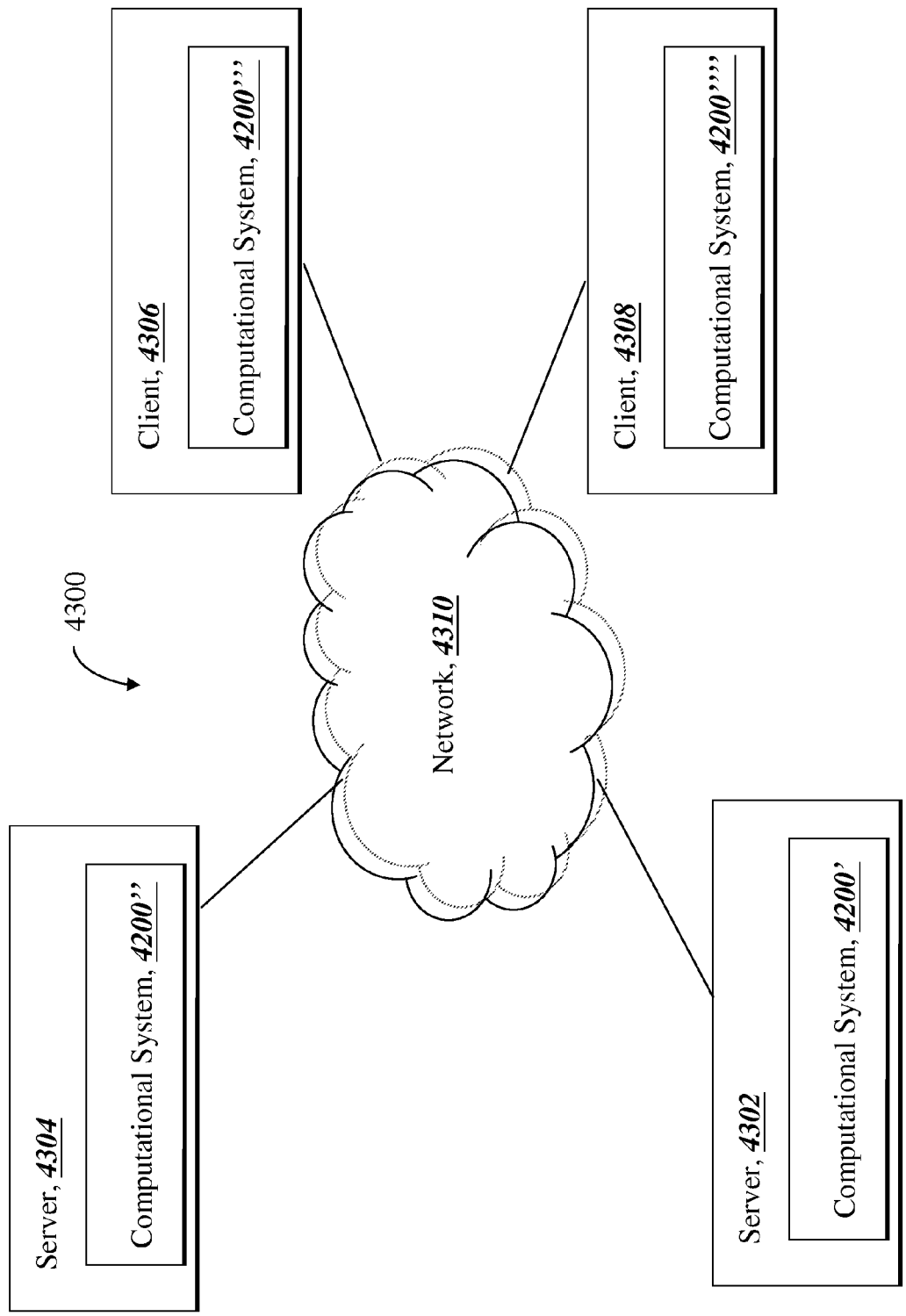
FIG. 43 is a block diagram representing an exemplary network environment suitable for a distributed implementation of exemplary embodiments.

FIG. 43 is a block diagram representing an exemplary network environment 4300 suitable for a distributed implementation of exemplary embodiments. The network environment 4300 may include one or more servers 4302 and 4304 coupled to one or more clients 4306 and 4308 via a communication network 4310. The network interface 4212 and the network device 4222 of the computing device 4200 enable the servers 4302 and 4304 to communicate with the clients 4306 and 4308 via the communication network 4310. The communication network 4310 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 4310 are capable of supporting distributed implementations of exemplary embodiments.

In an exemplary embodiment, the servers 4302 and 4304 may provide the clients 4306 and 4308 with computer-readable and/or computer-executable components or products or data under a particular condition, such as a license agreement. In an exemplary embodiment, the clients 4306 and 4308 may provide the servers 4302 and 4304 with computer-readable and/or computer-executable components or products or data under a particular condition, such as a license agreement.

In an exemplary embodiment, one or more of the servers 4302 and 4304 and clients 4306 and 4308 may implement a computational system, such as system 4200 or one or more modules thereof shown in FIG. 42, in order to provide a distributed mechanism for performing the exemplary methods described herein. For example, servers 4302 and 4304 may implement computational systems 4200' and 4200", respectively, and clients 4306 and 4308 may implement computational systems 4200''' and 4200'''', respectively.

In an exemplary distributed implementation for processing real-time data streams, a stream bus comprising one or more real-time data streams may be provided at a computational system 4200' on a server 4302. One or more receiver and/or one or more conductor modules may be provided at a computational system 4200" on a server 4304. The receiver and/or conductor modules may access one or more data streams provided by the server 4302, may transmit stream events in the data streams to one or more worker processes running on client machines. For example, a computational system 4200''' on a client 4306 may run a first worker process to perform a first stream computation, e.g., a map operation and/or an update operation. Similarly, a computational system 4200'''' on a client 4308 may run a second worker process to perform a second stream computation, e.g., a map operation and/or an update operation.

In an exemplary embodiment, the first worker process running on the client 4306 may receive one or more stream events from the conductor running on the server 4304, and may perform the first stream computation. The first worker process may generate an output stream event as a result of the first stream computation, which may be published to a data stream maintained at the stream bus on the server 4302.

In an exemplary embodiment, the second worker process running on the client 4308 may receive one or more stream events from the conductor running on the server 4304, and may perform the second stream computation. The second worker process may create or update one or more slate data structures, and may persistently store the slates at the computational system 4200″″ on the client 4308 in a distributed manner and/or at a central data structure provided on a different server or client. The second worker process may also store the slates in memory at the computational system 4200″″ on the client 4308. Storage of a slate locally in memory at a worker node where the worker node is the primary worker node for the slatekey of the slate reduces the number of disk storage accesses performed during the stream computation and, thereby, reduces the time and computational requirements of the stream computation. The second worker process may, additionally or alternatively, generate an output stream event as a result of the second stream computation, which may be published to a data stream maintained at the stream bus on the server 4304.

XVII. Equivalents

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts. Method steps in the exemplary flowcharts represented in dashed lines are steps that are provided in some embodiments and not in other embodiments.

What is claimed is:

1. A computer-implemented method for processing of real-time data streams, the method comprising:
   receiving in a real-time manner, at a first worker process, a first input stream event in a first real-time input data stream comprising a plurality of stream events;
   processing in a real-time manner, at the first worker process, the first input stream event in a first map operation to generate first intermediate output data;
   transforming the first intermediate output data at the first worker process, to generate a first intermediate stream event associated with at least one slate that records a set of related stream events;
   transmitting in a real-time manner, using the first worker process, the first intermediate stream event in a first real-time intermediate data stream;
   receiving in a real-time manner, at a second worker process, the first intermediate stream event in the first real-time intermediate data stream;
   processing in a real-time manner, at the second worker process, the first intermediate output data in the first intermediate stream event in a first update operation to generate first final output data; and
   storing the first final output data in a first data structure associated with the first intermediate output data on a storage device.

2. The computer-implemented method of claim 1, wherein the first map operation is subscribed to receive the plurality of stream events in the first real-time input data stream, and wherein the first update operation is subscribed to receive stream events from the first real-time intermediate data stream.

3. The computer-implemented method of claim 1, further comprising:
   receiving, at a conductor process, the first input stream event in the first real-time input data stream;
   determining that the first map operation is subscribed to receive the plurality of stream events in the first real-time input data stream;
   scheduling the first map operation for performance on the first worker process; and
   transmitting the first input stream event to the first worker process.

4. The computer-implemented method of claim 1, further comprising:
   receiving, at a conductor process, the first intermediate stream event in the first real-time intermediate data stream;
   determining that the first update operation is subscribed to receive stream events in the first real-time intermediate data stream;
   scheduling the first update operation for performance on the second worker process; and
   transmitting the first intermediate stream event to the second worker process.

5. The computer-implemented method of claim 1, further comprising:
   determining a computational load at one or more worker nodes on a network; and
   scheduling the first and second worker processes on first and second worker nodes with the lowest computation loads.

6. The computer-implemented method of claim 1, further comprising:
   assigning a first worker node as a primary worker node for performing the first update operation associated with the first data structure; and
   storing the first data structure in memory at the first worker node for access after performing the update operation.

7. The computer-implemented method of claim 1, further comprising:
   receiving in a real-time manner, at a third worker process, a second input stream event in a second real-time input data stream comprising a plurality of stream events;

processing in a real-time manner, at the third worker process, the second input stream event in a second map operation to generate second intermediate output data;

generating, at the third worker process, a second intermediate stream event corresponding to the second input stream event and comprising the second intermediate output data;

transmitting, using the third worker process, the second intermediate stream event in a second real-time intermediate data stream in a real-time manner;

receiving in a real-time manner, at a fourth worker process, the second intermediate stream event in the second real-time intermediate data stream;

processing in a real-time manner, at the fourth worker process, the second intermediate output data in the second intermediate stream event in a second update operation to generate second final output data; and storing the second final output data in a second data structure associated with the second intermediate output data on a storage device.

8. The computer-implemented method of claim 7, wherein the first worker process and the third worker process operate concurrently to perform the first and second map operations, respectively.

9. The computer-implemented method of claim 7, wherein the second worker process and the fourth worker process operate concurrently to perform the first and second update operations, respectively.

10. The computer-implemented method of claim 1, further comprising:

transmitting, using the second worker process, a second intermediate stream event comprising the first final output data in a second intermediate real-time data stream in a real-time manner;

receiving in a real-time manner, at a third worker process, the second intermediate stream event in the second real-time intermediate data stream;

processing in a real-time manner, at the third worker process, the first final output data in the second intermediate stream event in a second update operation to generate second final output data; and storing the second final output data in a second data structure associated with the second intermediate output data on a storage device.

11. The computer-implemented method of claim 1, wherein the first input stream event is a unit of data transmitted in the first real-time input data stream in a real-time manner, and wherein the first intermediate stream event is a unit of data transmitted in the first real-time intermediate data stream in a real-time manner.

12. A distributed computational system, comprising:

a computer-readable storage device for storing computer-executable code associated with a first map operation and a first update operation, and for storing static data output by the first update operation;

a scheduling module for scheduling the first map operation to run on a first worker node and the first update operation to run on a second worker node;

the first worker node programmed to:
receive in a real-time manner a first input stream event in a first real-time input data stream comprising a plurality of stream events,
run the first map operation to process in a real-time manner the first input stream event to generate first intermediate output data,
generate a first intermediate stream event associated with at least one slate that records a set of related stream events, and
transmit the first intermediate stream event in a first real-time intermediate data stream in a real-time manner; and the second worker node programmed to:
receive in a real-time manner the first intermediate stream event in the first real-time intermediate data stream,
run the first update operation to process in a real-time manner the first intermediate output data in the first intermediate stream event to generate first final output data, and
store the first final output data in a first data structure associated with the first intermediate output data on the storage device.

13. The distributed computational system of claim 12, wherein the first map operation is subscribed to receive the plurality of stream events in the first real-time input data stream, and wherein the first update operation is subscribed to receive stream events from the first real-time intermediate data stream.

14. The distributed computational system of claim 12, wherein the scheduling module is programmed to:
receive the first input stream event in the first real-time input data stream;
determine that the first map operation is subscribed to receive the plurality of stream events in the first real-time input data stream;
schedule the first map operation for performance on the first worker process; and
transmit the first input stream event to the first worker process.

15. The distributed computational system of claim 12, wherein the scheduling module is programmed to:
receiving the first intermediate stream event in the first real-time intermediate data stream;
determining that the first update operation is subscribed to receive stream events in the first real-time intermediate data stream;
scheduling the first update operation for performance on the second worker process; and
transmitting the first intermediate stream event to the second worker process.

16. One or more non-transitory computer-readable storage media having encoded thereon computer-executable instructions for performing a method for processing real-time data streams, the method comprising:

receiving in a real-time manner, at a first worker process, a first input stream event in a first real-time input data stream comprising a plurality of stream events;

processing in a real-time manner, at the first worker process, the first input stream event in a first map operation to generate first intermediate output data;

transforming the first intermediate output data, at the first worker process, to generate a first intermediate stream event associated with at least one slate that records a set of related stream events;

transmitting in a real-time manner, using the first worker process, the first intermediate stream event in a first real-time intermediate data stream;

receiving in a real-time manner, at a second worker process, the first intermediate stream event in the first real-time intermediate data stream;

processing in a real-time manner, at the second worker process, the first intermediate output data in the first intermediate stream event in a first update operation to generate first final output data; and storing the first final output data in a first data structure associated with the first intermediate output data on a storage device.

17. The one or more non-transitory computer-readable storage media of claim 16, wherein the first map operation is subscribed to receive the plurality of stream events in the first real-time input data stream, and wherein the first update operation is subscribed to receive stream events from the first real-time intermediate data stream.

18. The one or more non-transitory computer-readable storage media of claim 16, wherein the method further comprises:
   receiving, at a conductor process, the first input stream event in the first real-time input data stream;
   determining that the first map operation is subscribed to receive the plurality of stream events in the first real-time input data stream;
   scheduling the first map operation for performance on the first worker process; and
   transmitting the first input stream event to the first worker process.

19. The one or more non-transitory computer-readable storage media of claim 16, wherein the method further comprises:
   receiving, at a conductor process, the first intermediate stream event in the first real-time intermediate data stream;
   determining that the first update operation is subscribed to receive stream events in the first real-time intermediate data stream;
   scheduling the first update operation for performance on the second worker process; and
   transmitting the first intermediate stream event to the second worker process.

20. The one or more non-transitory computer-readable storage media of claim 16, wherein the method further comprises:
   receiving in a real-time manner, at a third worker process, a second input stream event in a second real-time input data stream comprising a plurality of stream events;
   processing in a real-time manner, at the third worker process, the second input stream event in a second map operation to generate second intermediate output data;
   generating, at the third worker process, a second intermediate stream event associated with at least one slate that records a set of related stream events
   transmitting, using the third worker process, the second intermediate stream event in a second real-time intermediate data stream in a real-time manner;
   receiving in a real-time manner, at a fourth worker process, the second intermediate stream event in the second real-time intermediate data stream;
   processing in a real-time manner, at the fourth worker process, the second intermediate output data in the second intermediate stream event in a second update operation to generate second final output data; and
   storing the second final output data in a second data structure associated with the second intermediate output data on a storage device.

21. The one or more non-transitory computer-readable storage media of claim 20, wherein the first worker process and the third worker process operate concurrently to perform the first and second map operations, respectively.

22. The one or more non-transitory computer-readable storage media of claim 20, wherein the second worker process and the fourth worker process operate concurrently to perform the first and second update operations, respectively.

23. The one or more non-transitory computer-readable storage media of claim 16, wherein the method further comprises:
   transmitting, using the second worker process, a second intermediate stream event comprising the first final output data in a second intermediate real-time data stream in a real-time manner;
   receiving in a real-time manner, at a third worker process, the second intermediate stream event in the second real-time intermediate data stream;
   processing in a real-time manner, at the third worker process, the first final output data in the second intermediate stream event in a second update operation to generate second final output data; and
   storing the second final output data in a second data structure associated with the second intermediate output data on a storage device.

24. The one or more non-transitory computer-readable storage media of claim 16, wherein the method further comprises:
   assigning a first worker node as a primary worker node for performing the first update operation associated with the first data structure; and
   storing the first data structure in memory at the first worker node for access after performing the update operation.

25. A computer-implemented method for processing of real-time data streams, the method comprising:
   receiving in a real-time manner, at a first worker process running on a first computational device, a first stream event in a first real-time data stream;
   processing in a real-time manner, at the first worker process at the first computational device, the first stream event in a first map operation to generate first output data;
   transforming the first output data, at the first worker process at the first computational device, to generate a second stream event associated with at least one slate that records a set of related stream events; and
   transmitting the second stream event in a real-time manner using the first worker process at the first computational device.

26. A computer-implemented method for processing of real-time data streams, the method comprising:
   receiving in a real-time manner, at a first worker process running on a first computational device, a first stream event in a first real-time data stream, the first stream event comprising first input data;
   processing in a real-time manner, at the first worker process at the first computational device, the first input data contained in the first stream event in a first map operation to generate first output data;
   transforming the first output data, at the first worker process at the first computational device, to generate or update a first data structure associated with at least one slate that records a set of related stream events; and
   storing the first data structure on a durable storage device.

* * * * *